(12) United States Patent
Takeuchi

(10) Patent No.: US 7,446,447 B2
(45) Date of Patent: Nov. 4, 2008

(54) MAGNETIC STRUCTURE AND MOTOR EMPLOYING SAID MAGNETIC STRUCTURE, AND DRIVER COMPRISING SAID MOTOR

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 318 days.

(21) Appl. No.: 10/533,651

(22) PCT Filed: Nov. 18, 2003

(86) PCT No.: PCT/JP03/14667

§ 371 (c)(1),
(2), (4) Date: May 5, 2005

(87) PCT Pub. No.: WO2004/047258

PCT Pub. Date: Jun. 3, 2004

(65) Prior Publication Data

US 2006/0071577 A1    Apr. 6, 2006

(30) Foreign Application Priority Data

| Nov. 18, 2002 | (JP) | 2002-334160 |
| Jun. 2, 2003 | (JP) | 2003-157229 |
| Jun. 19, 2003 | (JP) | 2003-175456 |
| Sep. 4, 2003 | (JP) | 2003-313170 |

(51) Int. Cl.
*H02K 17/44* (2006.01)

(52) U.S. Cl. ............ 310/112; 310/114; 310/268

(58) Field of Classification Search ............. 310/112, 310/114, 266, 268
See application file for complete search history.

(56) References Cited

U.S. PATENT DOCUMENTS

| 3,290,787 A | * | 12/1966 | Brugger .................. 33/327 |
| 4,187,441 A | | 2/1980 | Oney |
| 4,868,431 A | * | 9/1989 | Karita et al. ............. 310/12 |
| 4,870,306 A | | 9/1989 | Petersen |
| 5,218,251 A | | 6/1993 | Allwine, Jr. |
| 5,751,089 A | | 5/1998 | Stridsberg |

(Continued)

FOREIGN PATENT DOCUMENTS

DE    2530614    *    5/1987

(Continued)

OTHER PUBLICATIONS

Boldea, I., et al.: "Linear electric actuators and generators", 1997, pp. MA1-1.1 to MA1-1.5, 1997 IEEE.*

(Continued)

*Primary Examiner*—Dang D Le
(74) *Attorney, Agent, or Firm*—Harness, Dickey & Pierce, P.L.C.

(57) ABSTRACT

Provided is a small motor superior in weight/torque balance. A phase stator 10 and B phase stator 12 are disposed to face each other. A rotor is interpositioned between these stators. Electromagnetic coils @ are provided to the stators evenly in the circumferential direction. A permanent magnet is provided to the rotor evenly in the circumferential direction. The exciting polarity of the electromagnetic coil is alternately opposite, and this is the same for the permanent magnet. A signal having a prescribed frequency is input to the A phase electromagnetic coil and B phase electromagnetic coil. The rotor rotates between the stators as a result thereof.

19 Claims, 50 Drawing Sheets

U.S. PATENT DOCUMENTS

| | | | |
|---|---|---|---|
| 6,005,320 A * | 12/1999 | Kim et al. | 310/156.36 |
| 6,011,337 A * | 1/2000 | Lin et al. | 310/156.37 |
| 6,049,197 A * | 4/2000 | Caamano | 322/89 |
| 6,327,232 B2 * | 12/2001 | Tanase et al. | 369/47.28 |
| 6,373,160 B1 | 4/2002 | Schroedl | |
| 6,433,496 B1 | 8/2002 | Kawagoshi | |
| 6,437,529 B1 | 8/2002 | Brown | |
| 2002/0113501 A1 | 8/2002 | Doi | |

FOREIGN PATENT DOCUMENTS

| | | | |
|---|---|---|---|
| DE | 296 22 874 U | | 7/1997 |
| DE | 29622874 | * | 7/1997 |
| EP | 0 216 998 A | | 4/1987 |
| EP | 0 431 178 A | | 6/1991 |
| EP | 431178 | * | 6/1991 |
| EP | 0 497 317 A | | 8/1992 |
| EP | 497317 | * | 8/1992 |
| EP | 0 558 261 A | | 9/1993 |
| EP | 558261 | * | 9/1993 |
| FR | 2 606 951 A | | 5/1988 |
| FR | 2606951 | * | 5/1988 |
| GB | 2 079 068 A | | 1/1982 |
| GB | 2079068 | * | 1/1982 |
| JP | 57 189559 A | | 11/1982 |
| JP | 57189559 | * | 11/1982 |
| JP | 61 244250 A | | 10/1986 |
| JP | 61244250 | * | 10/1986 |
| JP | 08 051745 | | 2/1996 |
| JP | 09 158994 A | | 6/1997 |
| JP | 09158994 | * | 6/1997 |
| JP | 11 206077 | | 7/1999 |
| WO | 96/29774 A | | 9/1996 |
| WO | 96/297774 | * | 9/1996 |

OTHER PUBLICATIONS

Boldea, I., et al.: "Linear electric actuators and generators", 1997, Electric Machines and Drives Conference Record, 1997, IEEE International Milwaukee, WI, USA; May 18-21, 1997, New York, NY, USA; IEEE, US, pp. MA1-11-MA1-15, XP010231716 ISBN: 0-7803-3946-0.

* cited by examiner

(1)

(2)

(1)

(2)

(1)

(2)

(1)

(2)

(3)

(4)

(1)

(2)

(1) (2)

(1)

(2)

(1)

(2)

(1)

(2)

AB PHASE INDEPENDENT TYPE (1)

AB PHASE SYNTHESIZED TYPE (2)

AB PHASE SERIAL COIL TYPE (3)

(1)

(2)

MAGNETIC STRUCTURE AND MOTOR EMPLOYING SAID MAGNETIC STRUCTURE, AND DRIVER COMPRISING SAID MOTOR

CROSS-REFERENCE TO RELATED APPLICATIONS

This application is a U.S. National Stage (371) of International Application No. PCT/JP2003/014667 filed Nov. 18, 2003, and published in English as WO 2004/047258 A2 on Jun. 3, 2004, which claims the benefit of Japanese Application Nos. 2002-334160, filed Nov. 18, 2002, 2003-157229, filed Jun. 2, 2003, 2003-175456, filed Jun. 19, 2003 and 2003-313170, filed Sep. 4, 2003. The disclosures of the above applications are incorporated herein by reference.

1. Technical Field

The present invention relates to various motors for rotating a rotor or moving a slider formed from a permanent magnet or a ferromagnetic body by linearly arranging a coil capable of generating a magnetic pole and sequentially switching the current to be flowed to the coil, and further relates to a magnetic structure body to be employed in such a motor. The present invention also relates to a driver employing this motor as a drive source. The present invention may be employed to be a driver in the likes of an electric vehicle, electric cart, electric wheelchair, as well as other electric toys, electric airplanes, miniature electric devices, MEMS, and so on.

2. Background Art

An AC motor driven by a frequency signal such as an alternating current can be broadly classified into two types; namely, a synchronous motor and an induction motor. A synchronous motor is a motor that rotates at the same rotational speed as the speed of the rotating magnetic field determined with the power supply frequency upon employing a laminated core of a permanent magnet or a ferromagnetic body such as iron as the rotor.

Depending on the type of rotor, there is a magnet type employing a permanent magnet, a coil type in which a coil is wound thereto, and a reactance type employing a ferromagnetic body such as iron. Among the above, with the magnet type, the permanent magnet of the rotor rotates by being pulled by the rotating magnetic field of the stator. Meanwhile, the induction motor is a motor that rotates by the conductor generating a separate magnetic field with the electromagnetic induction effect to the rotor shaped like a cage.

Among the foregoing motors, there are types that move linearly without rotating, or are able to move freely on the surface. These types of motors are generally referred to as linear motors, and, by linearly arranging the coil for generating a magnetic pole and sequentially switching the current to be flowed, the permanent magnet or ferromagnetic body mounted thereon will move. The coil arrangement disposed linearly corresponds to a stator, and a rotor corresponds to a flat slider that slides above such stator.

As the foregoing magnet type synchronous motor, for example, there is a miniature synchronous motor described in Japanese Patent Laid-Open Publication No. H8-51745 (Patent Document 1). As illustrated in FIG. 1 of Patent Document 1, this miniature synchronous motor is structured by comprising a stator core 6 to which an exciting coil 7 is wound, and a rotor 3 having a built-in magnet 1 and a rotor core 2 in which NS poles are disposed in equal intervals around the circumference thereof.

Nevertheless, with the motor explained in the conventional art, there is a problem in that the weight will increase in comparison to the generated torque, and the size thereof must be enlarged in order to generate greater torque. Thus, an object of the present invention is to provide a magnetic structure to be employed in a motor superior in torque and weight balance and suitable for miniaturization, a motor utilizing this structure, and a driving method of this magnetic structure. Another object of the present invention is to provide various drivers utilizing this motor.

SUMMARY OF THE INVENTION

As a result of intense study to overcome the foregoing problems, the present inventors discovered that, since the magnetic structure structuring the (stator) and (slider, rotor) of the motor is of a one-to-one relationship with a conventional motor, the foregoing problems can be resolved by making this a many-to-one relationship.

The present invention was devised based on the foregoing discovery, and provided is a magnetic structure comprising a first magnetic body and a second magnetic body, and a third magnetic body disposed therebetween and relatively movable in a prescribed direction in relation to the first and second magnetic bodies, wherein the first magnetic body and second magnetic body respectively comprise a structure in which a plurality of electromagnetic coils capable of alternately exciting opposite poles is disposed in order; and the first magnetic body and the second magnetic body are structured such that an electromagnetic coil of the first magnetic body and an electromagnetic coil of the second magnetic body are disposed so as to mutually posses an array pitch difference.

The third magnetic body comprises a structure in which a permanent magnet alternately magnetized to opposite poles is disposed in order, and the first magnetic body and the second magnetic body are structured such that a magnetic coil of the first magnetic body and a magnetic coil of the second magnetic body are disposed so as to mutually posses an array pitch difference.

In a mode of the present invention, provided is circuit means for supplying a frequency signal having respectively different phases to the magnetic coil of the first and second magnetic bodies. Further, the first magnetic body, second magnetic body and third magnetic body are respectively formed in a circular arc. The first magnetic body, second magnetic body and third magnetic body may also be respectively formed in a straight line. The first magnetic body and second magnetic body are disposed at an equidistance, and the third magnetic body is disposed between the first magnetic body and second magnetic body.

In a motor employing this magnetic body, the pair formed from the first and second magnetic bodies and one side of the third magnetic body form a rotor, and the pair formed from the first and second magnetic bodies and the other side of the third magnetic body form a stator. This motor comprises a rotational speed detection means of the rotor. Moreover, the exciting circuit means comprises reference pulse signal generation means; and phase correction means for correcting the phase of the exciting current to be supplied to the electromagnetic coil of the first magnetic body and the electromagnetic coil of the second magnetic body based on the rotational speed detection signal and the reference pulse signal. The phase difference between the exciting current supplied to the first magnetic body and the exciting current supplied to the second magnetic body in accordance with the rotational position of the rotor changes.

BRIEF DESCRIPTION OF THE DRAWINGS

FIG. 8(2) is a schematic plan view of the rotor; FIG. 8(3) is a side view thereof; FIG. 8(4) shows the A phase electromagnetic coil (first magnetic body); and FIG. 8(5) shows the B phase electromagnetic coil (second magnetic body).

FIG. 33(2) is the side view thereof.

FIG. 39(2) is an A-A cross section thereof.

DETAILED DESCRIPTION OF THE PREFERRED EMBODIMENTS

FIG. 1 to FIG. 4 are views showing the frame format and operational principle of the magnetic structure according to the present invention. This magnetic structure is structured by comprising a first magnetic body (A phase coil) 10 and a second magnetic body (B phase coil) 12 having a magnetic field in the horizontal direction, and a third magnetic body 14 interpositioned therebetween. These magnetic bodies may be structured circularly (circular arc, circle) or in a straight line.

When the magnetic body is formed circularly, either the third magnetic body or the first/second magnetic body functions as the rotor, and, when the magnetic body is formed linearly, either the third magnetic body or the first/second magnetic body functions as a slider.

Figure 5:
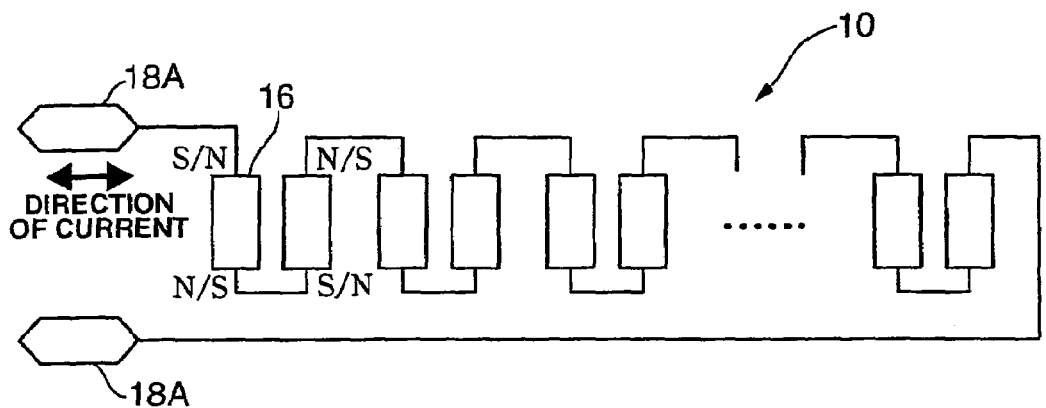
FIG. 5, with (1) and (2) is an equivalent circuit diagram showing the connection state of the electromagnetic coil.
Figure 5:
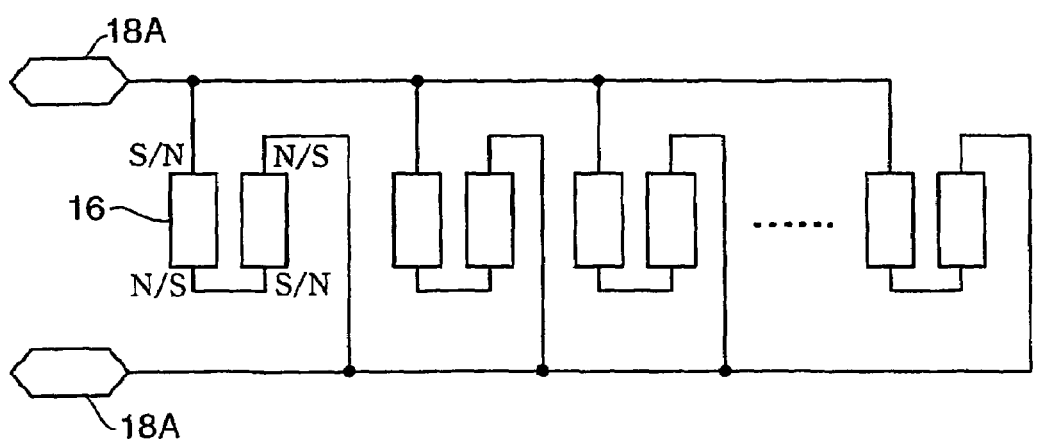

The first magnetic body 10 comprises a structure in which coils 16 capable of being alternately magnetized to opposite poles are disposed in order in prescribed intervals, preferably in equal intervals. The equivalent circuit diagram of this first magnetic body is shown in FIG. 5. According to FIG. 1 to FIG. 4, as described later, every coil is constantly excited during the start-up rotation (2Π) in relation to the two-phase exciting coil. Therefore, a drivee such as a rotor or slider may be rotated or driven at high torque.

As shown in FIG. 5(1), a plurality of electromagnetic coils 16 (magnetic units) is connected serially in equal intervals. Reference numeral 18A is an exciting circuit block for applying a frequency pulse signal to this magnetic coil. An exciting signal for magnetizing the coil is flowed from this exciting circuit to the electromagnetic coil 16, and the respective coils are set in advance to magnetize such that the direction of the magnetic pole changes alternately between the adjacent coils. As shown in FIG. 5(2), the electromagnetic coils 16 may also be connected in parallel.

When a signal having a frequency for alternately switching in prescribed cycles the polar direction of the exciting current to be supplied is applied from this exciting circuit 18A to the electromagnetic coil 16 of the first magnetic body 10, as shown in FIG. 1 to FIG. 4, a magnetic pattern is formed in which the polarity on the side of the third magnetic body 14 alternately changes from the N pole→S pole→N pole. When the frequency pulse signal becomes a reverse polarity, a magnetic pattern is generated in which the polarity on the third magnetic body side of the first magnetic body alternately changes from the S pole→N pole→S pole. As a result, the exciting pattern appearing in the first magnetic body 10 changes periodically.

The structure of the second magnetic body 12 is similar to the first magnetic body 10, but differs with respect to the point in that the electromagnetic coil 18 of the second magnetic body is disposed positionally out of alignment in relation to the electromagnetic coil 16 of the first magnetic body. In other words, as described in the claims, the array pitch of the first magnetic body coil and the array pitch of the second magnetic body coil are set to have a prescribed pitch difference (angular difference). As this pitch difference, preferably employed may be a distance corresponding to Π/2 or ¼ of the distance in which the permanent magnet (third magnetic body) 14 moves in correspondence with one cycle (2Π) of the exciting current frequency in relation to the coils 16, 18; that is, the total distance of a pair of N pole and S pole.

Next, the third magnetic body 14 is explained below. As shown in FIG. 1 to FIG. 4, this third magnetic body 14 is disposed between the first magnetic body and second magnetic body, and a plurality of permanent magnets 20 (marked out in black) having alternately reverse polarities is disposed linearly (in a straight line or circular arc) in prescribed intervals, preferably in equal intervals. A circular arc may be a perfect circle, oval, closed loop, and further include an unspecified circular structure, half circle, and fan shape.

The first magnetic body 10 and the second magnetic body 12 are disposed in parallel for example in an equidistance, and the third magnetic body 14 is disposed in the middle of the first magnetic body and the second magnetic body. The array pitch of the individual permanent magnets in the third magnetic body is approximately the same as the array pitch of the magnetic coil in the first magnetic body 10 and the second magnetic body 12.

Figure 1:
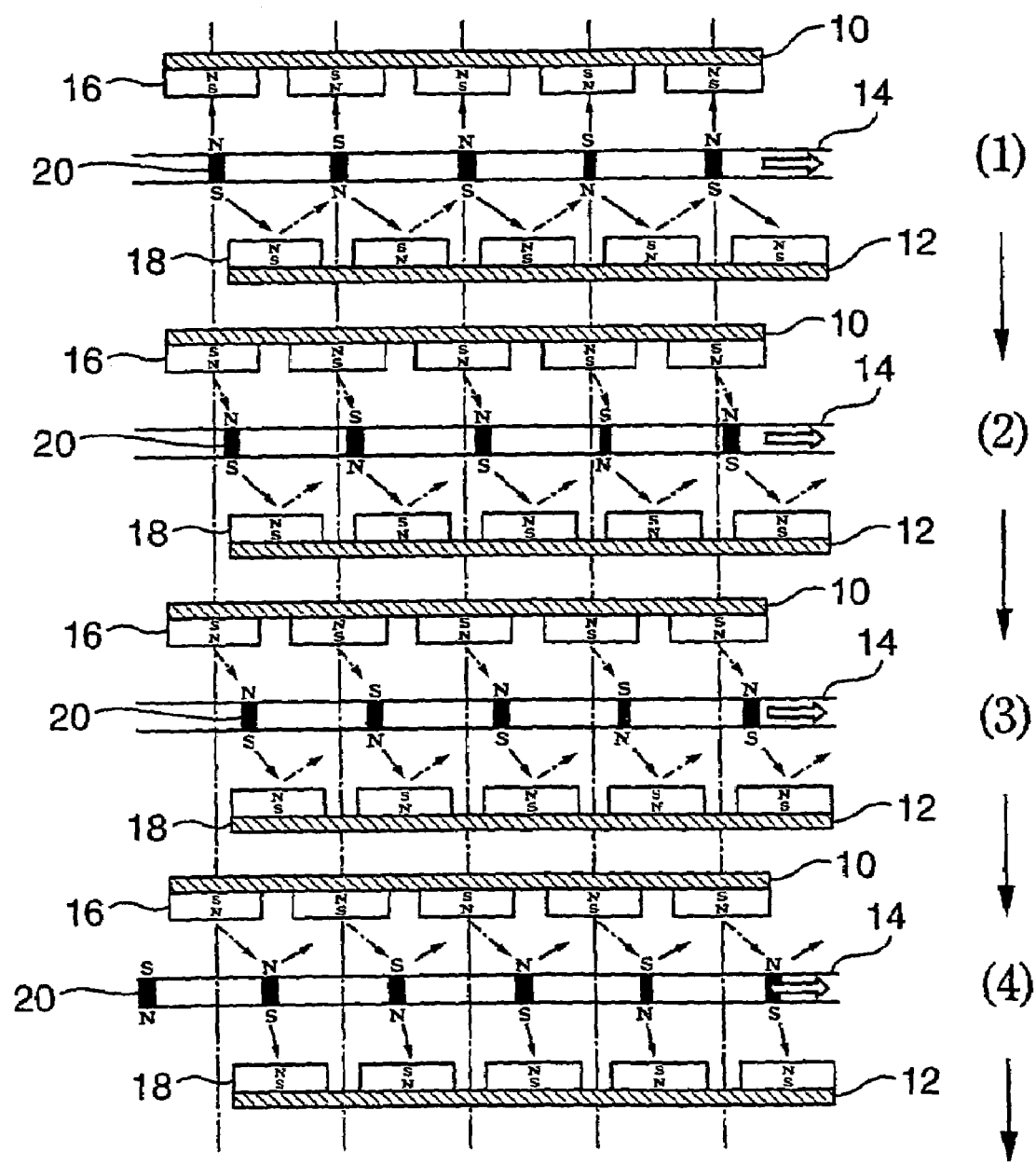
FIG. 1 is a view showing the frame format and operational principle of the magnetic structure according to the present invention.
Figure 2:
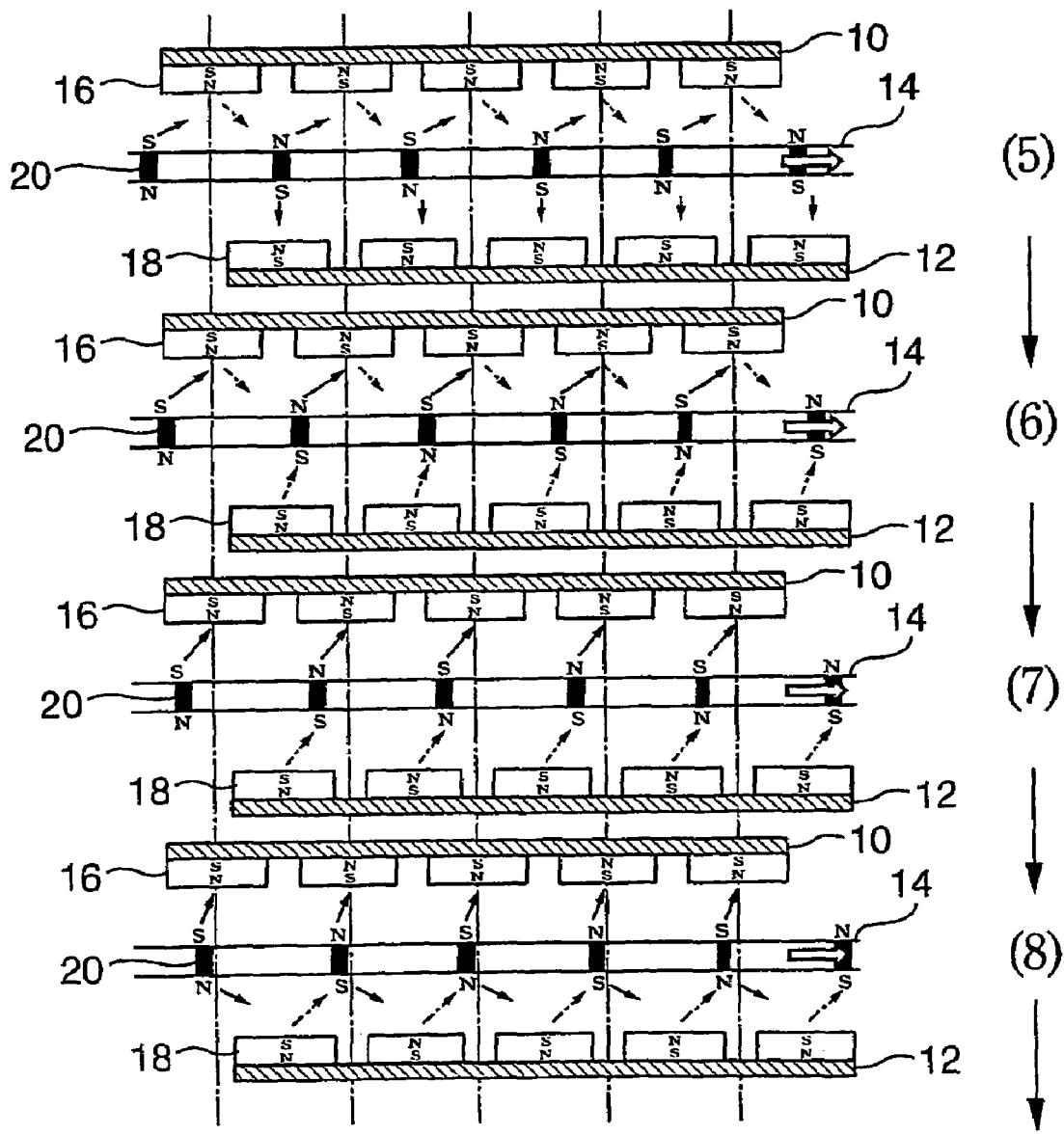
FIG. 2 shows the operational principle subsequent to FIG. 1.
Figure 3:
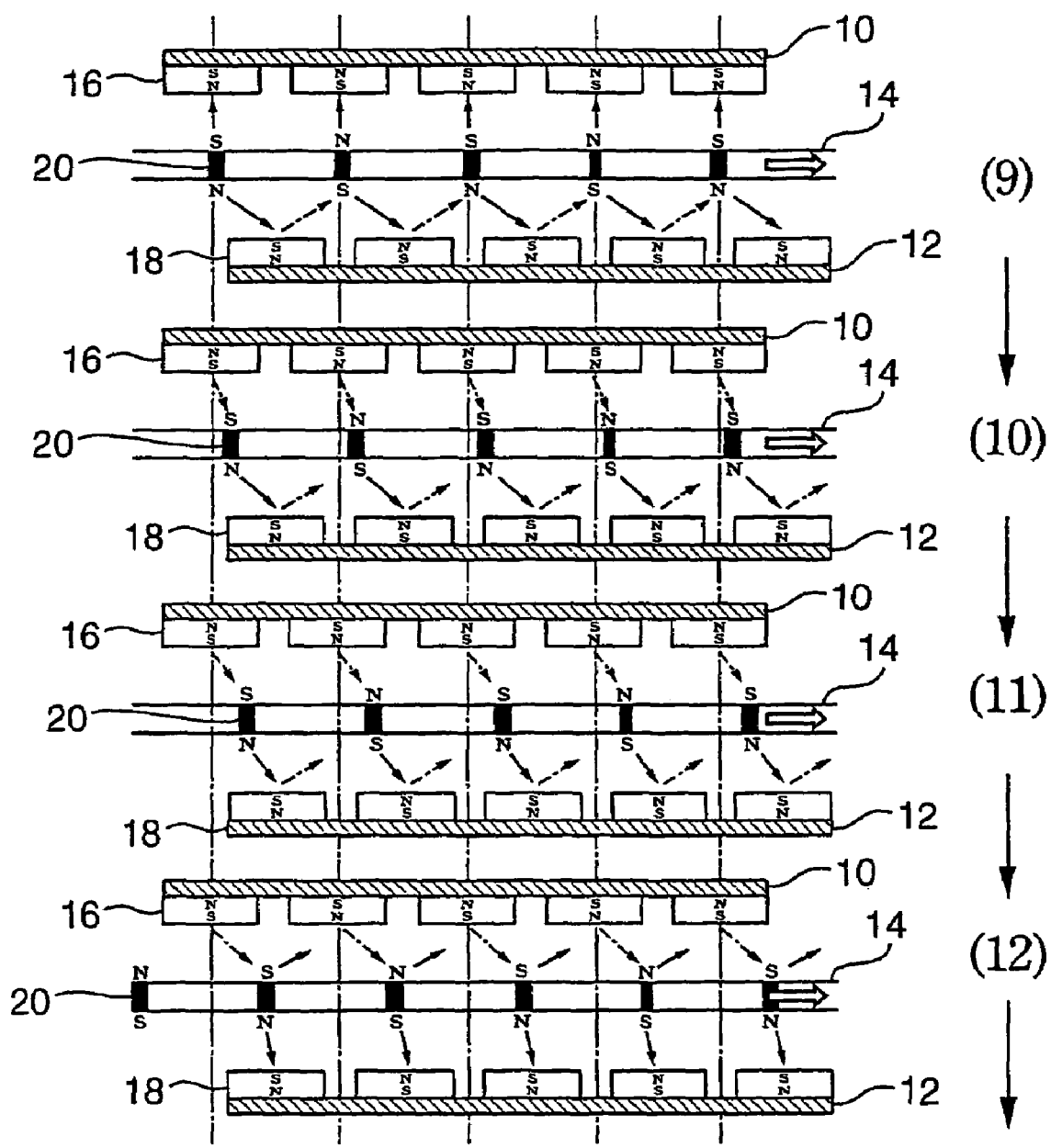
FIG. 3 shows the operational principle subsequent to FIG. 2.
Figure 4:
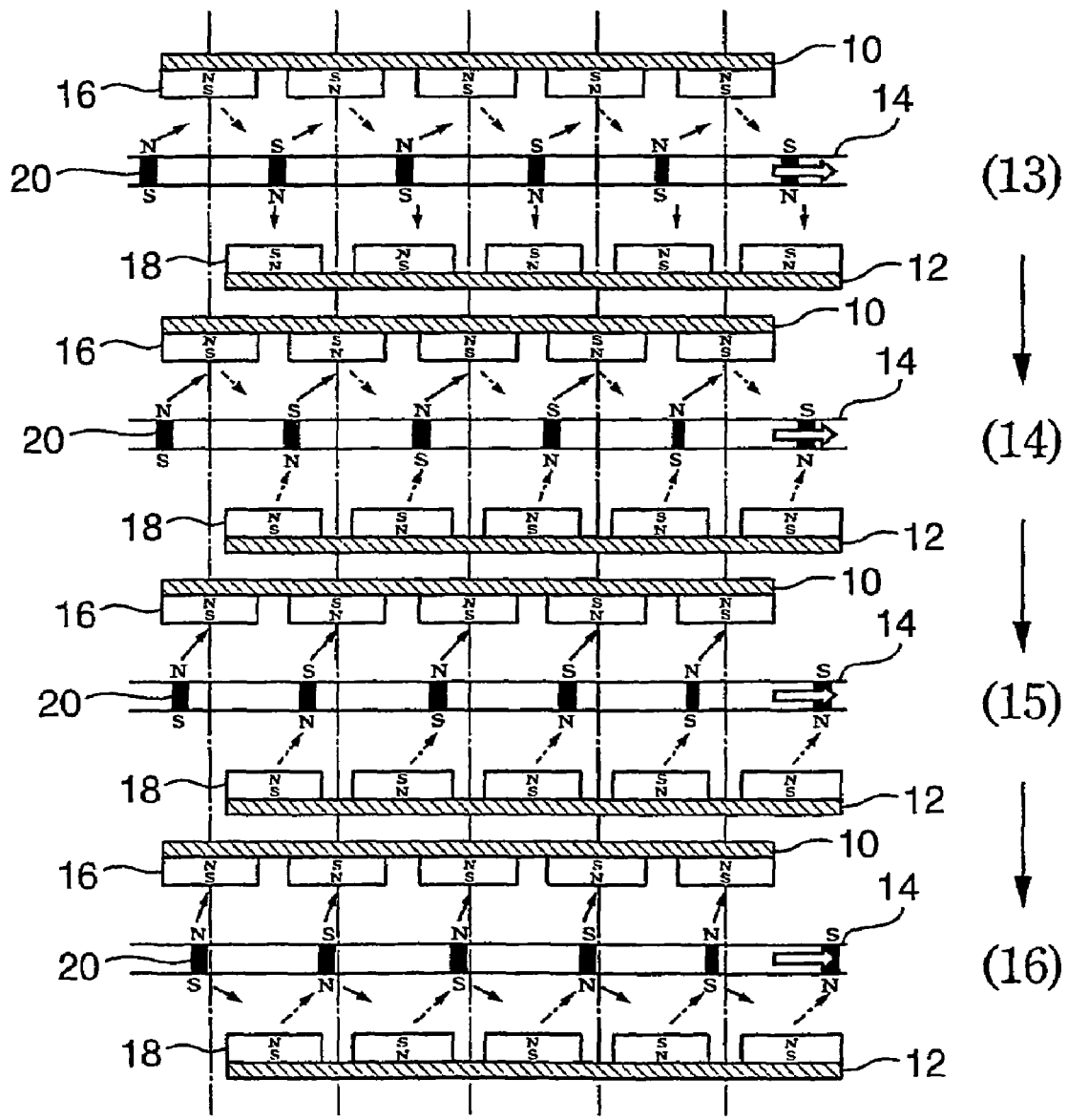
FIG. 4 shows the operational principle subsequent to FIG. 3.

Next, the operation of the magnetic structure in which the foregoing third magnetic body 14 is disposed between the first magnetic body 10 and the second magnetic body 12 is explained with reference to FIG. 1 to FIG. 4. As a result of the foregoing exciting circuit (reference numeral 18 in FIG. 5; described later), an exciting pattern as shown in FIG. 1(1) is generated to the electromagnetic coils 16, 18 of the first magnetic body and second magnetic body at a certain moment.

Here, a magnetic pole is generated in a pattern of →S→N→S→N→S→ to the respective coils 16 on the surface facing the third magnetic body 14 side of the first magnetic body, and a magnetic pole is generated in a pattern of →N→S→N→S→N→ to the coil 18 on the surface facing the third magnetic body 14 side of the second magnetic body 12. In the diagrams, arrows displayed in a solid line represent attraction, and arrows displayed in a chain line represent repulsion.

The next moment, as shown in (2), when the polarity of the wave pulse applied to the first magnetic body via the drive circuit is inverted, repulsion is generated between the magnetic pole generated in the coil 16 of the first magnetic body 10 shown in (1) and the magnetic pole of the permanent magnet 20 on the surface of the third magnetic body 14. On the other hand, attraction is generated between the magnetic pole generated in the coil 18 of the second magnetic body 12 and the magnetic pole on the surface of the permanent magnet of the third magnetic body 14. Thus, the third magnetic body sequentially moves in the horizontal direction as shown in (1) to (5).

A wave pulse having a phase out of alignment in comparison to the exciting current of the first magnetic body is applied to the coil 18 of the second magnetic body 12, and, as shown in (6) to (8), the magnetic pole of the coil 18 of the second magnetic body 12 and the magnetic pole on the surface of the permanent magnet 20 of the third magnetic body 14 repel to make the third magnetic body 14 move horizontally even further. (1) to (8) show cases when the permanent magnet moves a distance corresponding to Π, and (9) to (16) show cases when the permanent magnet moves a distance corresponding to the remaining Π. In other words, the third magnetic body moves relatively in relation to the first and second magnetic bodies in a distance corresponding to one cycle (2Π) of the frequency signal supplied to the electromagnetic coils 16, 18 in (1) to (16).

As described above, by respectively supplying frequency signals having mutually differing phases to the first magnetic body (A phase) and the second magnetic body (B phase), the third magnetic body 14 may be slid linearly, or the third magnetic body 14 may be rotated as a rotor.

When the first magnetic body, second magnetic body and third magnetic body are formed in a circular arc, the magnetic structure shown in FIG. 1 will become a structure of a rotating motor, and, when these magnetic bodies are formed in a straight line, this magnetic structure will become a structure of a linear motor. Although portions other than the permanent magnet such as the case or rotor and electromagnetic coil may be formed from a conductor, it is preferable to form such portions from a nonmagnetic and lightweight body such as resin, aluminum or magnesium so as to enable weight saving, and to realize a rotating driver such a motor having an open magnetic circuit and superior in magnetic efficiency. The magnetic structure of the present invention does not generate iron loss (eddy current loss) since it is of a structure that does not employ iron materials. In other words, the present invention provides a method, device or system for driving a moving body such as a rotor or slider by switching with the likes of a control device the attraction and repulsion between an electromagnetic coil, which is formed by winding a coil around a nonmagnetic body (e.g., winding a conducting sleeve around a nonmagnetic bobbin), and a permanent magnet. In the embodiments described later, a drive device structured from a nonmagnetic stator obtained by forming a coil with a nonmagnetic bobbin is explained.

Figure 49:
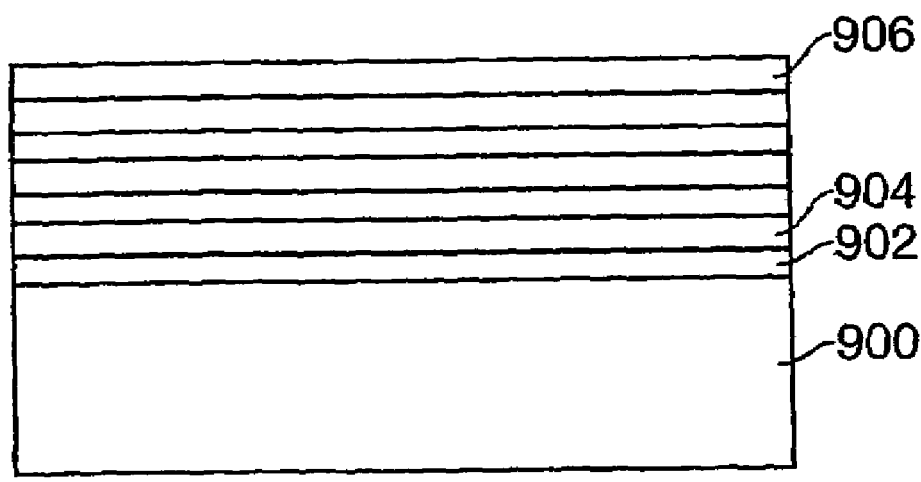
FIG. 49, with (1) and (2) is a diagram showing the cross section structure of the case in order to indicate the surface processing of the case for housing the magnetic structure pertaining to the present invention.
Figure 49:
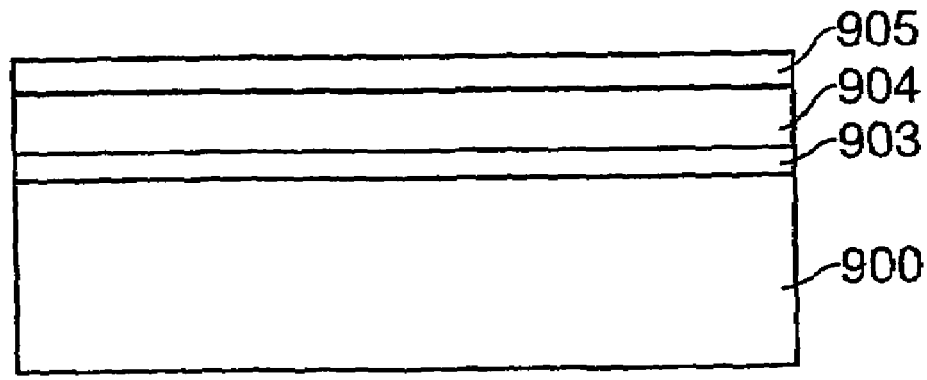

Incidentally, as a result of making the coil bobbin and case from aluminum, a superior cooling effect is yielded in that the internal heat generated from the copper loss can be easily conducted and released to the outside. FIG. 49(1) is a view showing a frame format of the state of a surface-processed case for shielding the magnetic flux leak from the case. The case 900 is subject to copper plating 902 and steel (silicon steel for example) plating 904, and then subject to finishing plating 906. FIG. 49(2) shows a case of applying an undercoating material 903 on the case material, thereafter applying steel (silicon steel for example) containing application material, and then applying a finishing application material 905.

According to this magnetic structure, since the third magnetic body will move upon being subject to the magnetic force from the first magnetic body and second magnetic body, the torque upon moving the third magnetic body will increase, and the weight balance will become superior. Thus, it is possible to provide a miniature and lightweight motor capable of being driven with a high torque.

Figure 6:
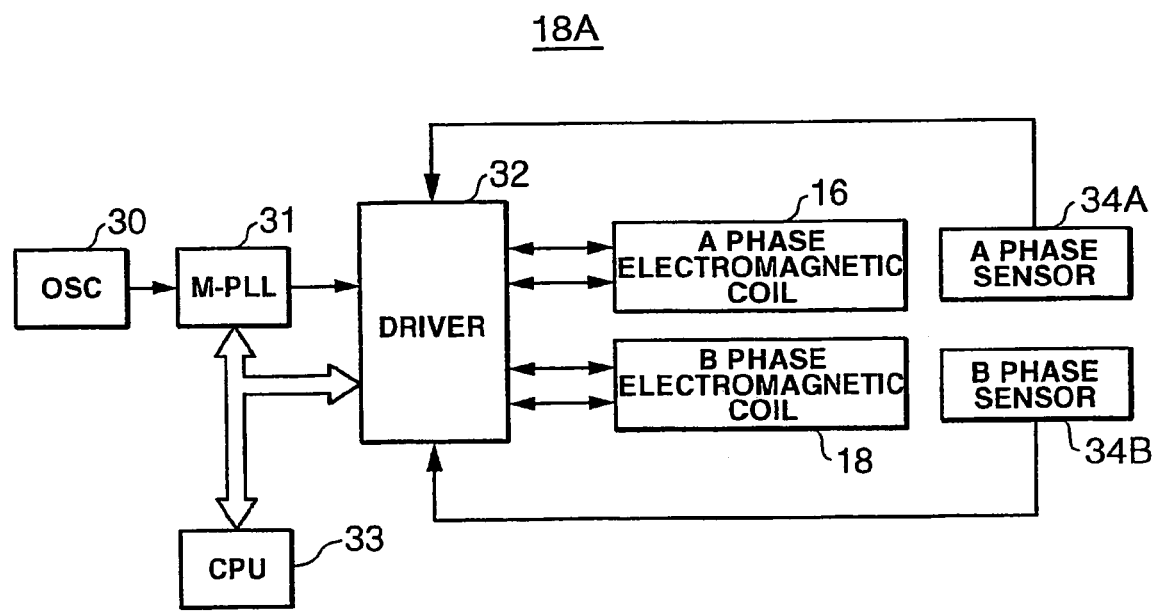
FIG. 6 is a block diagram showing an example of the exciting circuit for applying exciting current to the electromagnetic coil.

FIG. 6 is a block diagram showing an example of the exciting circuit 18A for applying exciting current to the electromagnetic coil (A phase electromagnetic coil) of the first magnetic body and the electromagnetic coil (B phase electromagnetic coil) of the second magnetic body.

This exciting circuit is structured to supply respectively controlled pulse frequency signals to the A phase electromagnetic coil 16 and the B phase electromagnetic coil 18. Reference numeral 30 is a quartz oscillator, and reference numeral 31 is an M-PLL circuit 31 for generating a reference pulse signal upon M-dividing this oscillation frequency signal.

Reference numeral 34 is a sensor for generating a position detection signal corresponding to the rotational speed of the third magnetic body (a rotor in this case) 14. As this sensor, a digital output method or analog output method sensor may be used, and, for instance, a hole sensor (magnetic sensor) or optical sensor may be suitably selected. The rotor is provided with holes in a number corresponding to the number of permanent magnets (in the case of a magnetic sensor, holes will not be necessary by providing a magnetic sensor that responds to the respective permanent magnets of the rotor in relation to the optical sensor unit), and, when the hole corresponds to the sensor, the sensor generates a pulse each time it passes through the hole location. Reference numeral 34A is an A phase side sensor for supplying a detection signal to the driver circuit of the A phase electromagnetic coil, and reference numeral 34B is a B phase side sensor for supplying a detection signal to the driver circuit of the B phase electromagnetic coil.

The pulse signals from these sensors 34A, 34B are respectively output to the driver 32 for supplying exciting current to the first and second magnetic bodies. Reference numeral 33 is a CPU, and outputs a prescribed control signal to the M-PLL circuit 31 and the driver 32.

Figure 7:
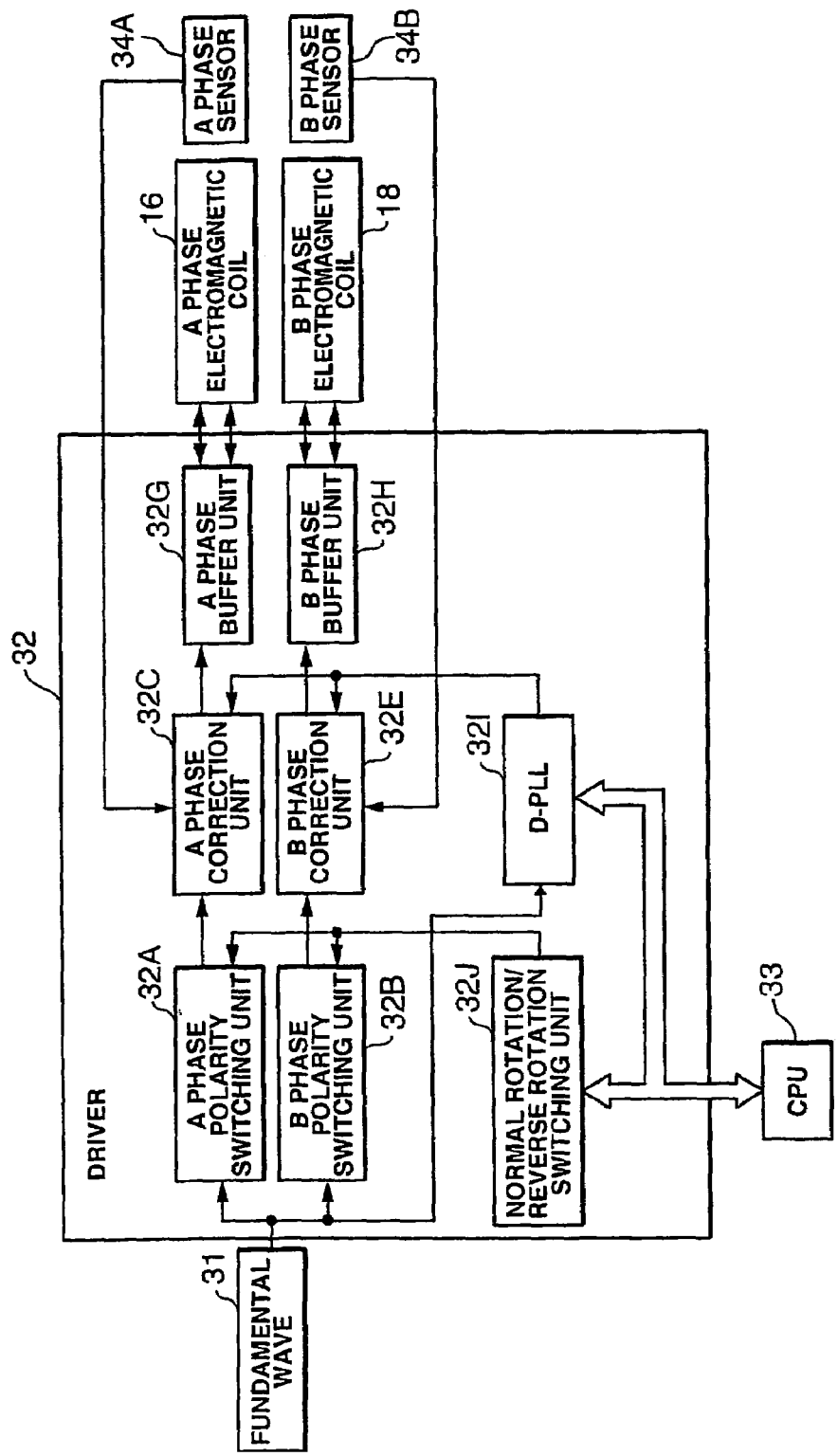
FIG. 7 is a block diagram showing the detailed structure of the driver unit of the exciting circuit.

FIG. 7 is a block diagram showing the detailed structure of the driver unit. This driver unit is structured by comprising an A phase side polarity switching unit 32A, a B phase side polarity switching unit 32B, an A phase side phase correction unit 32C, a B phase side phase correction unit 32E, an A phase buffer 32G, a B phase buffer 32H, a D-PLL circuit 32I, and a normal rotation/reverse rotation switching unit 32J.

To this driver 32 is input a fundamental wave 31 in which an oscillation frequency was M-divided with a quartz oscillator. With this fundamental wave, the polarity is switched with the A phase coil (first magnetic body) polarity switching unit 32A, and then input to the A phase coil phase correction unit 32C. Further, with this fundamental wave 31, the phase is controlled with the B phase coil (second magnetic body) phase switching unit 32B and then output to the B phase coil phase correction unit 32E.

The control signal of the CPU 33 is output to the switching unit 32J of the normal rotation (forward)/reverse rotation (backward) of the rotor or slider, and the switching unit 32J controls the foregoing A phase and B phase polarity switching units 32A, 32B under the control of the CPU 33 and in accordance with the normal rotation/reverse rotation.

Output from the A phase sensor 34A is output to the A phase coil phase correction unit 32C, and output from the B phase sensor 34B is output to the B phase coil phase correction unit 32E. Further, the fundamental wave output from the A phase polarity switching unit 32A and in which the polarity has been switched is output to the A phase correction unit, and the fundamental wave from the B phase polarity switching unit is output to the B phase correction unit 32E. Moreover, frequency signals in which the fundamental wave is further multiplied at a phase-locked dividing ratio (D) in the D-PLL circuit 32I are respectively input to the A phase side phase correction unit 32C and the B phase side phase correction unit 32E.

The CPU 33 changes the frequency of the fundamental wave with the readout value (M) by reading the M dividing ratio from a prescribed memory in order to control the rotational speed of the rotor or the speed of the slider, which is the third magnetic body, based on the input information from the operation input means not shown. Further, as described later, this also applies to the dividing ratio (D) of the D-PLL. These dividing ratios change in accordance with the value of the operational characteristics of the magnetic body; for instance, the rotational speed of the rotor and moving speed of the slider, and these variation characteristics are preset and prestored in a prescribed memory area in a memory table format.

The A phase side phase correction unit 32C and the B phase side phase correction unit 32E correct the phases of the A phase exciting frequency signal and B phase exciting frequency signal so as to become synchronized with the signals of the foregoing sensors 34A, 34B so as to output an exciting frequency signal in which the A phase coil and B phase coil respectively and mutually have a suitable phase difference so as to rotate or advance the rotor or slider, which is the third magnetic body.

The A phase buffer unit 32G is a circuit means for supplying a phase-corrected frequency signal to the A phase coil, and the B phase buffer unit 32H is a circuit means for supplying a phase-corrected frequency signal to the B phase coil.

Figure 8:
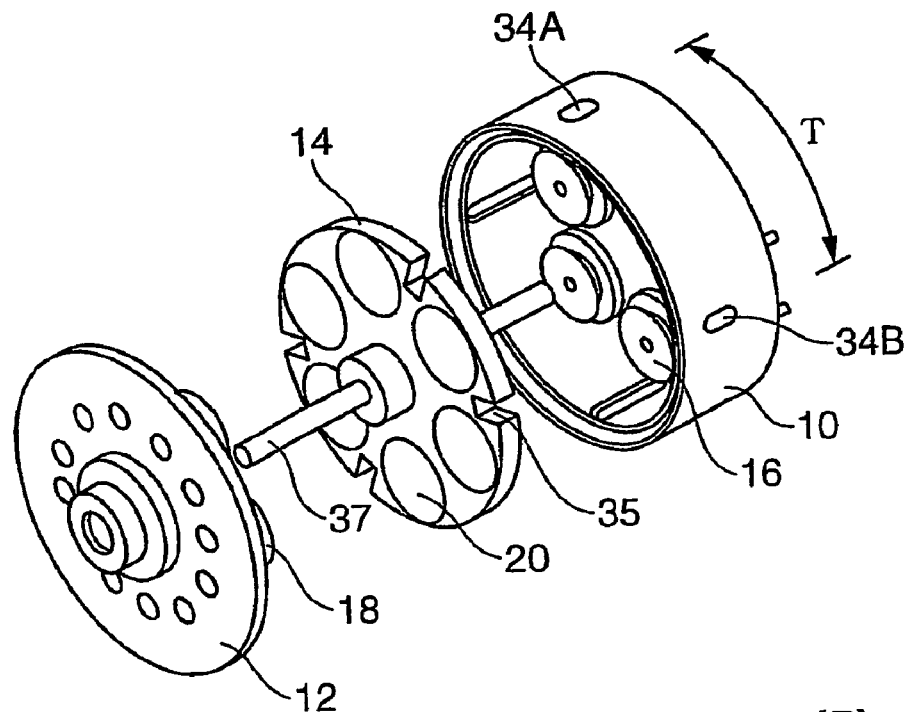
FIG. 8 is a diagram showing the materialization of the magnetic structure as a synchronous motor, wherein FIG. 8(1) is a perspective view of the motor.
Figure 8:
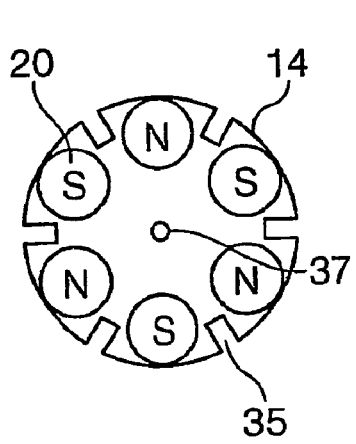
Figure 8:
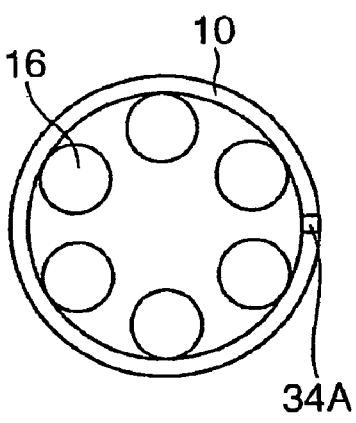
Figure 8:
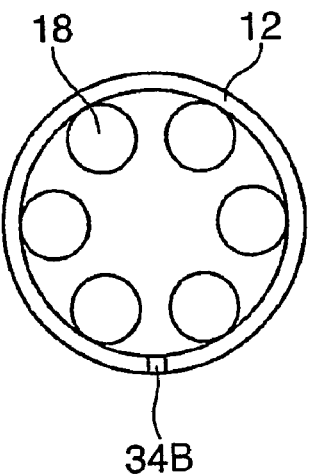
Figure 8:
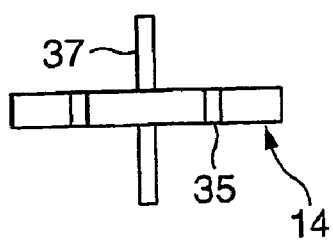

FIG. 8 is a diagram showing the materialization of the magnetic structure as a synchronous motor, wherein FIG. 8(1) is a perspective view of the motor; FIG. 8(2) is a schematic plan view of the rotor (third magnetic body); FIG. 8 (3) is a side view thereof; FIG. 8 (4) shows the A phase electromagnetic coil (first magnetic body); and FIG. 8(5) shows the B phase electromagnetic coil (second magnetic body). The reference numerals indicated in FIG. 8 are the same as the structural components corresponding to the foregoing diagrams.

This motor comprising a pair of A phase magnetic body 10 and B phase magnetic body 12 corresponding to a stator, as well as the third magnetic body 14 structuring a rotor, and the rotor 14 is disposed between the A phase magnetic body and the B phase magnetic body and rotatably around the axis 37. In order for the rotor and rotational axis to rotate integrally, the rotational axis 37 is press fitted into a rotational axis aperture. As shown in FIG. 8(2), (4) and (5), six permanent magnets are provided to the rotor in equal intervals around the circumferential direction thereof. Polarities of the permanent magnets are made to be mutually opposite, and six electromagnetic coils are provided to the stator in equal intervals around the circumferential direction thereof.

The A phase sensor 34A and B phase sensor 34B are provided to the sidewall inside the case of the A phase magnetic body (first magnetic body) via a specified distance T (distance corresponding to Π/2) . Applied to the distance between the A phase sensor 34A and B phase sensor 34B is a distance corresponding to a value for providing a prescribed phase difference to the frequency signal supplied to the A phase coil 16 and the frequency signal supplied to the B phase coil 18.

As described above, a plurality of holes 35 (for instance, a number equivalent to the number of permanent magnets disposed evenly around the circumferential direction of the rotor; six holes in the present embodiment) is formed evenly at the edge in the circumferential direction of the rotor formed in a circle. The sensor is structured from a light-emitting unit and a light-reception unit. A member is employed in this hole for constantly reflecting the infrared light from the light-emitting unit of the sensor and absorbing this at the time of detecting the position.

Here, A phase and B phase sensors generate a pulse each time the hole 35 passes through the sensor while the rotor 14 is rotating. In other words, a concave groove for absorbing light or a light-absorption material is provided to the hole 35, and, each time the hole passes through the sensor, the light-reception unit of the sensor does not receive the light emitted from the light-emitting unit. Therefore, the sensor generates a wave pulse of a prescribed frequency in accordance with the rotational speed of the rotor 14 and the number of holes.

Figure 9:
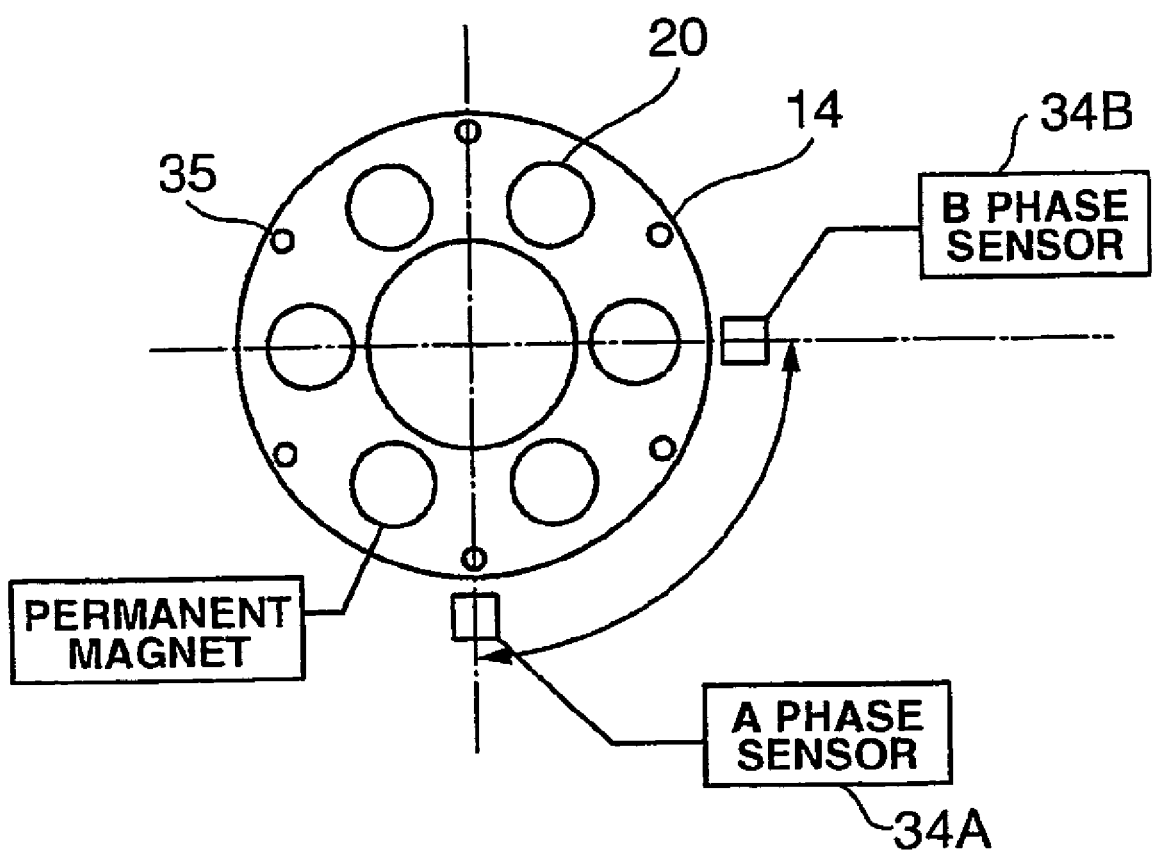
FIG. 9 is a view showing the frame format of the positional relationship of the respective phase coil drive sensors in relation to the rotor comprising a permanent magnet.

FIG. 9 is a plan view of the rotor (disk) 14 comprising a permanent magnet 20 for generating a magnetic field in the horizontal direction (circumferential direction). In the foregoing embodiments, although the respective phase sensors were formed with a combination of optical sensors 34A, B and holes 35, magnetic sensors (MR sensors) may be used instead. Further, although the hole 35 was formed between magnets, the hole may also be provided to the permanent magnet portion. Here, the positional relationship of the A phase sensor and B phase sensor must be inverted.

Figure 10:
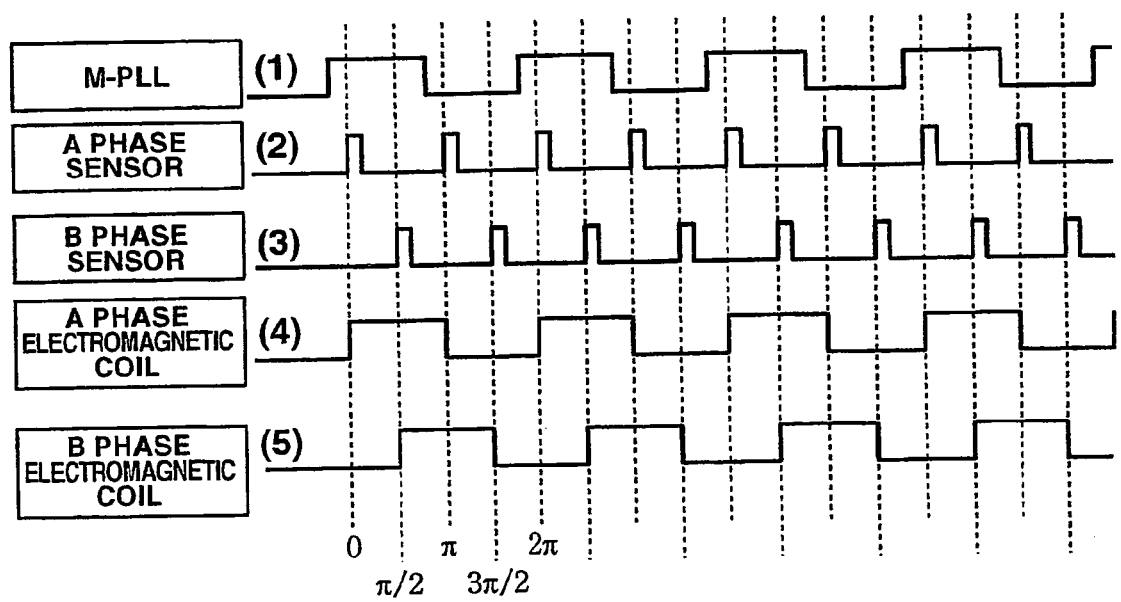
FIG. 10 is a waveform chart pertaining to the signal processing for the coil exciting frequency signal formed in the driver.

FIG. 10 is a waveform chart pertaining to the signal processing for the coil exciting frequency signal formed in the driver 32. In the following explanation, it would be useful to refer to FIG. 8 as necessary. (1) is a reference frequency waveform, (2) is a signal from the A phase sensor 34A, and (3) is a signal from the B phase sensor 34B. As described above, the A phase sensor and B phase sensor are installed in the motor so as to output a prescribed phase difference (Π/2 in this case) (c.f. FIG. 8).

The A phase side phase correction unit 32C implements the conventional PLL control, synchronizes the phase of the output waveform (2) of the A phase sensor and the phase of the fundamental wave (1), and outputs a wave pulse such as (4) for exciting the A phase coil 16 to the A phase coil buffer circuit 32G. This buffer circuit structure will be described later.

With an input pulse having a frequency, the buffer circuit PWM-controls a transistor in this buffer circuit for energizing exciting current to the A phase coil. The same applies to the operation of the B phase side phase correction unit 32E. (5) is a drive waveform output from the B phase side phase correction unit 32E to the B phase electromagnetic coil buffer circuit 32H. As evident upon comparing (4) and (5), phases of the exciting signal supplied to the A phase coil 16 and the exciting signal supplied to the B phase coil 18 mutually differ, and the phase difference is Π/2.

Figure 11:
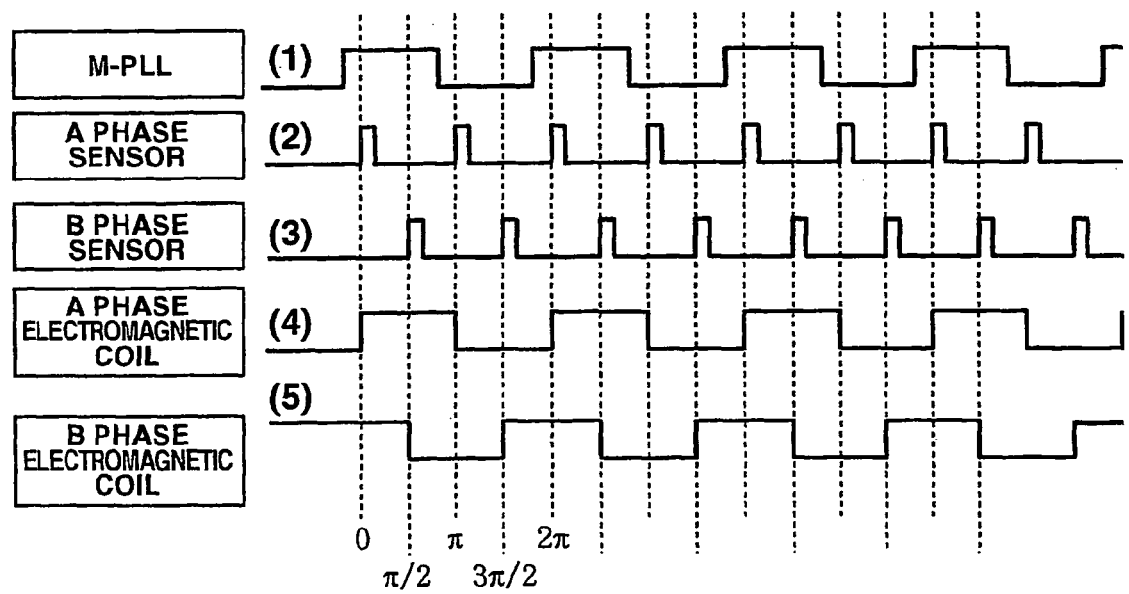
FIG. 11 is a signal waveform when the rotor or slider is inverted.

FIG. 11 is a signal waveform when the rotor or slider is inverted. When comparing this waveform with the waveform illustrated in FIG. 10, the polarity of the exciting wave pulse to be supplied to the B phase electromagnetic coil 18 is inverted in FIG. 11, and this is the only difference. FIG. 10(5) and FIG. 11(5) will now be compared. Upon switching from FIG. 10 to FIG. 11, a brake is applied to the rotating direction of FIG. 10.

Figure 12:
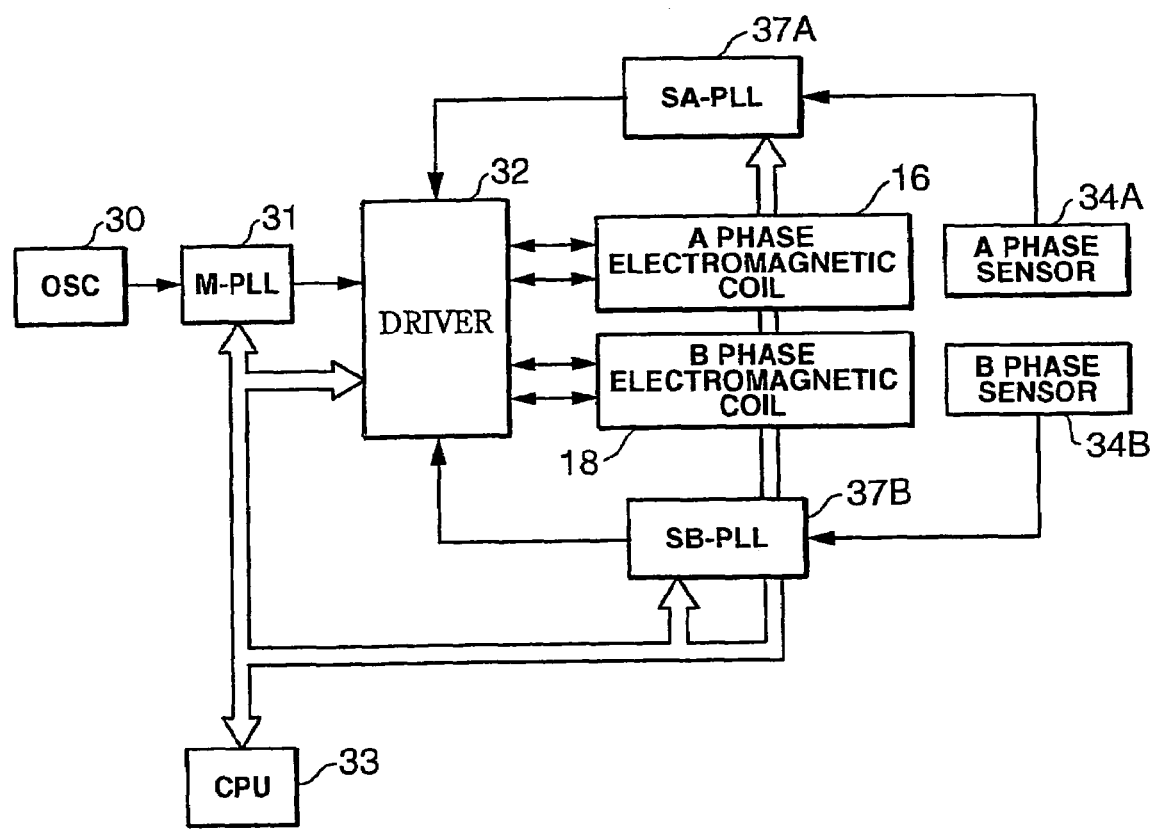
FIG. 12 is a circuit block diagram showing another embodiment of the coil exciting circuit.

Next, another embodiment of the coil exciting circuit is explained with reference to FIG. 12. The point in which the circuit pertaining to the present embodiment differs from the circuit illustrated in FIG. 7 is that an SA-PLL control circuit 37A for dividing and SA-multiplying the pulse signal from the A phase sensor, and, similarly, an SB-PLL control circuit 37A for dividing and SB-multiplying the pulse signal from the B phase sensor are provided in order to supply the pulse signal having a divided frequency to the respective phase correction units (32C, 32E) of the driver 32.

Figure 13:
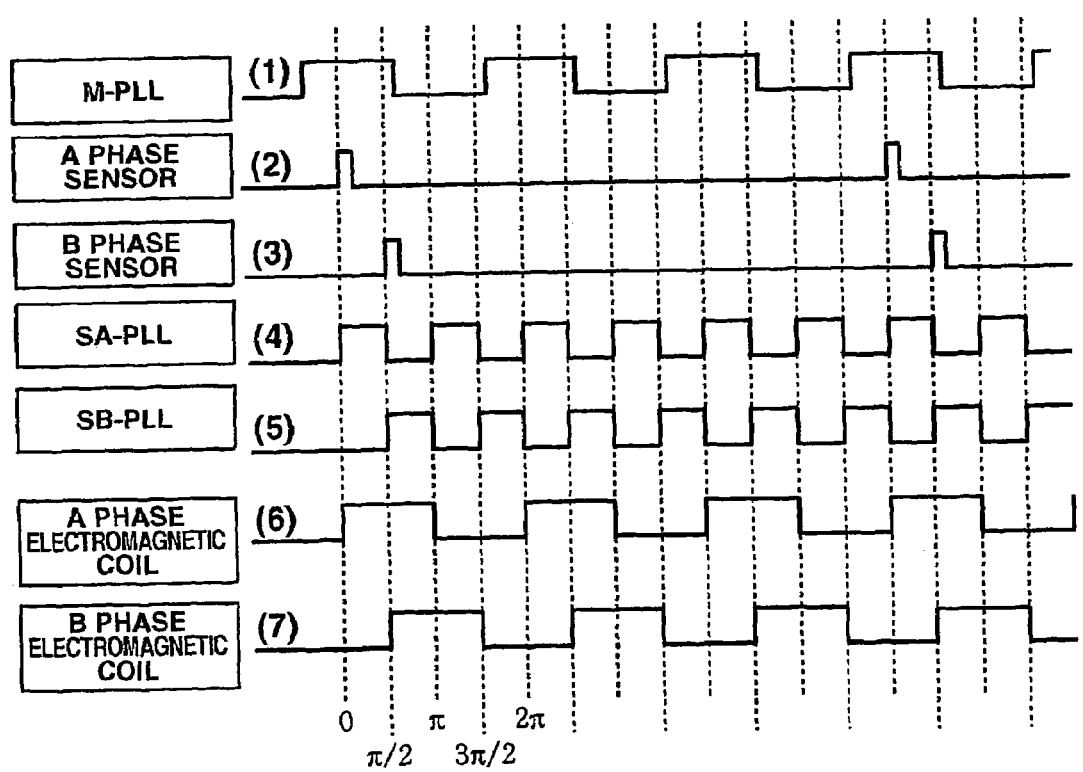
FIG. 13 is a waveform chart pertaining to the signal processing performed in the exciting circuit structured as illustrated in FIG. 10.

This circuit is adopted when the hole 35 is provided in only one location to the rotor 14 of the motor (FIG. 8) described above. FIG. 13 is a waveform chart pertaining to the signal processing performed in the exciting circuit structured as depicted in FIG. 12. As shown in FIG. 13(2) and (3), the frequency of the detected wave output from the respective sensors of the A phase and B phase is ⅙ the case illustrated in FIG. 10. In other words, a single pulse is output each time the rotor makes a single rotation.

The frequency of the pulse waveform output from the A phase sensor is multiplied by six in the SA-PLL 37A so as to become the waveform depicted in (4), and the frequency of the wave pulse from the B phase sensor shown in (5) is similarly multiplied by six in the SB-PLL 37B so as to become the waveform depicted in (5).

The frequency-corrected phases of the wave pulse from the sensor and wave pulse of the fundamental wave are synchronized, and a drive signal having a waveform shown in FIG. 13(6) is supplied from the A phase coil phase correction unit 32C to the A phase coil buffer circuit 32G. Similarly, a drive signal having the waveform shown in (7) is supplied from the B phase coil phase correction unit 32E to the B phase coil buffer circuit 32H.

Figure 14:
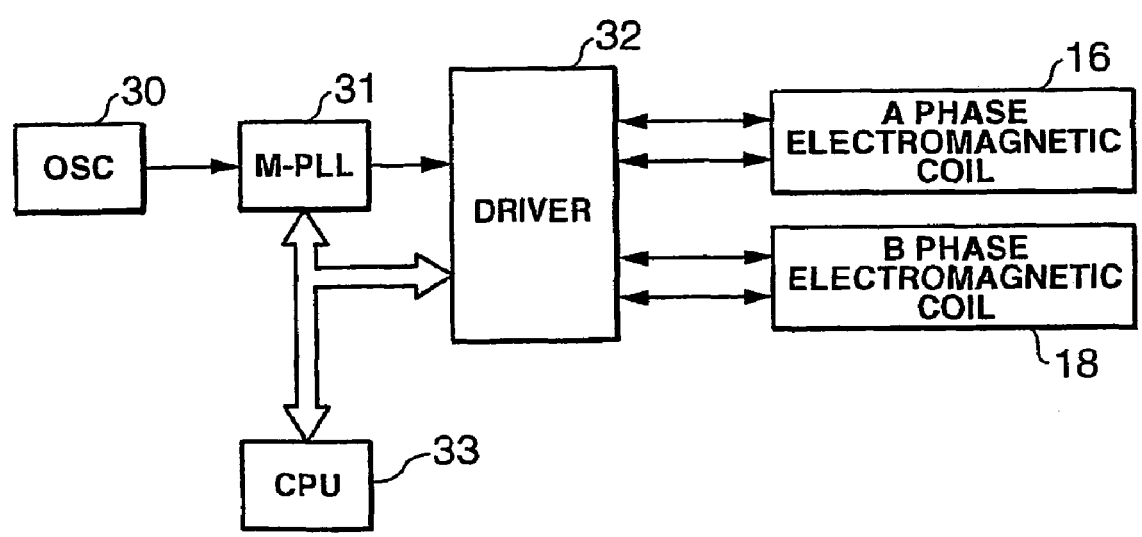
FIG. 14 is a block diagram showing the circuit structure in a case of employing a magnetic structure without comprising a sensor.
Figure 15:
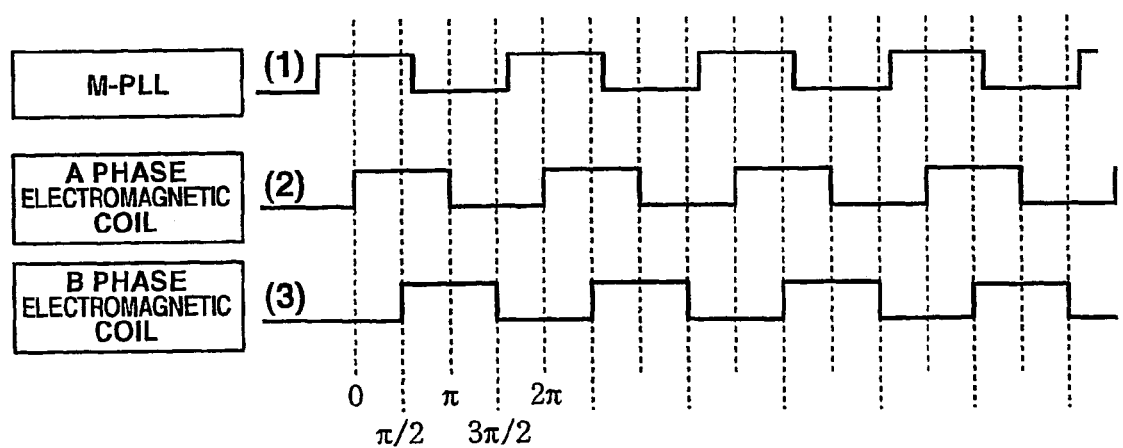
FIG. 15 is a waveform chart for explaining the operation of the phase correction in relation to the circuit structure illustrated in FIG. 14.

FIG. 14 is a diagram showing a drive with an open loop, without having to use the A phase sensor 34A and B phase sensor 34B illustrated in FIG. 6, by exciting the A phase electromagnetic coil and B phase electromagnetic coil in accordance with the frequency from the M-PLL 31, and without having to return the signal from the sensor to the driver. And, as shown in FIG. 15, drive signals having the same frequency are supplied to the A phase electromagnetic coil and B phase electromagnetic coil having a 90-degree phase difference based on the signal from the M-PLL 31.

Figure 16:
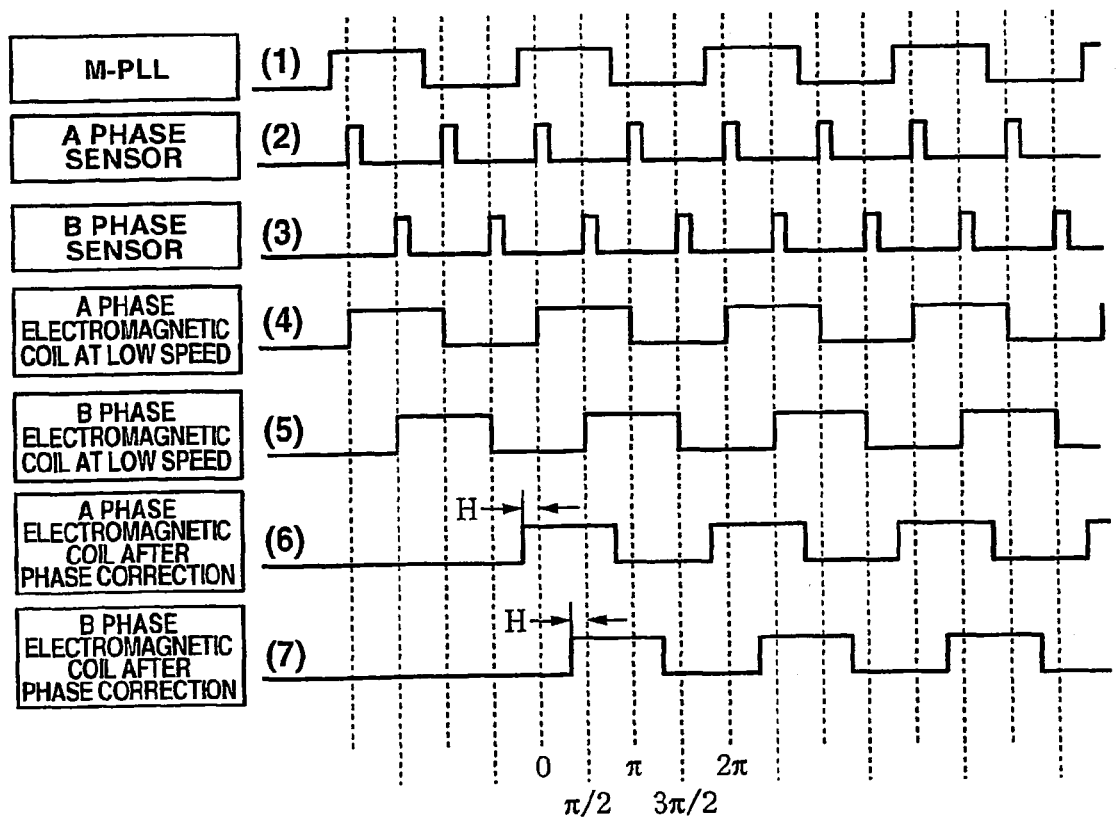
FIG. 16 is a waveform chart in the signal processing when the rotational speed of the rotor becomes high.

FIG. 16 is a waveform chart in the signal processing when the rotational speed of the rotor (c.f. FIG. 8) becomes high. The characteristic aspect of this processing is in that, when the rotational speed of the rotor becomes high, in order to compensate for the influence of the inertial force pertaining to the rotation of the rotor, the phase of the exciting current is corrected to a phase of the exciting current in a case of the rotational speed of the rotor is within a range where such influence does not exist.

(1) to (5) are the same as the waveform characteristics illustrated in FIG. 10. The waveforms of FIG. 10 are obtained as a result of performing signal processing in a case of the rotational speed of the rotor is within a range where such influence does not exist. When the rotational speed of the rotor becomes high, switching of the exciting polarity of the respective electromagnetic coils of the stators (10, 12) in relation to the rotation of the rotor is delayed, and a repressive influence in relation to the control request for trying to increase the rotational speed of rotor will arise. Thus, as shown in the A phase side exciting current waveform (6), the phase has been advanced for an H amount than the A phase side exciting current waveform (4) in the case where the rotor is rotating a low speed or medium speed. This also applies to the B phase side coil (c.f. (5) and (7)).

In order to shift the phase, the phase correction unit (32C, 32E) counts the wave pulses obtained with the D-PLL 32I explained in FIG. 7, and utilizes this count value. The shift amount (H) of the phase is predetermined by the rotational speed of the rotor, and stored in a memory in a table format. The CPU depicted in FIG. 7 operates the rotational speed of the rotor from the detection signal of the sensors 34A, B, and determines the specific phase shift amount. Further, the CPU also determines the dividing ratio (D) of the D-PLL 32I from the table in accordance with the rotational speed of the rotor.

Figure 17:
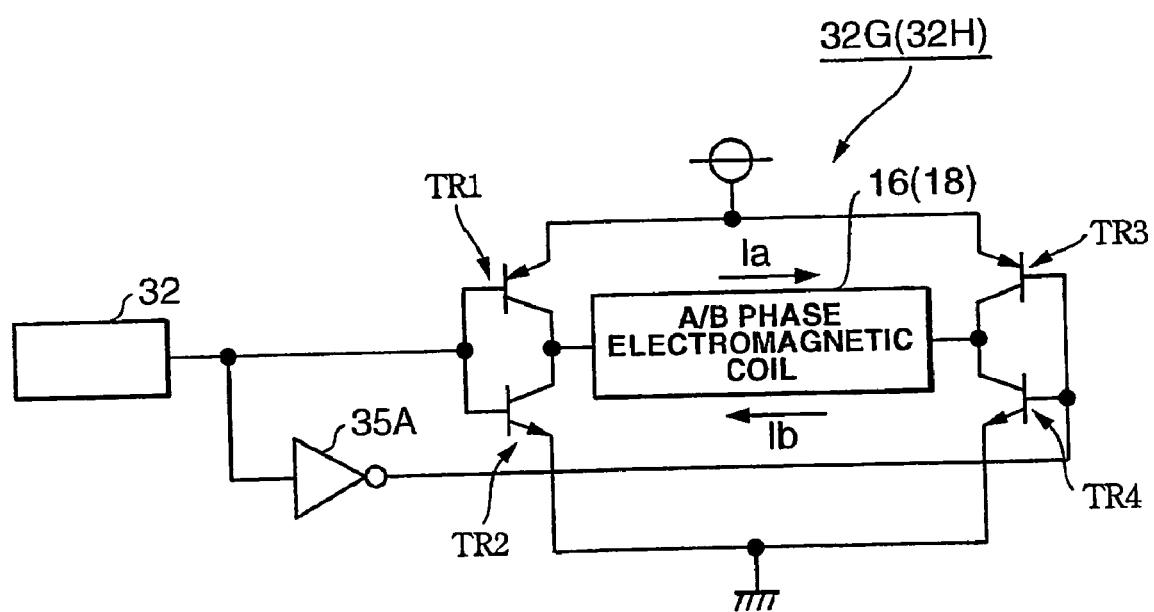
FIG. 17 is a detailed diagram of the A phase and B phase buffer circuits described above.

FIG. 17 is a detailed diagram of the A phase and B phase buffer circuits (32G, H) described above. This circuit includes switching transistors TR1 to TR4 for applying exciting current formed of a wave pulse to the A phase electromagnetic coil or B phase electromagnetic coil. Further, the circuit also includes an inverter 35A.

Here, when "H" as the signal is applied to the buffer circuit, TR1 is turned off, TR2 is turned on, TR3 is turned on and TR4 is turned off, and the exciting current having an Ib direction is applied to the coil. Meanwhile, when "L" as the signal is applied to the buffer circuit, TR1 is turned on, TR2 is turned off, TR3 is turned off and TR4 is turned on, and current having an Ia direction, which is opposite to Ib, is applied to the coil. Therefore, the respective exciting patterns of the A phase electromagnetic coil and B phase electromagnetic coil may be alternately changed. This is as per the explanation made with respect to FIG. 1.

Figure 18:
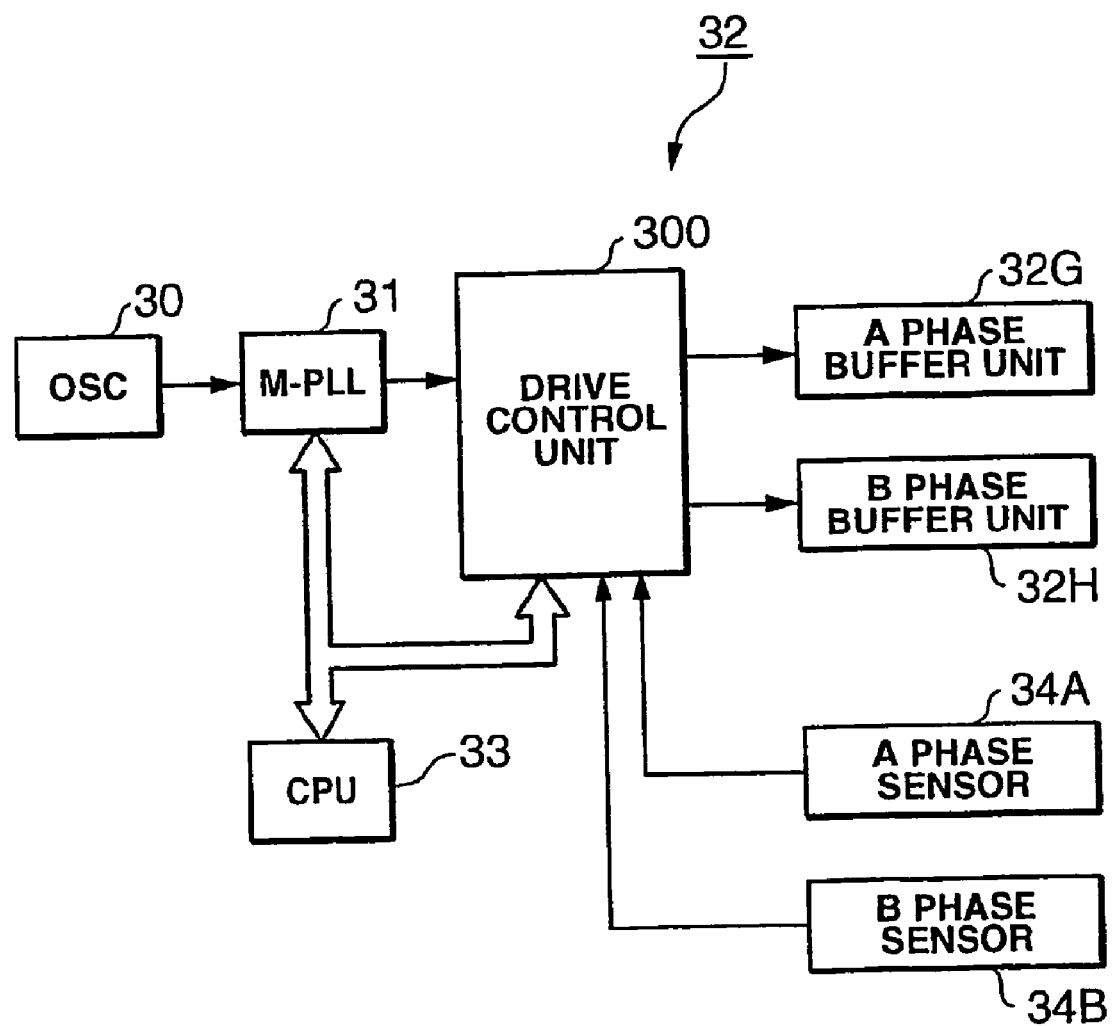
FIG. 18 is a block diagram showing another embodiment of the driver unit illustrated in FIG. 6.

FIG. 18 is another embodiment thereof, and the portion differing from the driver unit 32 illustrated in FIG. 7 is in that a drive control unit 300 is provided instead of the polarity switching unit and phase correction unit. This drive control unit is capable of performing rotation control to the A phase side coil and B phase side coil, respectively, and it is also capable of performing rotation control to the coil only on one phase side.

Figure 19:
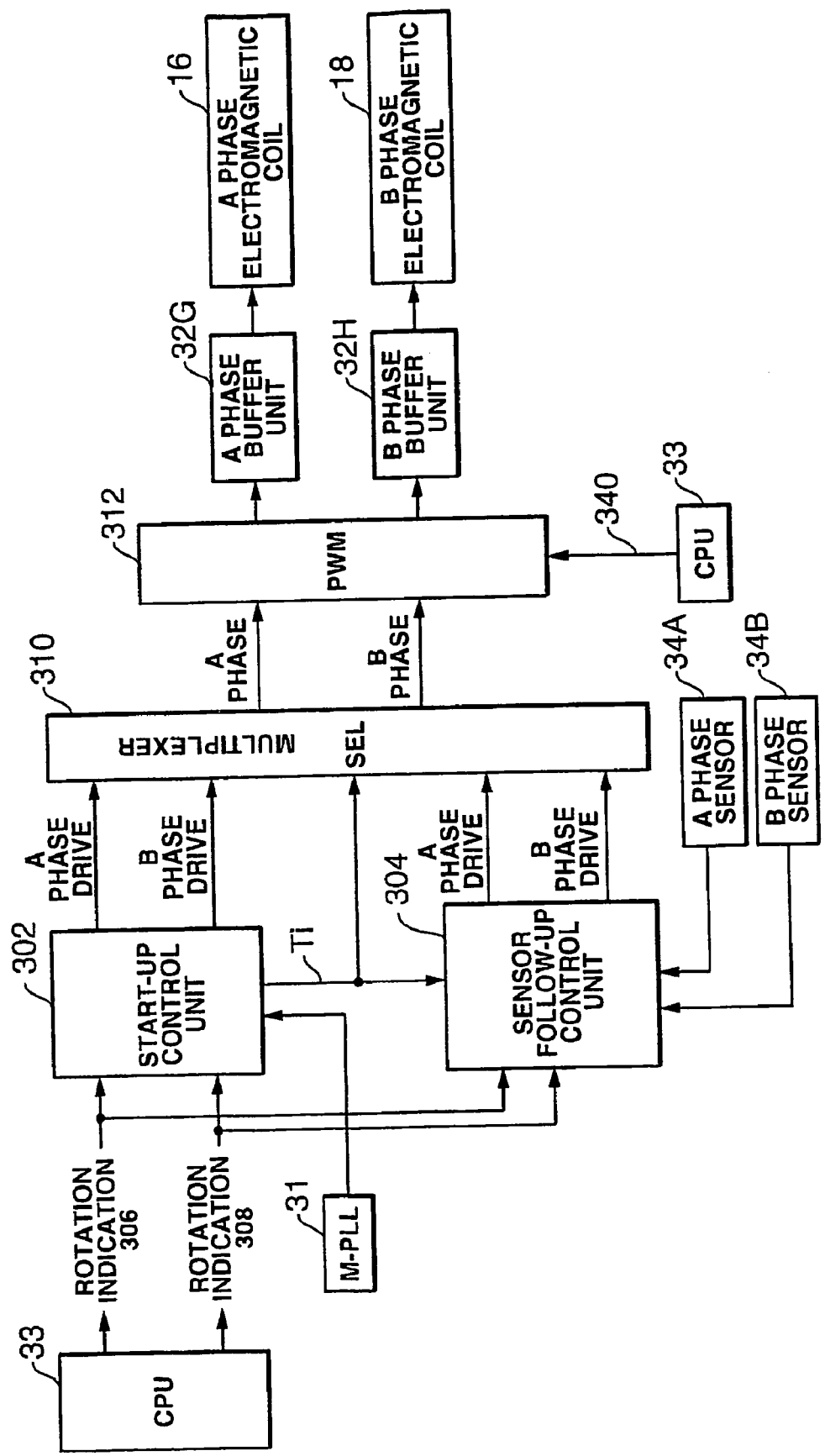
FIG. 19 is a detailed block diagram of the driver unit illustrated in FIG. 6.

As shown in FIG. 19, this drive control unit is structured from an A phase coil, a B phase coil start-up control unit 30, and a sensor follow-up control unit 304. The start-up control unit is for controlling the start-up of the motor, and the sensor follow-up control unit implements the operation for making the signal wave supplied to the respective phase coils follow and synchronize with the detected pulse from the respective phase sensors by returning such detected pulse, without having to supply a fundamental wave to the buffer unit after the start-up of the motor. The frequency from the quartz oscillator 30 is divided with the M-PLL 31, and this is supplied to the drive control unit 300.

In FIG. 19, the rotation start/stop indication 306 and rotating direction indication 308 from the CPU 33 are input to the start-up control unit 302 and the sensor follow-up control unit 304. Reference numeral 310 is a multiplexer, and switches the control output from the start-up control unit and the output from the sensor follow-up control unit. The output (fundamental wave) from the D-PLL 32I is supplied to the start-up control unit 302. With the multiplexer 310, a switching command value for switching the output from the start-up control unit 302 and the output (A phase drive, B phase drive) from the sensor follow-up control unit 304 is output from the start-up control unit 302 to the input terminal SEL of the multiplexer. The start-up control unit 302 outputs to the multiplexer 310 and the sensor follow-up control unit 304 the output Ti for converting the control mode from the post start-up control phase to the sensor follow-up control phase. Moreover, the exciting current to be supplied to the start-up control unit during the start-up of the motor may be a low frequency (for example, approximately 10 Hz).

Figure 20:
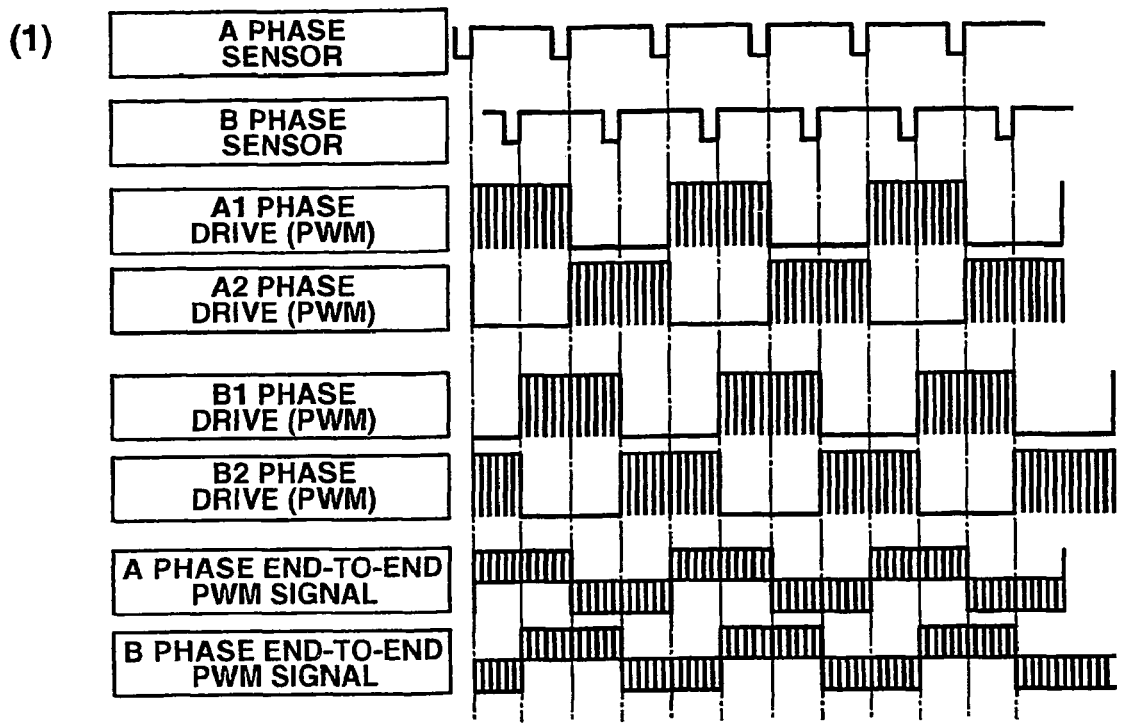
FIG. 20 is a PWM control waveform characteristic chart of the exciting current output to the coil.
Figure 20:
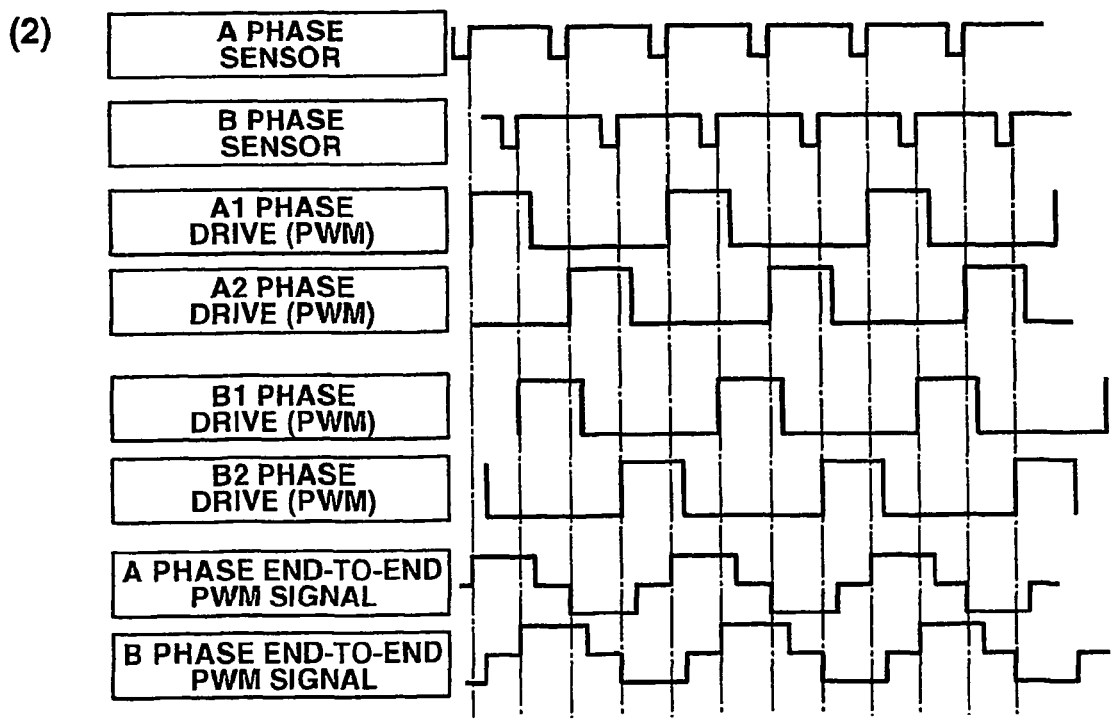

Reference numeral 312 is a PWM control unit, and the duty ratio of the drive signal supplied to the respective coils based on the duty ratio command value 340 from the CPU 33 is changed. FIG. 20(1) and (2) are waveform characteristic charts in which the duty ratio has been controlled, and, with the H period of the respective drive outputs of the A phase and B phase, the duty ratio is changed under the control of the CPU. For instance, the duty ratio may be set to 100% at the time when maximum torque of the motor (load) is required (at the time of start-up, acceleration, and increase/variation in the load), and, in other cases; for example, during the running of the motor at a constant speed or during a low load, the duty may be lowered. The CPU seeks the load fluctuation of the motor by measuring the sensor output from the A phase side magnetic body and B phase side magnetic body, and determines the prescribed duty ratio from the table set and stored in the memory. The characteristic chart of (2), in comparison to the characteristic chart of (1), shows a control mode enabling the switching control of the duty ratio in a more favorable energy conversion efficiency.

Figure 21:
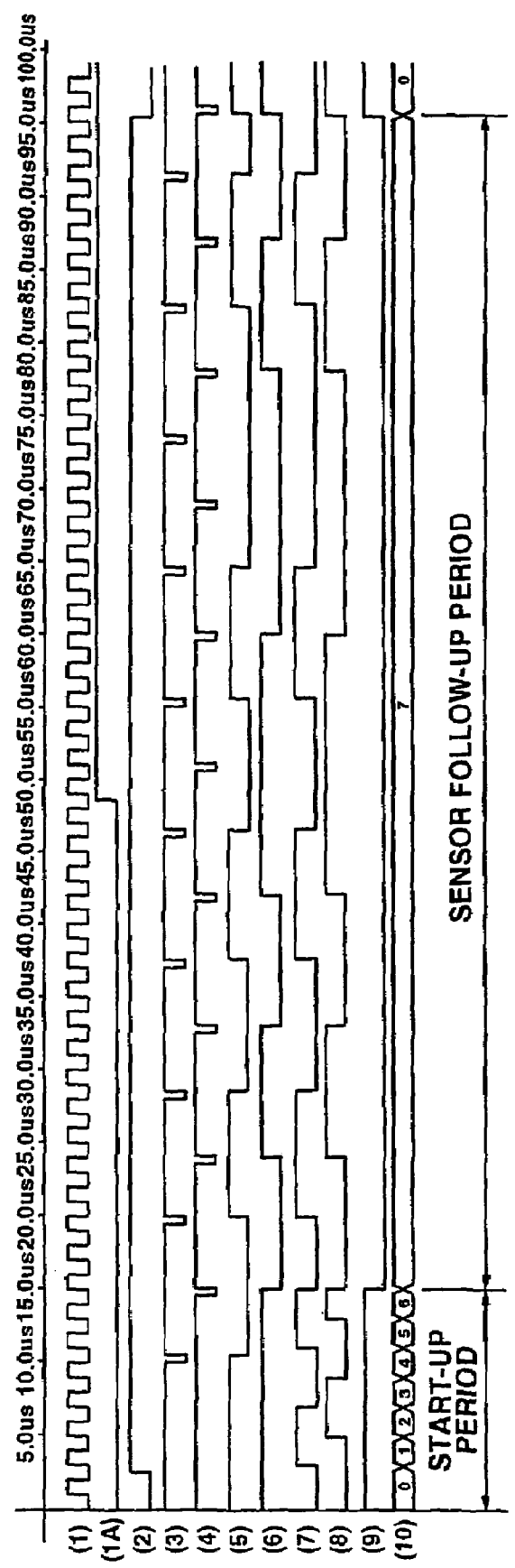
FIG. 21 is a waveform characteristic chart according to the block structure illustrated in FIG. 19.

FIG. 21 is a waveform characteristic chart in the circuit illustrated in FIG. 18; wherein (1) is the M-PLL wave pulse; (2) is the motor start flag; (3) is the A phase sensor output; (4) is the B phase sensor output; (5) is the flip-flop output based on the output of the A phase sensor; (6) is a flip-flop output based on the output of the B phase sensor; (7) is an output pulse waveform to the A phase coil; (8) is an output pulse waveform to the B phase coil; (9) is the start-up period of the motor; (10) is the count value of the counter corresponding to the start-up period; and (1A) is a normal rotation/reverse rotation flag of the motor. The multiplexer depicted in FIG. 19 outputs the start-up control unit 302 during the edge period of (9) above, and switches to the sensor follow-up control unit 304 during the L period, and these are shown in (7) and (8).

Here, when the rotating direction and rotation indication are output from the CPU to the start-up control unit 302 and the sensor follow-up control unit 304, the start-up control unit raises a flag informing the start-up period within the memory (c.f. FIG. 21(9)). The start-up control unit 302 counts the wave pulse in an amount of 2Π (for instance, a total of seven pulses) of the M-PLL 31. During this period ((10)), without having to follow the output from the sensor, as shown in FIG. 21(7) and (8), the start-up control unit creates a drive signal based on the frequency from the M-PLL in relation to the respective coils of the A phase and B phase, outputs this to the respective phase coils, and starts up the motor. The start-up control unit resets the start-up flag after the start-up period.

After the start-up period, the sensor follow-up control unit 304 generates a drive signal to the respective phase coils from the output of the respective phase sensors (FIG. 21(3), (4)) via the flip-flop (FIG. 21(5), (6)). During the sensor follow-up control period after the start-up period, the sensor follow-up control unit 304 does not employ the output of the M-PLL for generating the drive signal to the respective phase coils. After the start-up period, the CPU outputs to the multiplexer 310 a switching command to be sent to the sensor follow-up circuit. The multiplexer switches the output from the start-up control unit to an output from the sensor follow-up control unit, and outputs this to the PWM control unit 312. At the PWM control unit, after the duty ratio of the drive output to the respective phase coils has been changed and adjusted, or controlled, this is sent to the buffer circuits 32G, H of the respective phase coils. During a low rotation, since the respective phase sensors are not being used, an operation may be employed for performing rotational speed control in which the M-PLL frequency is changed only during the start-up period.

Figure 22:
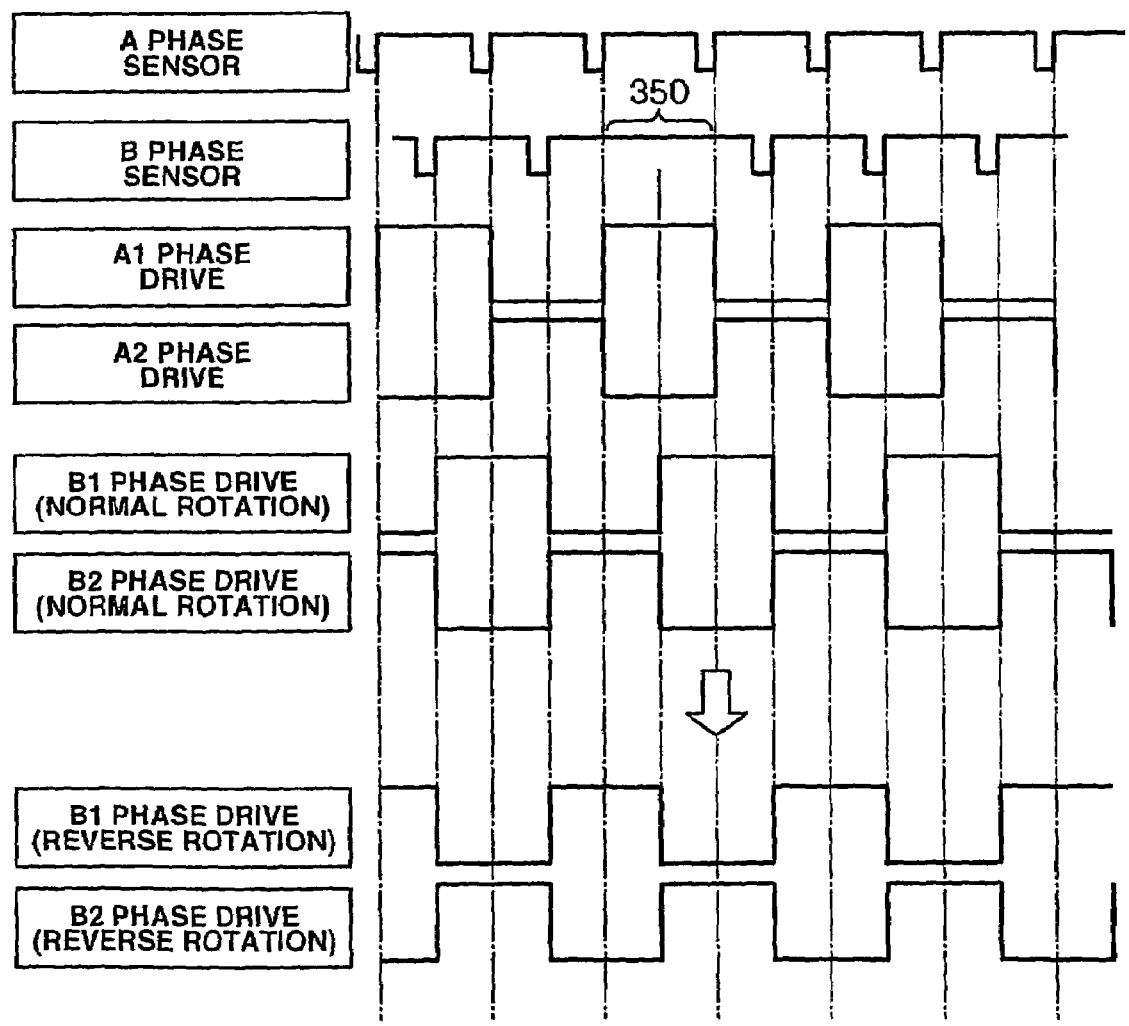
FIG. 22 is a waveform control characteristic chart upon inverting the motor.

During the reverse rotation of the motor, when the reverse rotation command is made from the CPU to the start-up control unit or the sensor follow-up control unit, a reverse rotation flag is raised (FIG. 21(1A)), the sensor follow-up control unit 304 once masks the output of the B phase sensor during the rotating direction displacement zone period (reference numeral 350 in FIG. 22) after such flag is set, and switches the polarity of the normal rotation exciting signal of the B phase coil to the polarity of the B phase (during reverse rotation) during the masking. As a result, behavior of the motor from a normal rotation to a reverse rotation will become smooth. Or, a reverse rotation flag may be set during a normal rotation, and a braking effect against the normal rotation can be obtained.

According to the embodiment described here, after the start of the motor, the drive control unit is able to supply the exciting signal corresponding accurately to the load fluctuation of the motor since the exciting signal to be sent to the A phase magnetic body and B phase magnetic body has been formed as a result of having followed the output of the sensor. Further, when not much torque is required in the motor, after a steady rotation, A phase or B phase may be stopped. In such a case, the magnetic body of the phase in which the exciting signal has been stopped may become a power generation means or braking control means in a state other than an unexcited state.

Figure 23:
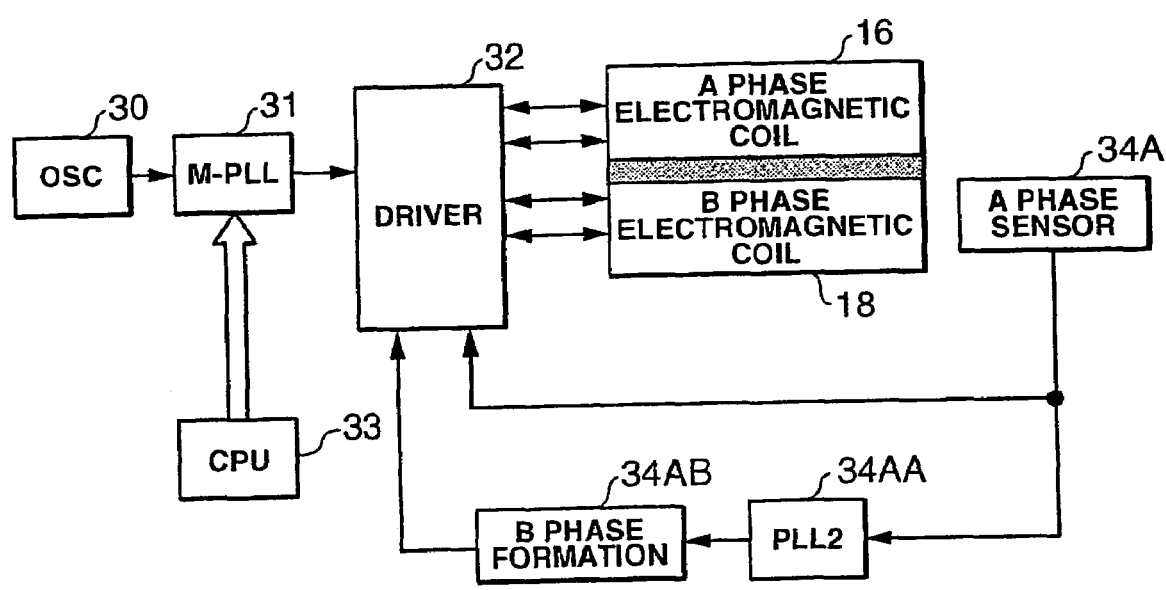
FIG. 23 is a block diagram showing another embodiment of the exciting circuit for applying exciting current to the electromagnetic coil.
Figure 24:
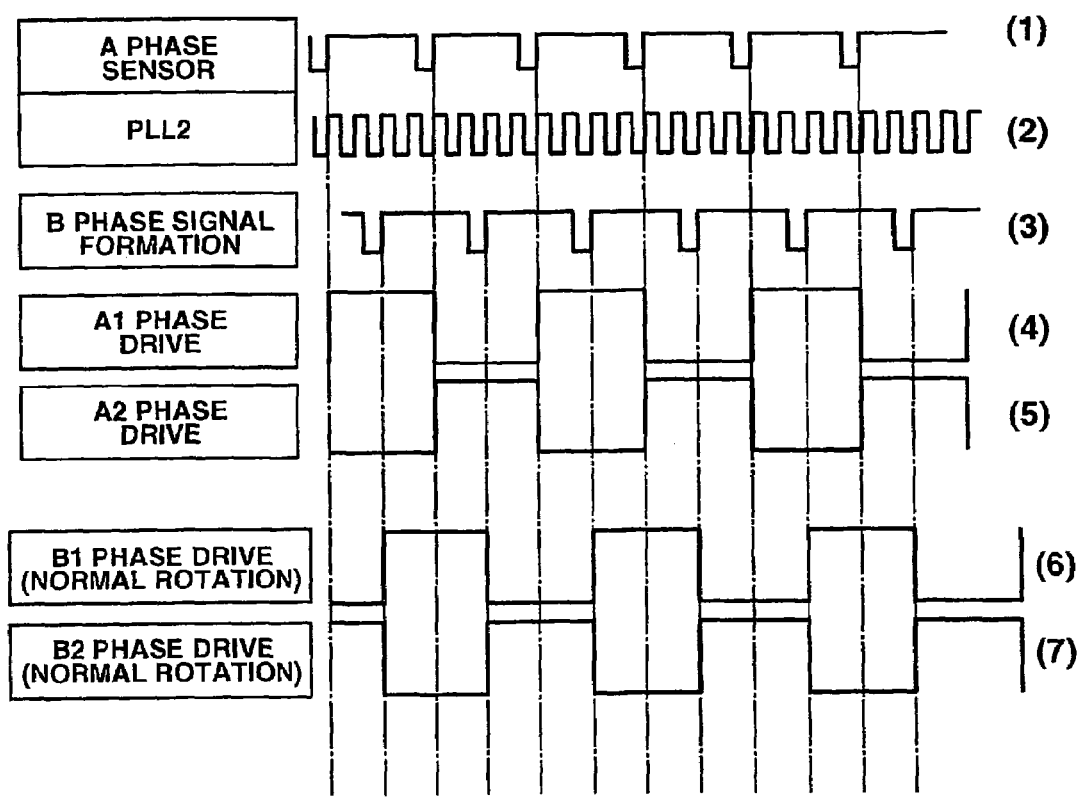
FIG. 24 is a waveform chart thereof.

FIG. 23 is a modified example of the exciting circuit (FIG. 14) for applying exciting current to the electromagnetic coil, and differs in that the sensor 34A is provided to only one phase side. In other words, the output frequency from the A phase sensor is N-multiplied at PLL2, and a simulation detected pulse frequency 34AB for controlling the B phase coil is formed based on the foregoing clock. FIG. 24 is a control waveform characteristic chart of the circuit illustrated in FIG. 23, a B phase coil control signal (3) is formed in accordance with the clock frequency.

Figure 25:
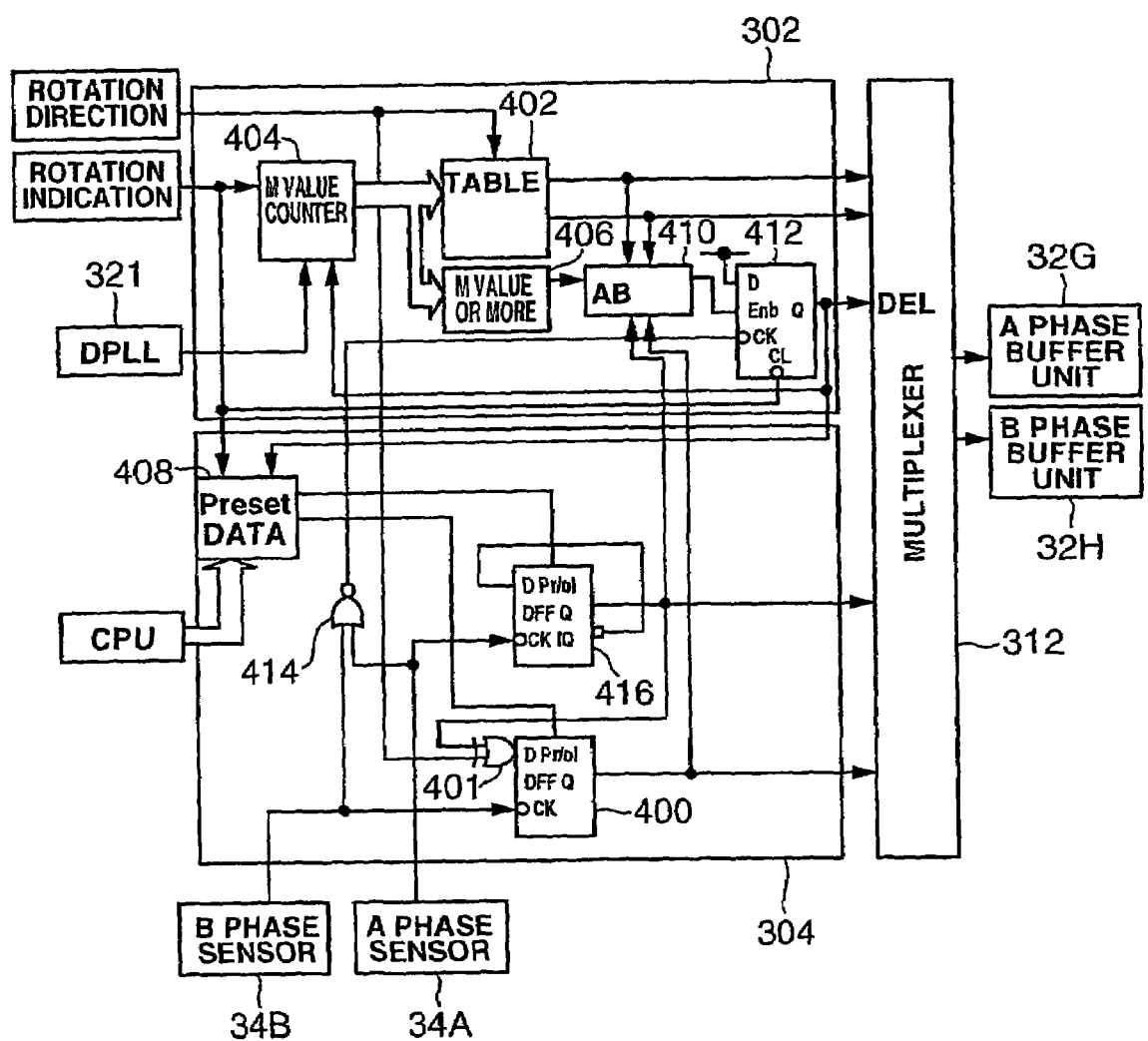
FIG. 25 is a block diagram showing another embodiment of the start-up control unit and sensor follow-up control unit.
Figure 26:
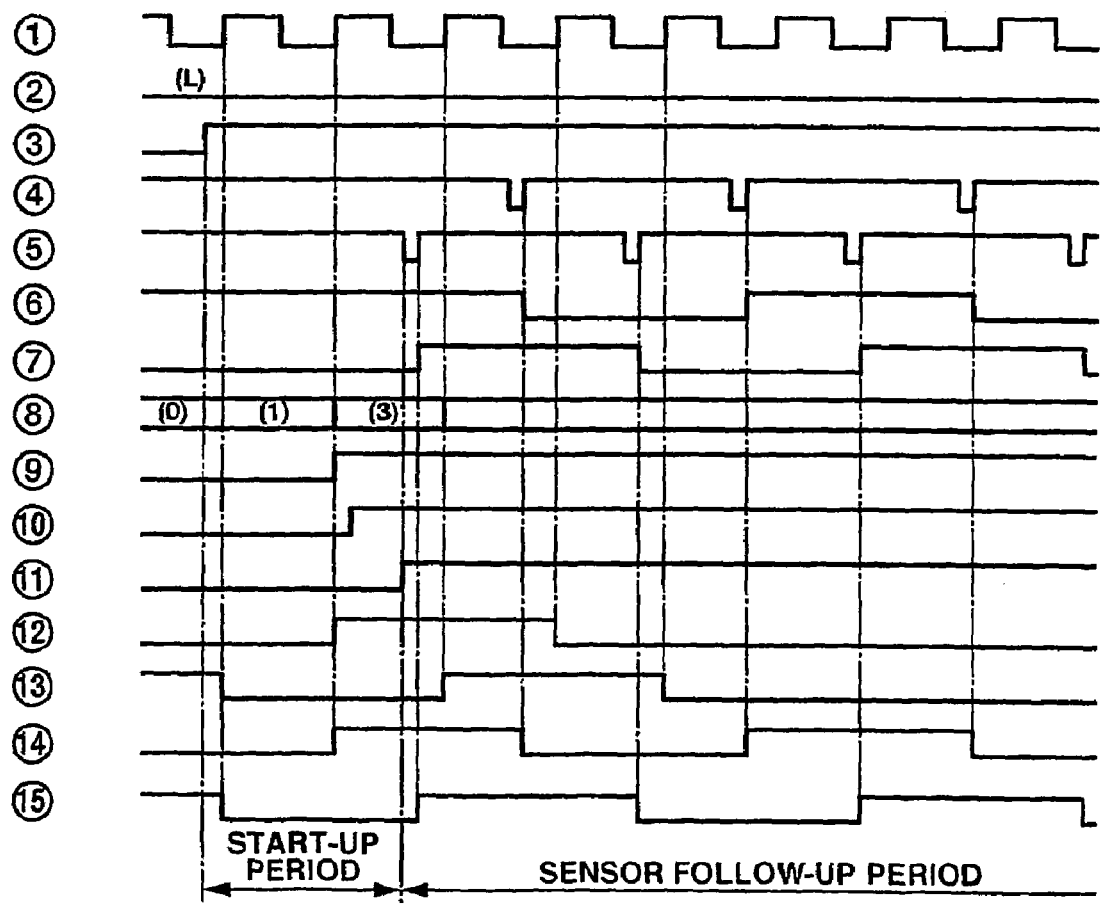
FIG. 26 is the control waveform chart thereof.

Next, FIG. 25 is a block diagram showing another embodiment of the start-up control unit and sensor follow-up control unit depicted in FIG. 19, and FIG. 26 is the control waveform timing chart thereof. Reference numerals of the signal lines illustrated in FIG. 25 correspond to the reference numerals of the control waveform depicted in FIG. 25. FIG. 26 shows the waveform of the signal lines with reference numerals.

Indication output (2) of the rotating direction from the CPU is output to the EX-OR circuit 401 of the D input of the D flip-flop 400. Further, this output (2) is output to the TABLE 402 structured from a logic circuit forming outputs (12) and (13) described later. The rotation start indication output (3) and M-PLL clock (1) from the CPU are output to the M value counter 404.

With the output value (8) of the M value counter, TABLE 402 and a prescribed N value are output to the recognition/identification circuit 406. The foregoing rotation start support output (3) is also output to the preset circuit 408 of the sensor value control unit. The A phase drive start output (12) and B phase drive start output (13) from the TABLE 402 are output to the multiplexer 312. The A phase drive output (12) and B phase drive output (13) are output to the AB phase comparator 410. Output from the AB phase comparator 410 is output to the Enable terminal of the D flip-flop 412. The Q output (11) of the D-FF 412 is output to the select termination of the multiplexer 312. The D input of the D-FF 412 is constantly excited to a level. The output (9) of the identification circuit 406 is output to the AB phase comparing circuit. An A phase coil exciting signal is supplied from the multiplexer 312 to the A phase buffer 32G. Similarly, a B phase coil exciting signal is supplied to the B phase buffer 32H. The output (11) of the Q terminal of the D-FF 412 is supplied to the M value counter 404. The output (11) is supplied to the preset circuit 408.

The position detection outputs (5) and (4) of the B phase sensor 34B and A phase sensor 34A are output to the NOR circuit 414. The output (5) is input to the D-FF 400 clock. The output (4) is input to the D-FF 416 clock. The output of the OR circuit 414 is supplied to the clock input of the D-FF 412. The Q output (7) of the D-FF 400 is supplied to the multiplexer 312 and the AB phase comparing unit 410. The Q inverter output of the D-FF 416 is supplied to the D terminal. The Q output (6) of the D-FF 416 is supplied to the multiplexer 312 and the AB phase comparing unit 410. The Q output of the D-FF 416 is supplied to the input of the EX-OR circuit 401. Under the control of the CPU, the preset circuit 408 supplies the preset output to preset terminals of the D-FF 400, 416.

Next, the operation of the logic circuit block illustrated in FIG. 25 is explained. This circuit forms A/B phase coil exciting signals (12) and (13) at the start of the motor with the start-up control unit, supplies this to the multiplexer, and supplies the exciting signal from the multiplexer to the A phase coil and B phase coil. Thereafter, when the motor starts to rotate, the A/B phase coil exciting signals synchronized with the A phase sensor and B phase sensor are formed at the sensor follow-up control unit, and these are supplied to the respective phase coils. Output of the start-up control unit and output of the sensor follow-up control unit are switched with the switching signal (11) to be supplied to the select terminal (SEL) of the multiplexer, and then supplied to the respective phase coils.

In accordance with the output (8) of the M value counter, the TABLE 402 forms exciting signals (12) and (13) for exciting the respective phase coils. The A phase coil and B phase coil to which the foregoing exciting signal has been supplied rotates the rotor (reference numeral 14 of FIG. 8) comprising a permanent magnet. When the rotor rotates, a detection pulse is output from the A phase sensor and B phase sensor. When the B phase sensor detects the rotation of the rotor and detects the position detection output (5), the NOR circuit 414 outputs a clock to the FF 412. When the A phase sensor detects the rotation of the rotor and generates a position detection output (4), this is supplied to the clock input of the FF 416. When this clock is input, an A phase coil drive signal (6) is formed. The detected output of the B phase sensor is supplied to the FF 400, and a B phase coil drive signal (7) is created thereby.

When the count value of the counter becomes 2 or more, the identification circuit 406 outputs an activation signal to the AB phase comparing circuit 406. This based on the premise that while the count value of the counter is within three clocks, an H level pulse is output from either the A phase sensor or B phase sensor. In the start-up period, since the exciting signals (12) and (13) are output, the AB phase comparing circuit 406 outputs an H level (10) to the ENABLE terminal of the FF 412. As a result, the FF 412 is activated, and, when the sensor side output is supplied to the clock input, supplied to the multiplexer 312 is a switching output (11) for switching the outputs (12) and (13) to be supplied to the coil to (6) and (7).

While receiving the input (H) of the output (11), the counter will not count the new clock (1). Although the reset circuit 408 is controlled with the CPU during the start-up period and supplies the preset output to the FF 400 and 416, when the input of the signal (11) is at the preset circuit, the preset state of the FF 400 and 416 will be released.

Figure 27:
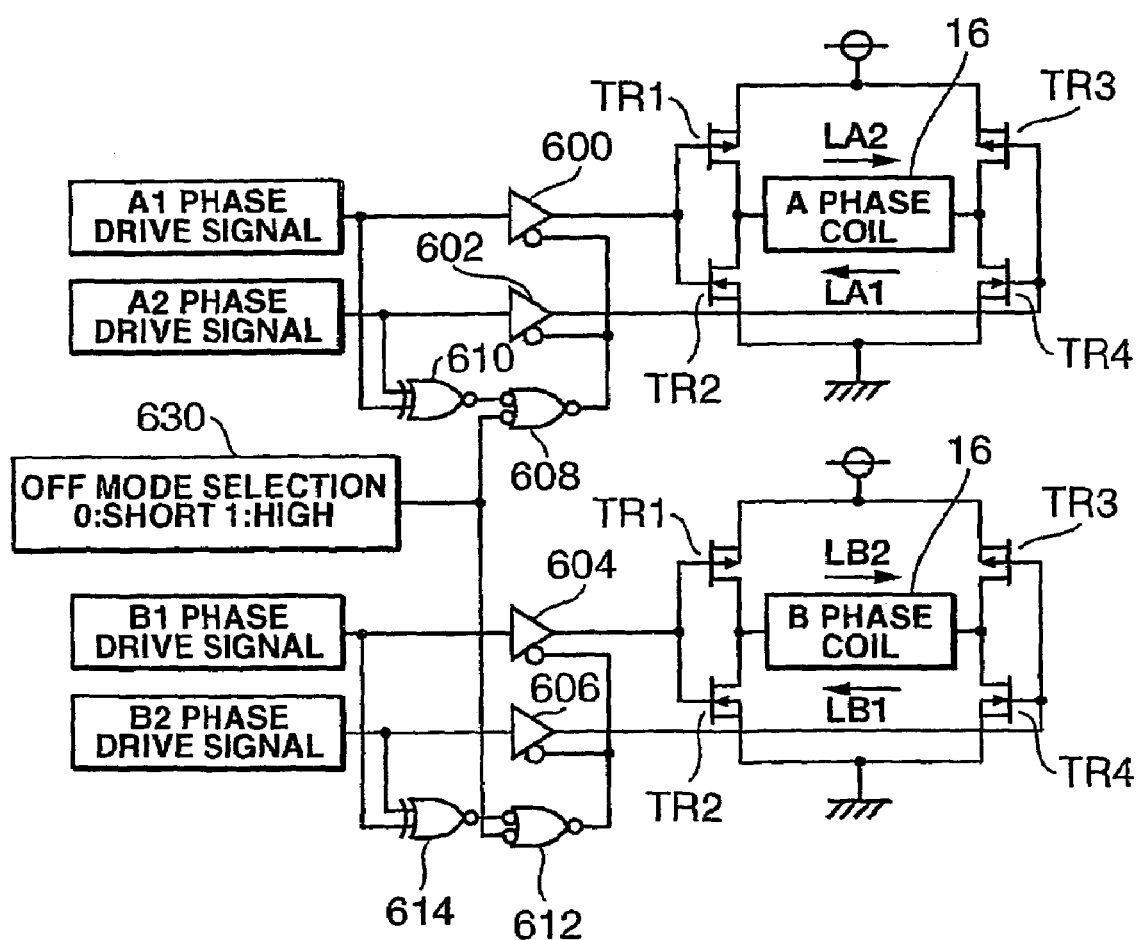
FIG. 27 is a block diagram showing another embodiment of the drive of the respective phase coils.

Next, another embodiment of the A phase coil drive buffer circuit and B phase coil drive buffer circuit, different from FIG. 17, will be explained with reference to FIG. 27. This embodiment differs from the one in FIG. 17 as follows. The A1 phase drive signal is supplied to the buffer 600, the A2 phase drive signal is supplied to the buffer 602, the B1 phase drive signal is supplied to the buffer 604, and the B2 phase drive signal is supplied to the buffer 606. The drive signal of the respective phases are supplied to the EX-NOR circuits 610, 614, and the output of this circuit is supplied to one terminal of the AND circuits (negative logic OR) 608, 612. Supplied to the other end of the AND circuits 608, 612 is the output of the OFF mode selection circuit 630. The output of the AND circuit is returned to the buffer. The selection circuit 630 is for selecting the OFF state (regenerative brake or inertia rotation) of the motor in a rotating state, and, in the regenerative brake state, an "L" level output is generated from the selection circuit with the CPU. In a stopped state, since the drive signal of the respective phases is also an "L" level, the buffers, 600, 602, 604, 606 are turned ON, the "L" signal is supplied to the transistor on both sides of the A phase coil and B phase coil and become a state of short circuit. Therefore, the motor is subject to regenerative braking, and may be utilized as a power generator. Meanwhile, when the motor selects "H", these buffers are turned OFF, contact points at both ends of the coil become free, and the motor is subject to inertial rotation.

Figure 28:
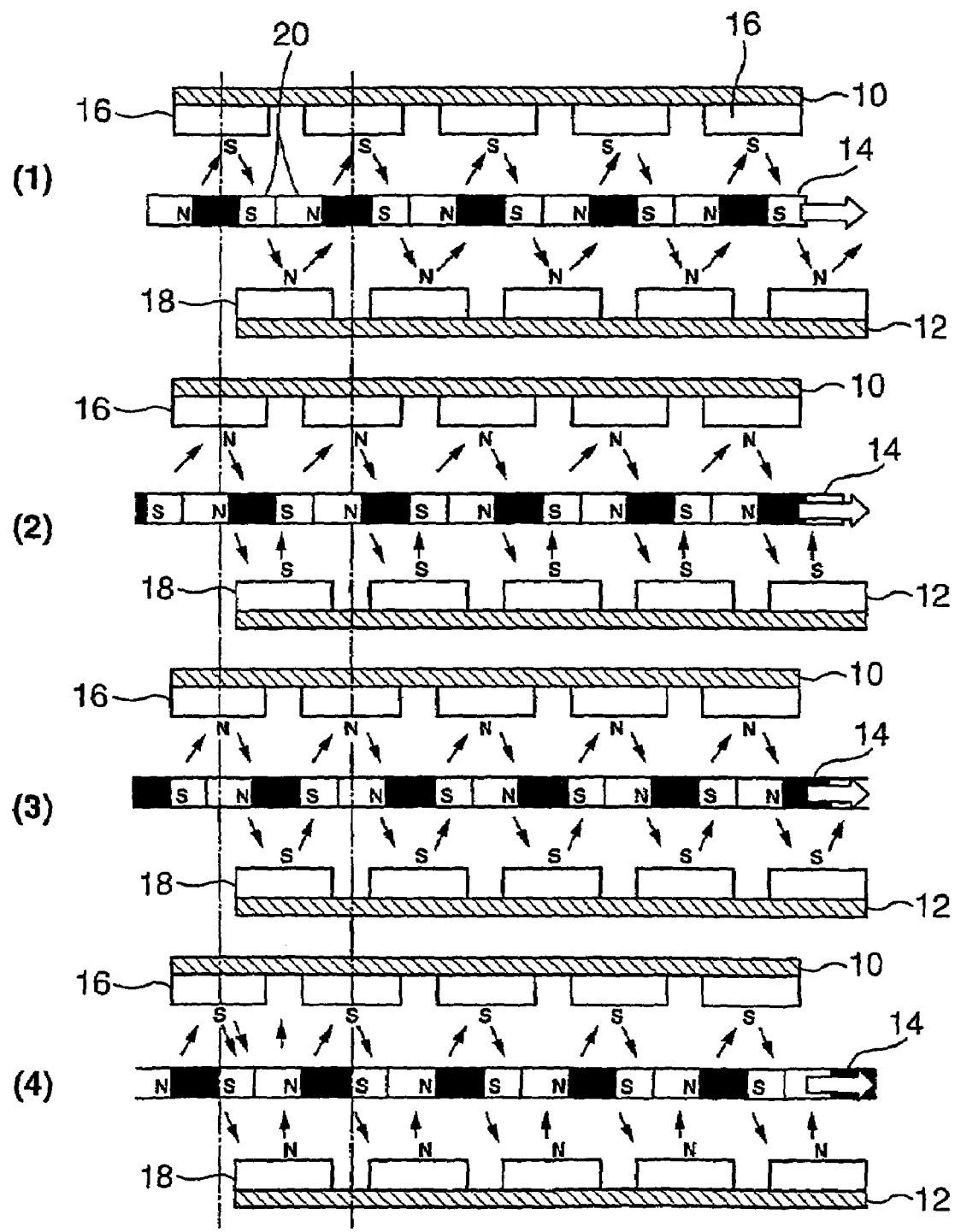
FIG. 28 is a view showing the frame format and operational principle of the second magnetic structure according to the present invention.
Figure 29:
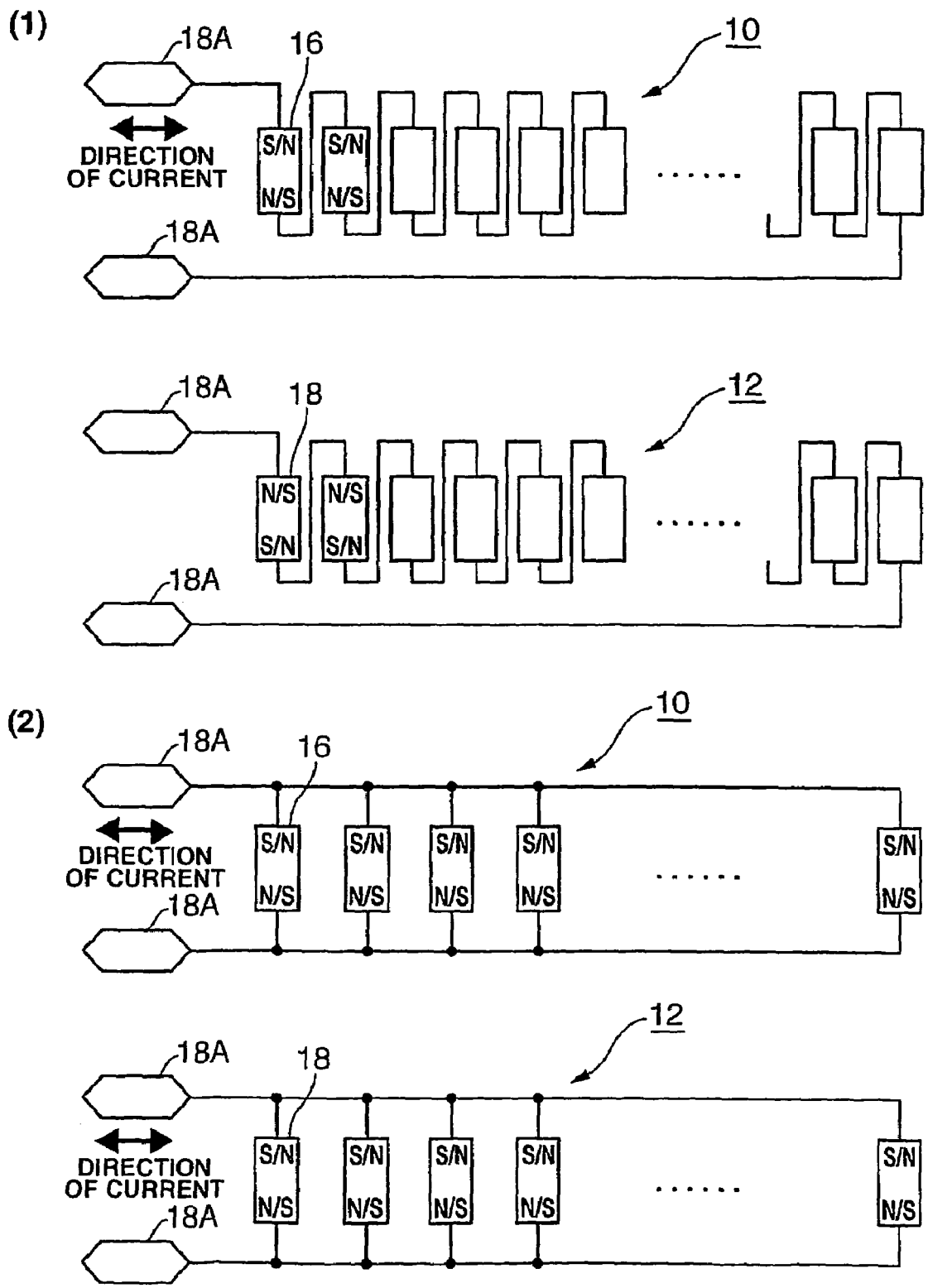
FIG. 29, with (1) and (2) is an equivalent circuit diagram showing the connection state of the electromagnetic coil illustrated in FIG. 28.

Next, another magnetic structure is explained. FIG. 28 is a view showing the frame format and operational principle thereof. The first magnetic body 10 comprises a structure in which a plurality of coils 16 are disposed in order in prescribed intervals, preferably in equal intervals. The plurality of coils is simultaneously excited to S or N. FIG. 29 is an equivalent circuit diagram of the first and second magnetic bodies. According to FIG. 28, as described later, every coil is constantly excited during a single rotation (2Π) in relation to the two-phase exciting coil. Therefore, a drivee such as a rotor or slider may be rotated or driven at high torque.

As shown in FIG. 29(1), a plurality of electromagnetic coils 16 or 18 (magnetic units) is connected serially in equal intervals in the A phase coil 10 and B phase coil 12, respectively. Reference numeral 18A is an exciting circuit block for applying a frequency pulse signal to this magnetic coil. When an exciting signal for magnetizing the coil is flowed from this exciting circuit to the electromagnetic coils 16, 18, the coil group adjacent to the respective phases is structured to be excited in a homopolar manner to S or N. As shown in FIG. 29(2), the respective electromagnetic coils (16 or 18) of the A phase coil 10 and B phase coil 12 may also be connected in parallel.

When a signal having a frequency for alternately switching in prescribed cycles the polar direction of the exciting current to be supplied from this exciting circuit 18A to the electromagnetic coils 16, 18 of the first and second magnetic bodies 10, 12 as shown in FIG. 28, a magnetic pattern is formed in which the polarity on the side of the third magnetic body 14 alternately changes from the N pole→S pole→N pole. The structure of the second magnetic body 12 is similar to the first magnetic body 10, but differs in that the electromagnetic coil 18 of the second magnetic body is disposed positionally out of alignment (with an angular difference) in relation to the electromagnetic coil 16 of the first magnetic body.

In other words, the array pitch of the first magnetic body coil and the array pitch of the second magnetic body coil are set to have a prescribed pitch difference (angular difference). As this pitch difference, preferably employed may be a distance corresponding to Π/Nrad (where N is the number of permanent magnets).

Next, the operation of the magnetic structure in which the foregoing third magnetic body 14 is disposed between the first magnetic body 10 and the second magnetic body 12 is explained with reference to FIG. 28. As a result of the foregoing exciting circuit (reference numeral 18A in FIG. 29; described later), an exciting pattern as shown in FIG. 28(1) is generated to the electromagnetic coils 16, 18 of the first magnetic body and second magnetic body at a certain moment.

Here, a magnetic pole is generated in a pattern of all S poles to the respective coils 16 on the surface facing the third magnetic body 14 side of the first magnetic body, and a magnetic pole is generated in a pattern of all N poles to the coil 18 on the surface facing the third magnetic body 14 side of the second magnetic body 12. In the diagrams, direction of the arrows represents the attraction and repulsion. Repulsion is generated between the same poles, and attraction is generated between the different poles.

The next moment, as a result of the balance of attraction and repulsion between the first/second magnetic bodies and the third magnetic body, the third magnetic body 14 moves toward the right of (1).

The next moment, when the respective coils of the first magnetic body 10 are excited to the N pole and the respective coils of the second magnetic body 12 are excited to the S pole, as shown in (2) and (3), the third magnetic body sequentially moves toward the right. Next, as shown in (4), when the magnetic pole of respective coils 16 of the first magnetic body 10 is magnetized to the S pole and the respective coils 18 of the second magnetic body 12 are magnetized to the N pole, the third magnetic body 14 moves further to the right. As a result of supplying a rectangular wave having a phase capable of repeating (1) to (4) above to the coil of the respective phases, it is possible to make the third magnetic body 14 rotate or slide continuously.

That is, in the course of (1) to (4), the third magnetic body moves relatively to the first/second magnetic bodies in a distance corresponding to one cycle (2Π) of the frequency signal supplied to the electromagnetic coils 16, 18.

Figure 30:
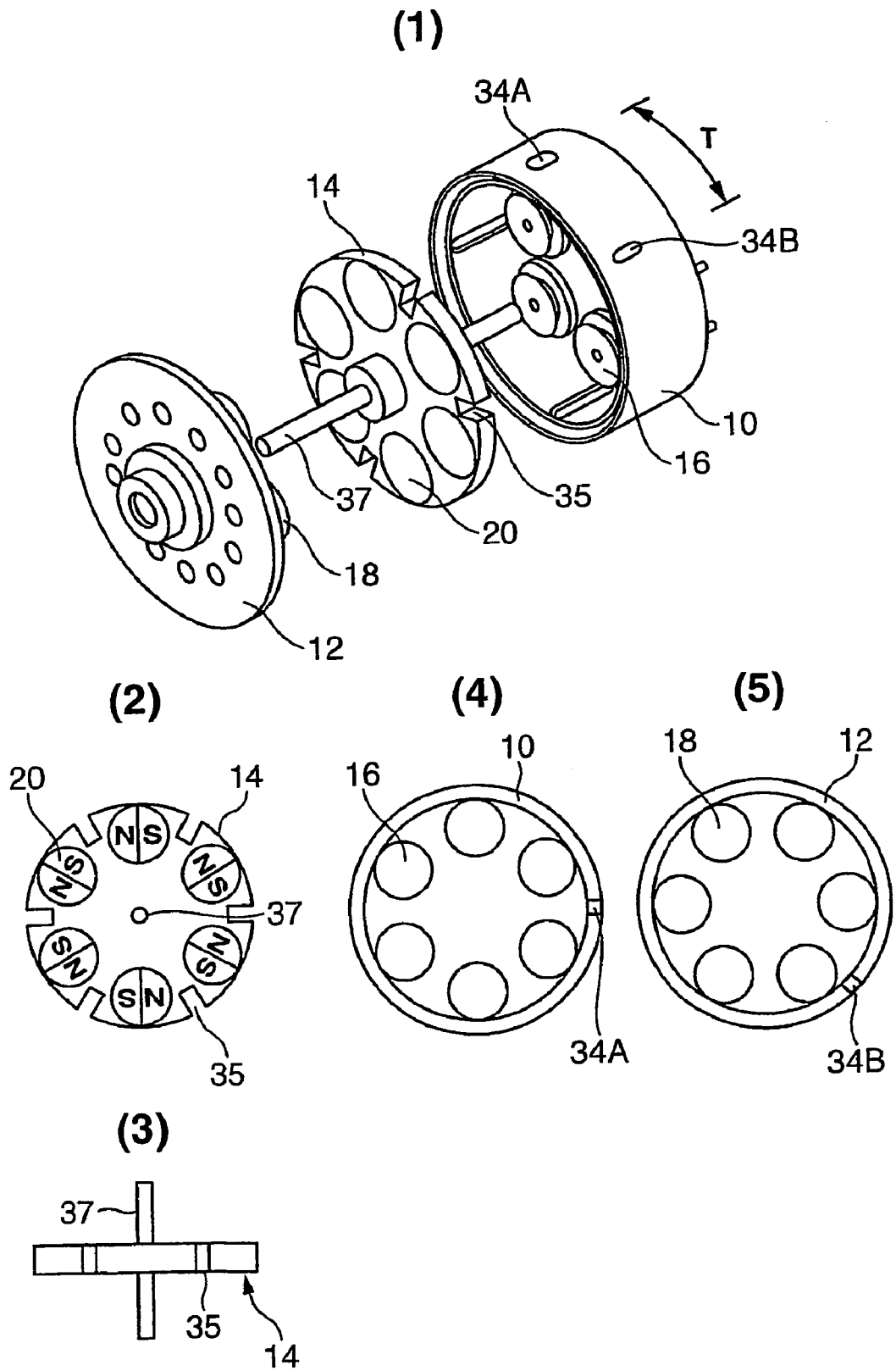
FIG. 30, with (1) through (5) is a diagram showing the structure of the motor pertaining to the magnetic structure illustrated in FIG. 28.

FIG. 30 is a diagram showing the materialization of the magnetic structure as a synchronous motor, wherein FIG. 30(1) is a perspective view of the motor; FIG. 30(2) is a schematic plan view of the rotor (third magnetic body); FIG. 30(3) is a side view thereof; FIG. 30(4) shows the A phase electromagnetic coil (first magnetic body); and FIG. 30(5) shows the B phase electromagnetic coil (second magnetic body). Further, in order to better understand this structure, please refer to the explanation of FIG. 8. As shown in FIG. 30(2), (4) and (5), six permanent magnets are provided to the rotor in equal intervals around the circumferential direction thereof. Polarities of the permanent magnet are made to be mutually opposite, and six electromagnetic coils are provided to the stator in equal intervals around the circumferential direction thereof.

The A phase sensor 34A and B phase sensor 34B are provided to the sidewall inside the case of the A phase magnetic body (first magnetic body) with an angular difference of Π/2 rad. Applied to the distance between the A phase sensor 34A and B phase sensor 34B is a distance corresponding to a value for providing a prescribed phase difference to the frequency signal supplied to the A phase coil 16 and the frequency signal supplied to the B phase coil 18.

Figure 31:
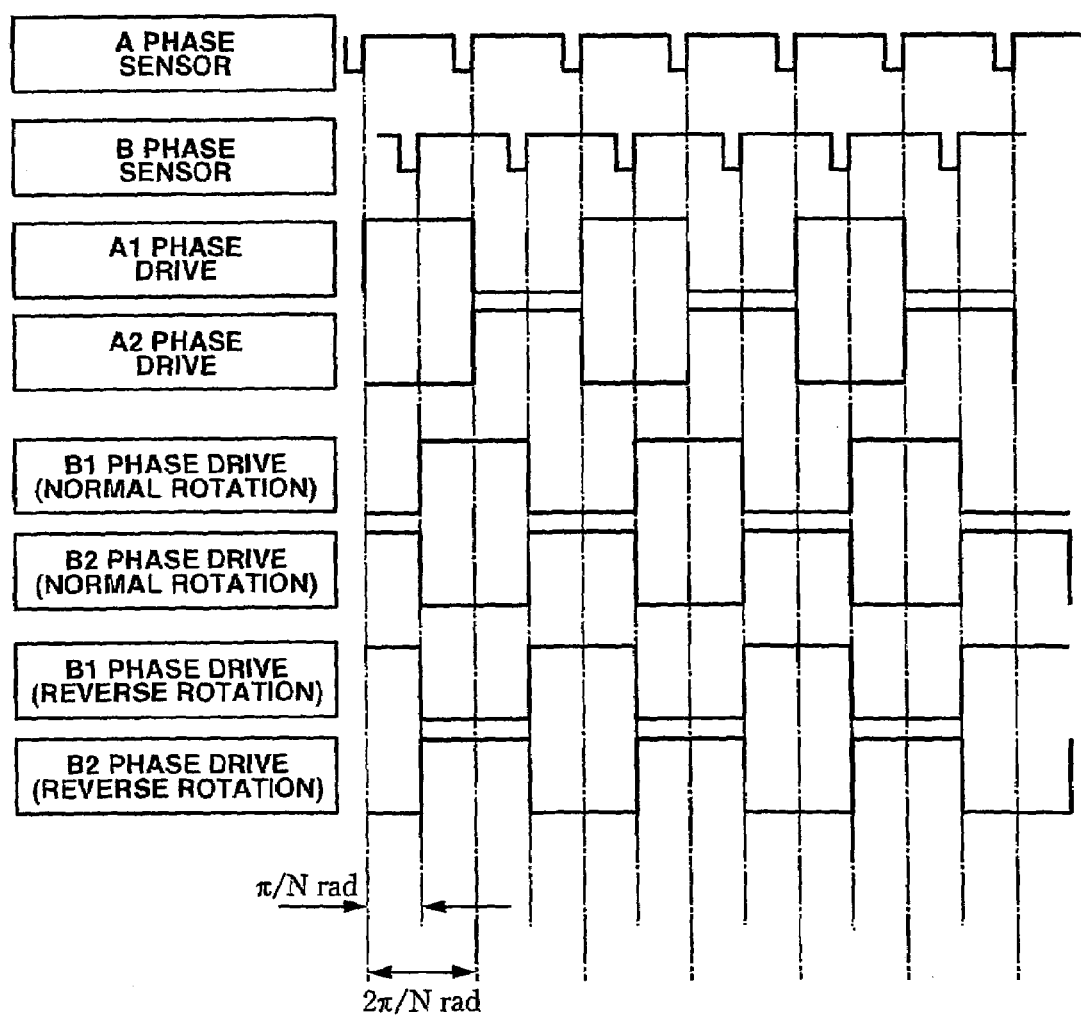
FIG. 31 is a signal waveform chart in an embodiment where two phases of drive signals are respectively supplied to the A phase electromagnetic coil and B phase electromagnetic coil in the functional block diagram illustrated in FIG. 6.

FIG. 31 is a signal waveform chart in an embodiment where the A phase electromagnetic coil and B phase electromagnetic coil are supplied with a two-phase drive signal, respectively, in the structure of FIG. 28 and FIG. 29. The waveform of the first phase (A1 phase drive) and the waveform of the second phase (A2 phase drive) of the A side electromagnetic coil have a phase difference of Π.

The waveform of the first phase (B1 phase drive) and the waveform of the second phase (B2 phase drive) of the B side electromagnetic coil also have a similar phase difference. The phase difference between the A phase drive signal and the B phase drive signal waveform is Π/2. As a result of two-phase driving the A phase side magnetic body and the B phase side magnetic body, respectively, the drive torque of the motor can be increased.

Figure 32:
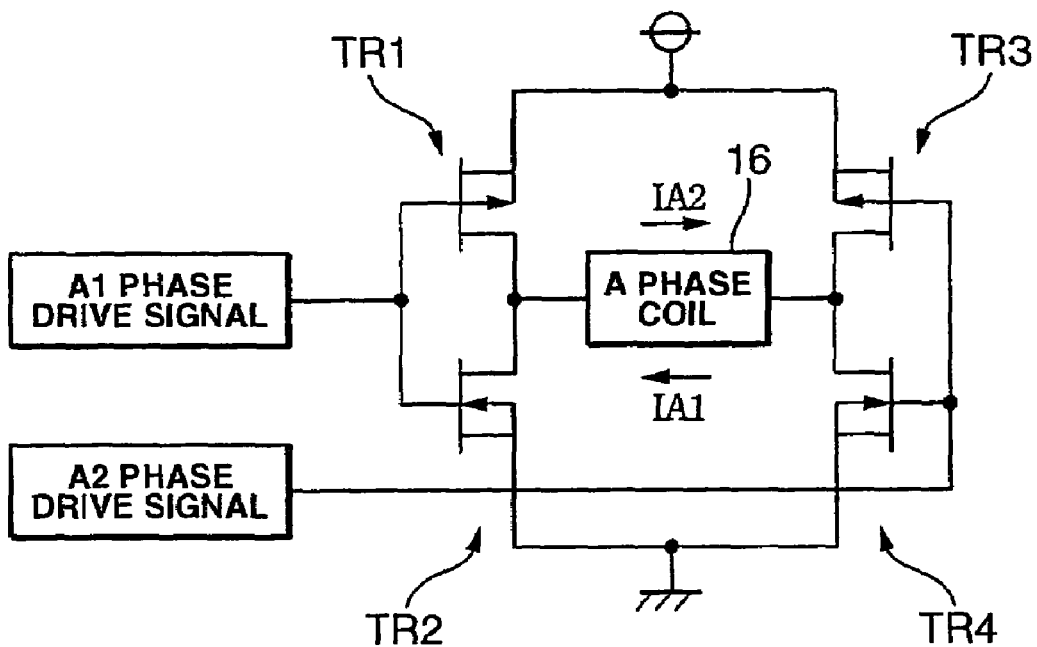
FIG. 32, with (1) and (2) is a block diagram of the buffer circuit corresponding to the waveform characteristic illustrated in FIG. 31.
Figure 32:
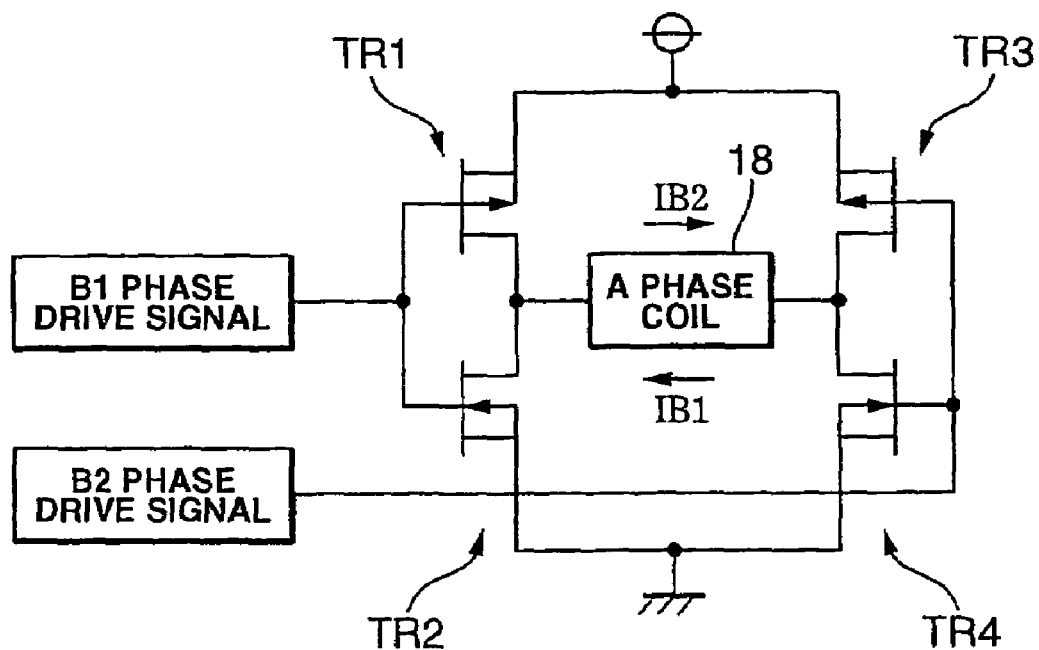

FIG. 32 is a diagram showing the buffer circuit for two-phase driving the A phase magnetic body and the B phase magnetic body. In addition, although the sensor explained above was an optical hole sensor, this may also be a magnetic sensor. Further, although the holes were provided between the permanent magnets, the holes may also be provided to the permanent magnet points. In such a case, the position of the A/B phase sensor will be reversed.

Figure 33:
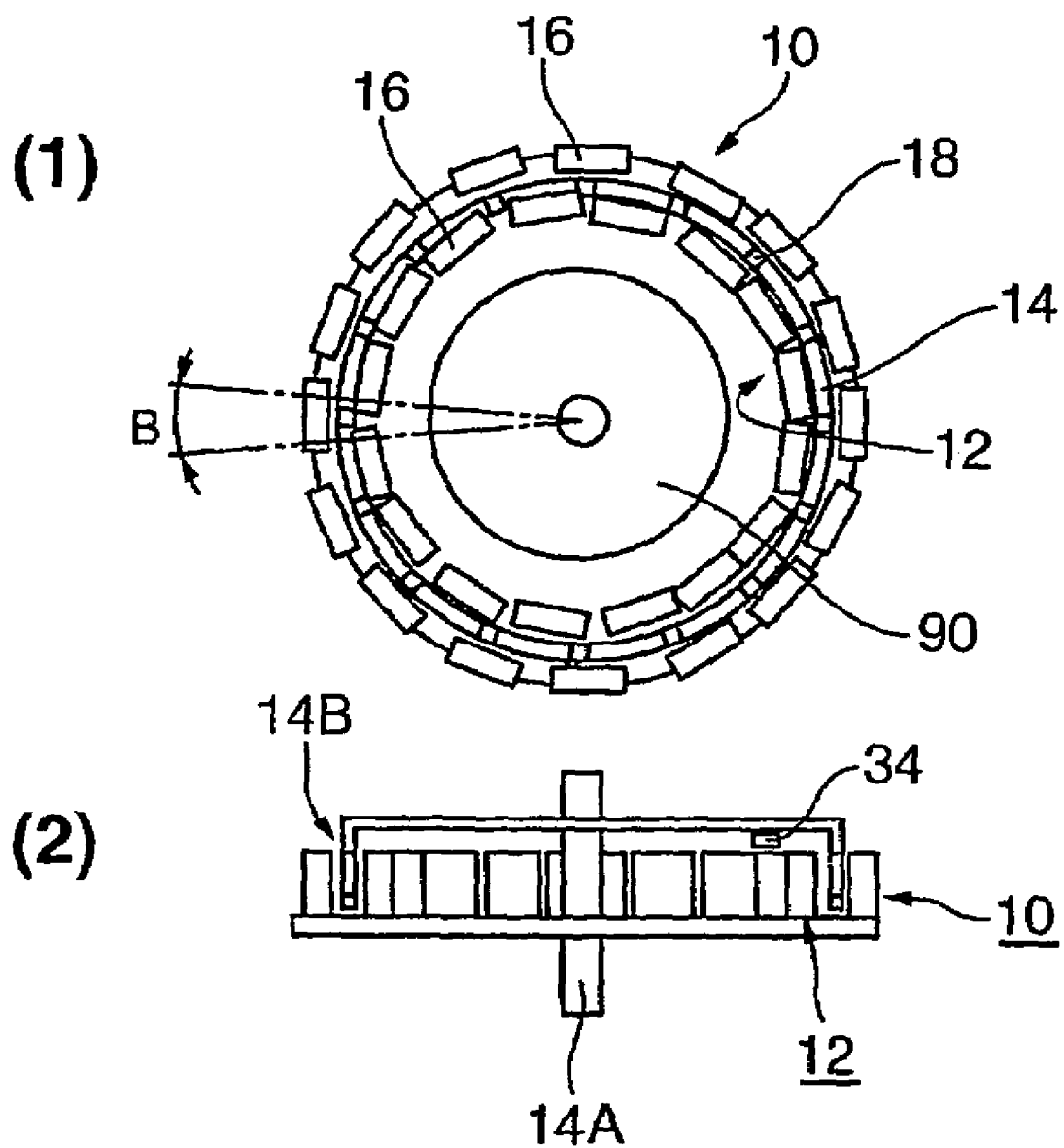
FIG. 33, with (1) and (2) is a modified example of the motor illustrated in FIG. 8, and FIG. 33(1) is the plan view thereof.

FIG. 33 is a modified example of the motor illustrated in FIG. 8. (1) is a plan view thereof, and (2) is a side view thereof. The motor depicted here differs from the motor illustrated in FIG. 8 with respect to the point that the first magnetic body 10, second magnetic b body 12 and third magnetic body 14 are mutually facing each other along the radial direction.

Further, the electromagnetic coil 16 of the first magnetic body 10 and the electromagnetic coil 16 of the second magnetic body 12 are disposed so as to mutually have an array pitch difference B. The third magnetic body 14 has a cross section in the radial direction of an approximate U shape, a circular area 14B forming the side face is interpositioned between the first magnetic body 10 and the second magnetic body 12, and the permanent magnet 18 is disposed evenly along the circumferential direction thereof.

Figure 34:
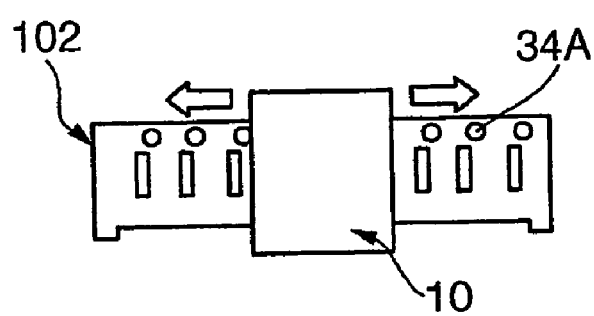
FIG. 34 with (1) through (4) is a view showing the frame format of the linear motor formed with the magnetic structure according to the present invention.
Figure 34:
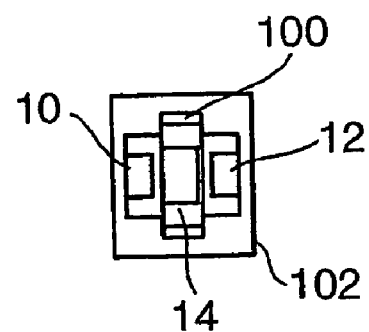
Figure 34:
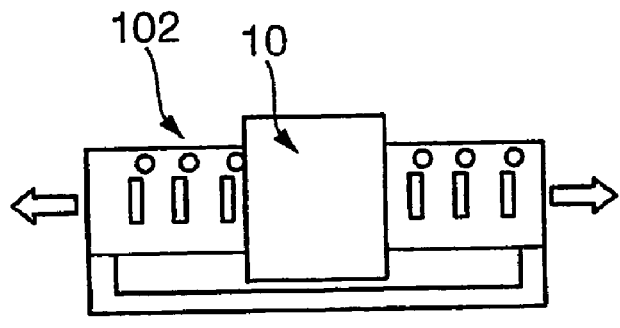
Figure 34:
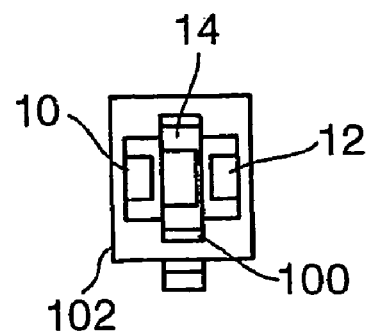

FIG. 34 is a view showing the frame format of the linear motor formed with the magnetic structure according to the present invention. (1) and (2) are diagrams showing the third magnetic body 14 as the slider, and the main body 102 including the first and second magnetic bodies 10, 12 as the stator, wherein (1) is the front view thereof, and (2) is the side view thereof. Further, (3) and (4) are diagrams showing the third magnetic body 14 as the stator, and the foregoing main body 102 as the slider, wherein (3) is the front view thereof, and (4) is the side view thereof. Reference numeral 100 is a bearing.

Figure 35:
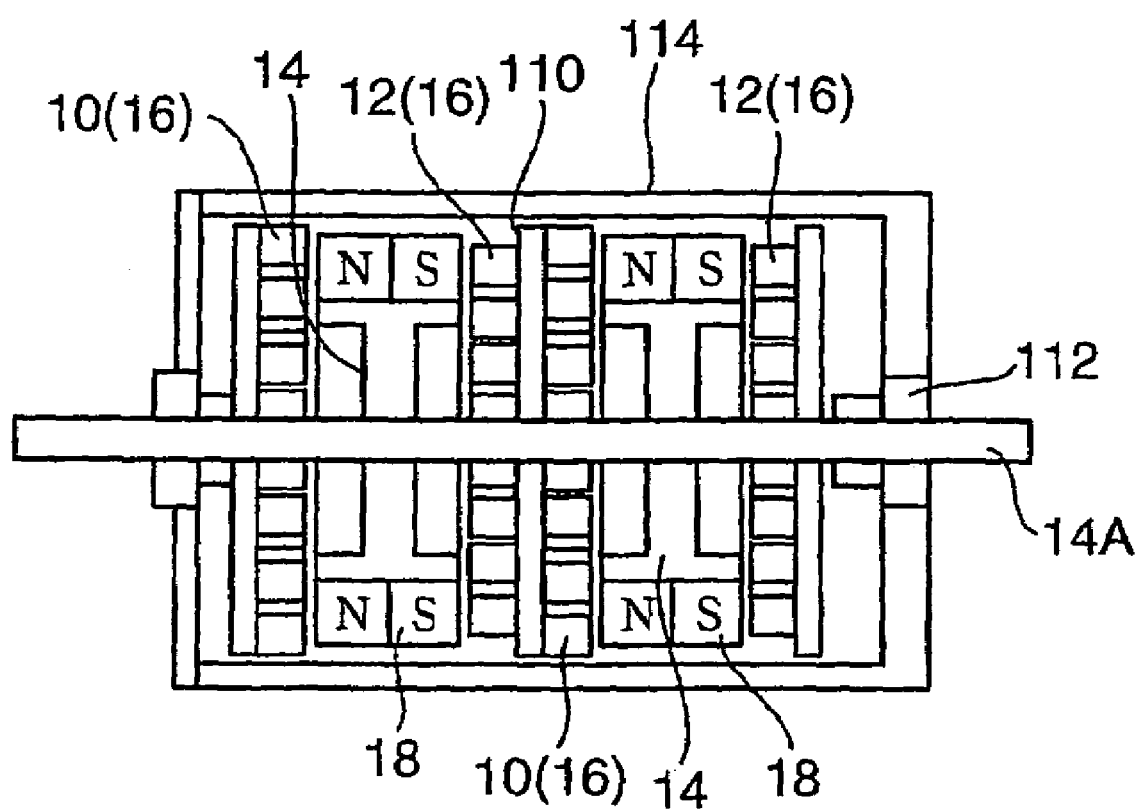
FIG. 35 is a view showing the frame format of a motor pertaining to yet another embodiment.

FIG. 35 is a view showing the frame format of a motor pertaining to yet another embodiment. This motor differs from the motors described above in that a plurality of rotors 14 is connected serially. In other words, via the partition board 110, two magnetic structures are laminated serially along the rotational axis 14A direction of the motor. The following magnetic structure comprises a pair of magnetic bodies 10, 12 to become the stator, and a rotor 14 formed by disposing a plurality of permanent magnets in the circumferential direction between the stators. The rotational axis 14A is axially supported in the housing 114 with the bearing 112. According to the present embodiment, in addition to the generated torque being doubled, there is an advantage of being able to provide a motor capable of high rotation. Further, the respective magnetic bodies 10, 12 at both ends of the partition board 110 may also be shared as a single magnetic body.

Figure 36:
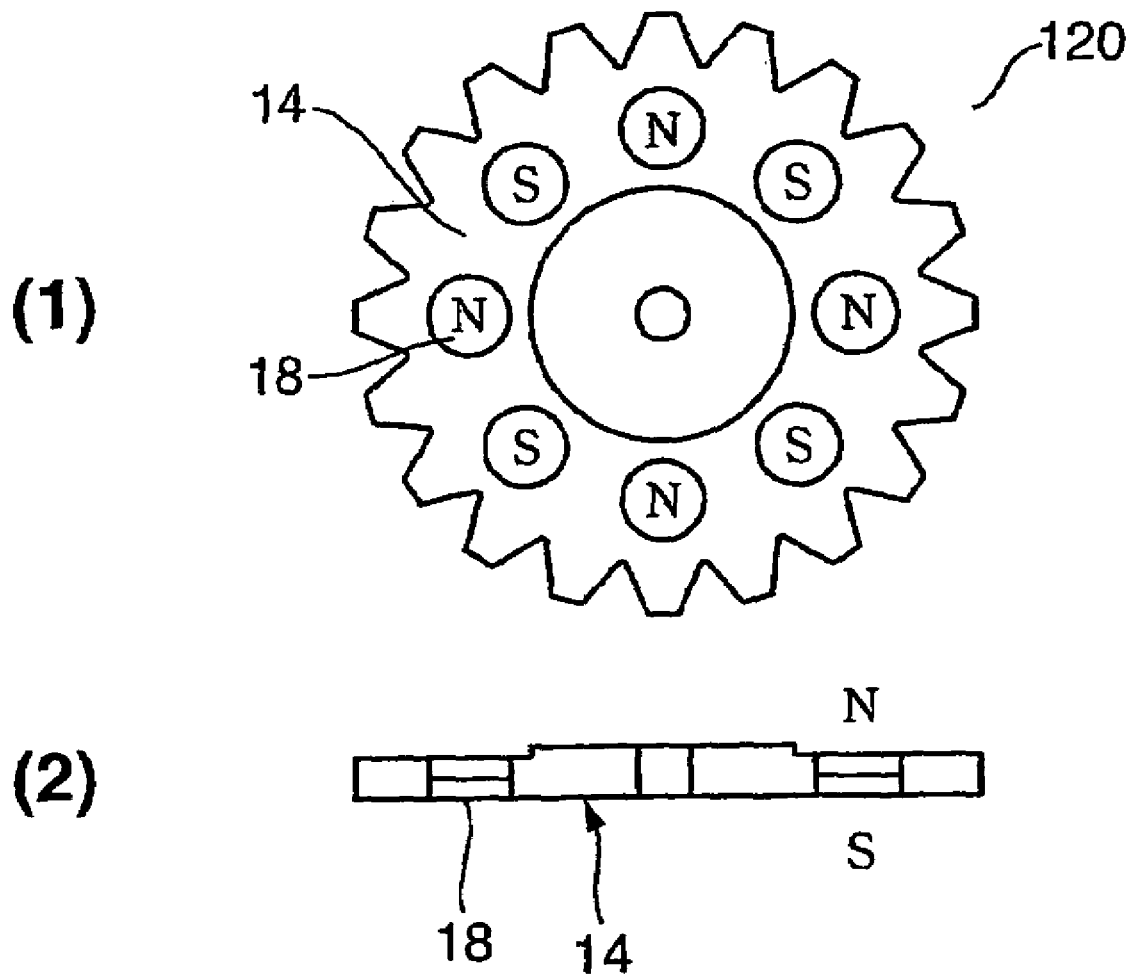
FIG. 36, with (1) and (2) is a diagram for explaining a motor pertaining to yet another embodiment.
Figure 37:
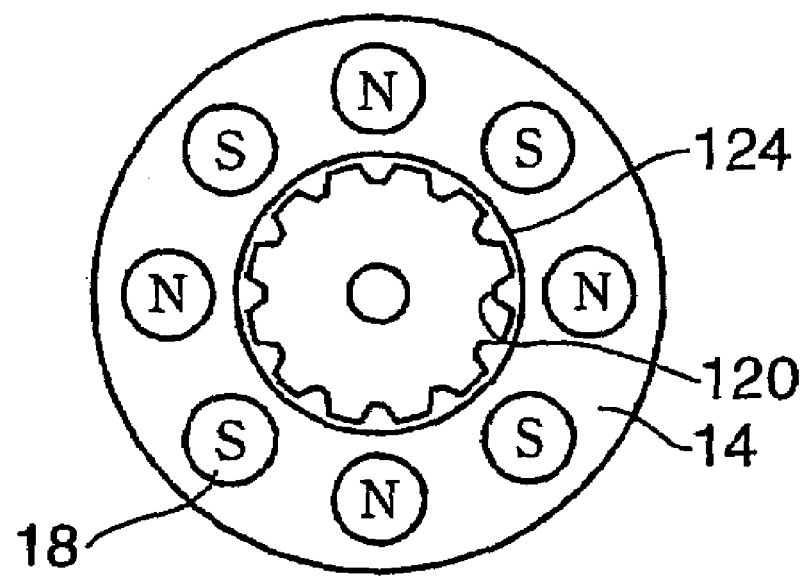
FIG. 37, with (1) and (2) is a modified example of the rotor illustrated in FIG. 14.
Figure 37:
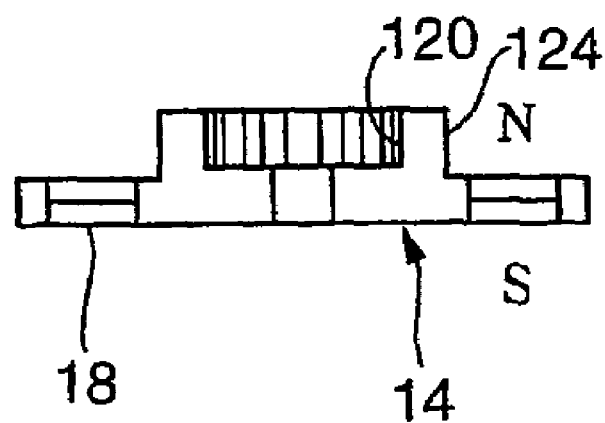

FIG. 36 is a diagram for explaining a motor pertaining to yet another embodiment, and differs from the foregoing embodiments in that a gear 120 has been formed in the rotor, wherein (1) is the plan view thereof, and (2) is the side view thereof. As shown in (1), a gear 120 is formed at the peripheral edge of the rotor 14. The permanent magnet 18 is provided in even intervals in the circumferential direction of the rotor formed in a circular arc. FIG. 37 is a modified example of the rotor illustrated in FIG. 14, wherein (1) is a plan view thereof, and (2) is a side view thereof.

A hollow boss portion 124 having a prescribed diameter is provided from the center of the rotor 14 in the radial direction, and a gear 120 protruding toward the center direction of the motor is formed in the circumferential direction of this cavity. According to this structure, there is an advantage in being able to convey motive energy to the transmission mechanism on the side subject to a direct load.

Figure 38:
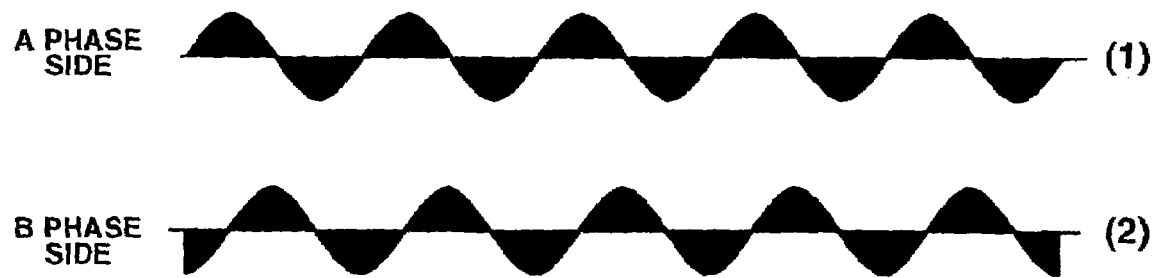
FIG. 38, with (1) and (2) is a waveform chart showing the operation of power generation in a case of employing the magnetic body of the present invention as the power generator.

FIG. 38 is a diagram showing that, when the motor is used as the power generator, an alternate voltage output waveform independent from the A phase/B phase electromagnetic coil thereof can be obtained. As a result of employing the function of this power generator, the A phase and B phase may be independently and easily subject to regenerative braking and braking control. Moreover, although the foregoing explanation was made by exciting and driving both electromagnetic coils of the A phase and B phase, during a light torque after the drive, a drive pursuant to a low-power mode by exciting the phase on only one side of either the A phase or B phase may also be adopted.

Figure 39:
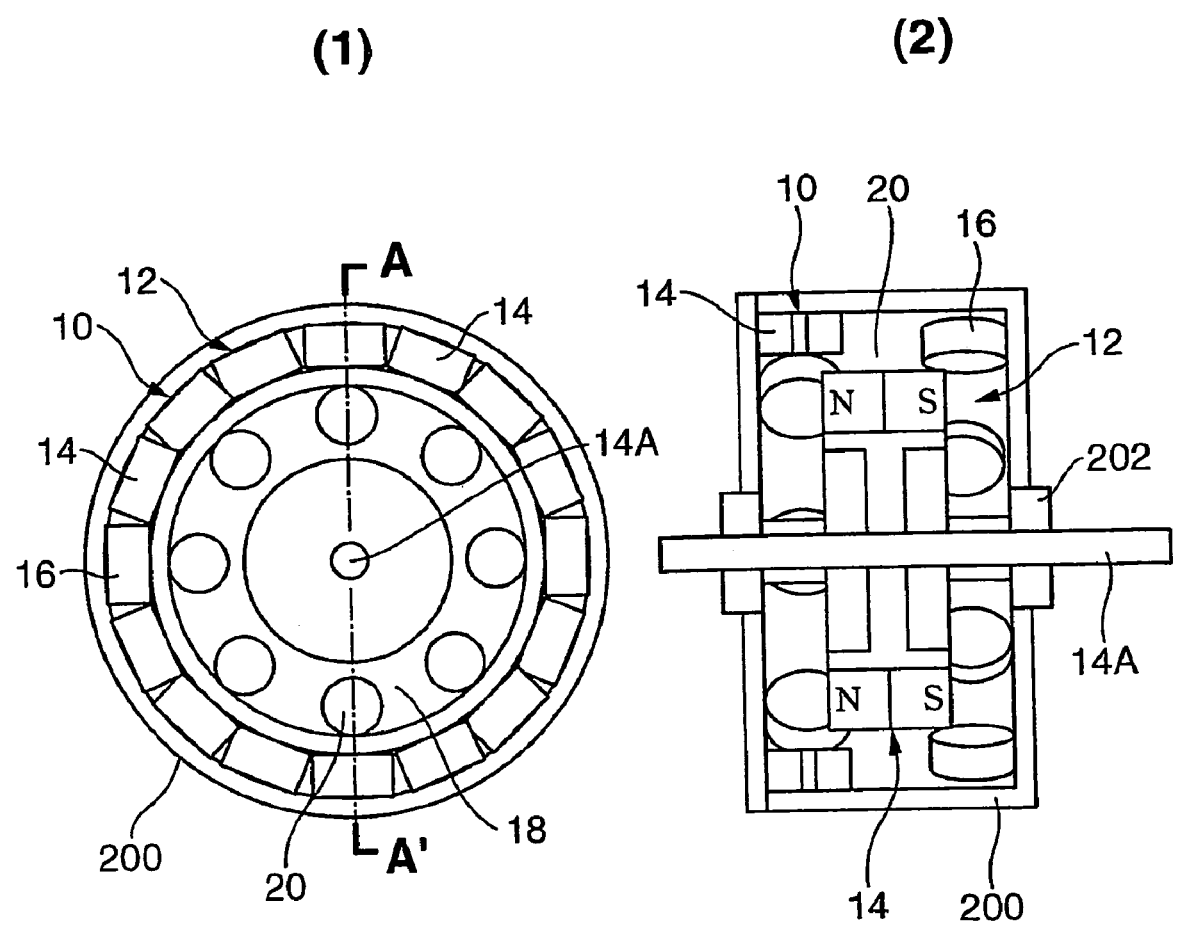
FIG. 39, with (1) and (2) is a view showing the frame format pertaining to the structure of a motor in which the displacement of the stator formed with the first magnetic body and the stator formed with the second magnetic body differs from the displacement illustrated in FIG. 33, wherein FIG. 39(1) is a plan view thereof.

FIG. 39 is a view showing the frame format pertaining to the structure of a motor in which the displacement of the stator 10 formed with the first magnetic body and the stator 12 formed with the second magnetic body differs from the displacement illustrated in FIG. 33, wherein FIG. 39(1) is a plan view thereof; and FIG. 39(2) is an A-A cross section thereof.

In the foregoing embodiment (FIG. 33), a rotor structure was illustrated where two stators were made to mutually face each other along the radial direction, and a rotor 14 having a plurality of permanent magnets was disposed between the two stators. Meanwhile, with the motor depicted in FIG. 39, the two stators are positioned out of alignment along the rotational axis 14A of the motor, and a rotor having a smaller diameter than such stators is disposed between these stators.

Here, the two stators 10, 12 are located on the outer peripheral side along the radial direction of the rotor 14, and the electromagnetic coil 14 in the first stator and the electromagnetic coil 16 in the second stator are disposed having a phase difference (pitch difference) corresponding to Π/2 of the exciting signal as described above.

As a result of supplying a frequency signal having mutually different phases to the two stators structured as above, the rotor may be rotated in a prescribed direction. Here, the magnetic force direction of the stationary part (stator) in relation to the magnetic force direction of the rotator (rotor) will magnetically intersect perpendicularly. Further, reference numeral 200 is the outer frame of the rotor, and 202 is a bearing for rotatably supporting the rotational axis 14A with the outer frame 200.

In addition, as the material for structuring the case, stator or rotor, a non-magnetic body (resin, carbon, glass, aluminum, magnesium, or a combination thereof) is preferable, but may be suitably selected in consideration of the required intensity. Further, since the line of magnetic force will discharged outside when using a non-magnetic body case, it would be preferable to suppress the line of magnetic force from being discharged outside by forming the case with a magnetic body material, or covering the case with a coating material containing a magnetic body.

Figure 40:
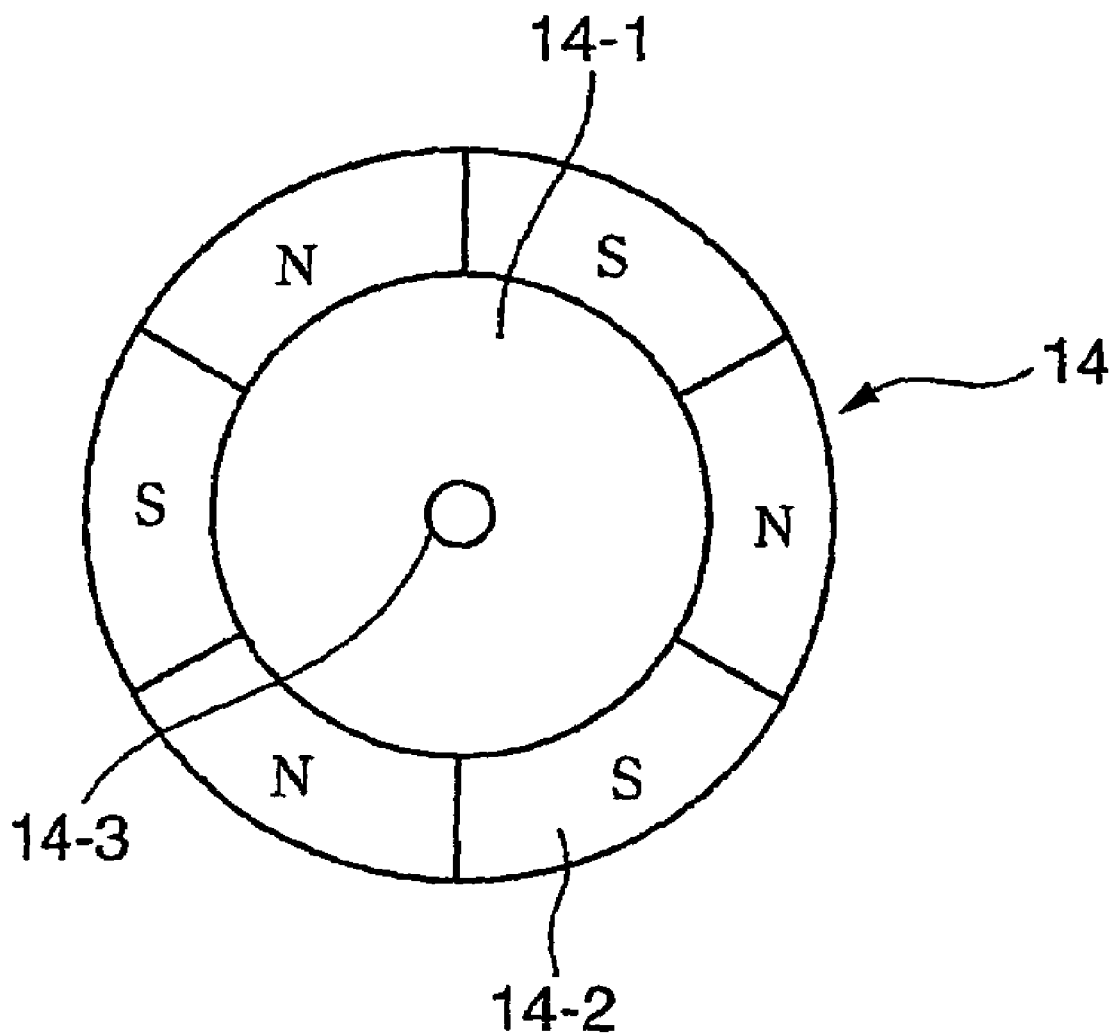
FIG. 40 is a plan view of a multipolar exciting rotor.

FIG. 40 is a plan view showing another embodiment of the rotor 14, and the permanent magnet 14 may be structured such that the magnetic body is excited in a multipolar manner. Reference numeral 14-1 is the center material of the rotor, and may be a non-magnetic body such as resin. Reference numeral 14-2 is a magnetic body formed around the center material, and is alternately magnetized to opposite poles. Reference numeral 14-3 is the rotor axis. By structuring the center material 14-1 with a material other than a magnetic body, the rotor can be made light and thin. Since the heavy load of the permanent magnet is disposed around the rotor 14, when this is rotated at high speed, the rotor may function for gyro control or as a gyro sensor. This may be used in the equilibrium control of robots, helicopters, airplanes, vehicles, and so on.

Figure 41:
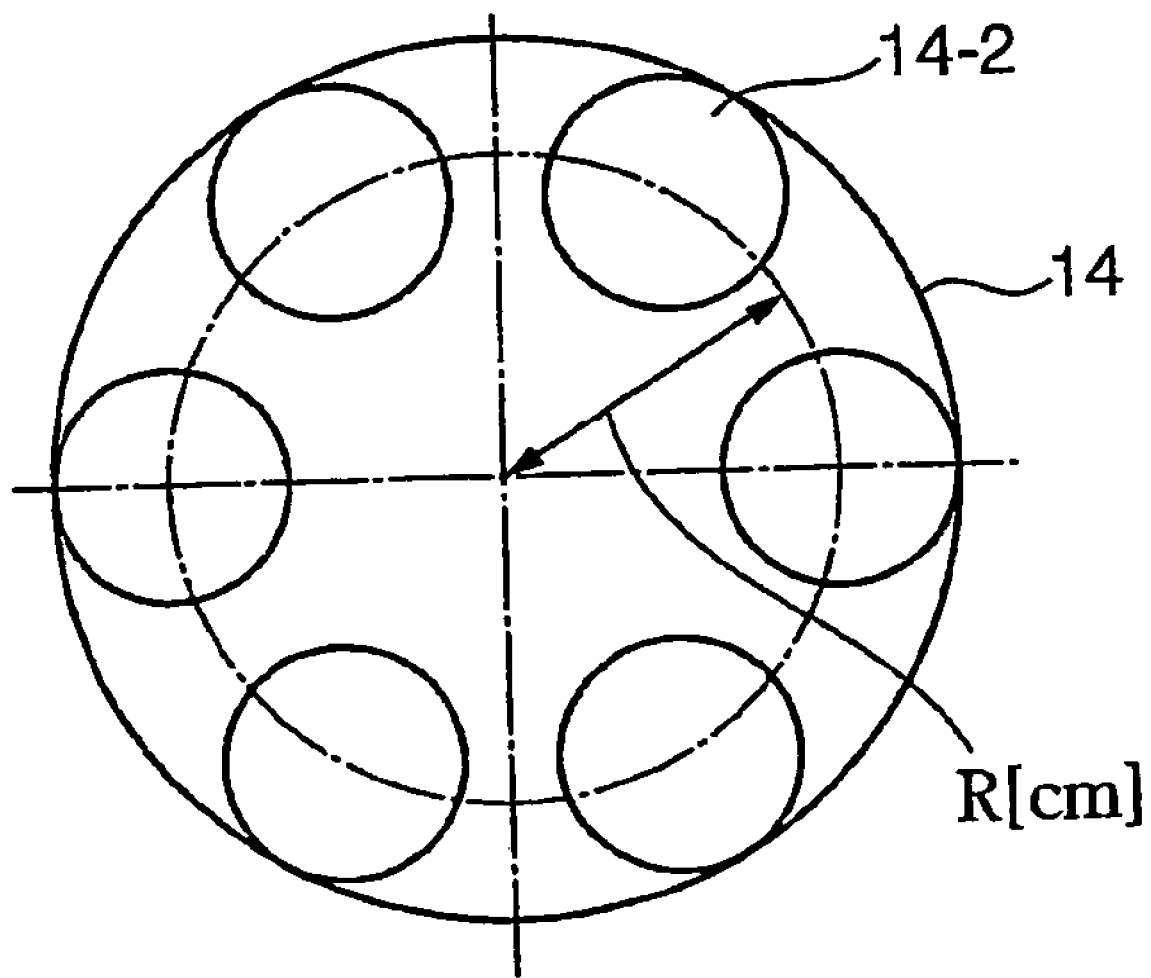
FIG. 41 is a conceptual diagram of the torque calculation of the rotor.

FIG. 41 is a conceptual diagram of the torque calculation of the rotor. When the start-up torque is Fst[g·cm], torque radius is R[cm], attraction of the permanent magnet and coil is Fx[g], number of permanent magnets is N, and number of phases (A phase, B phase, etc.) is A, Fst =R*Fx*N*A[g·cm].

Figure 42:
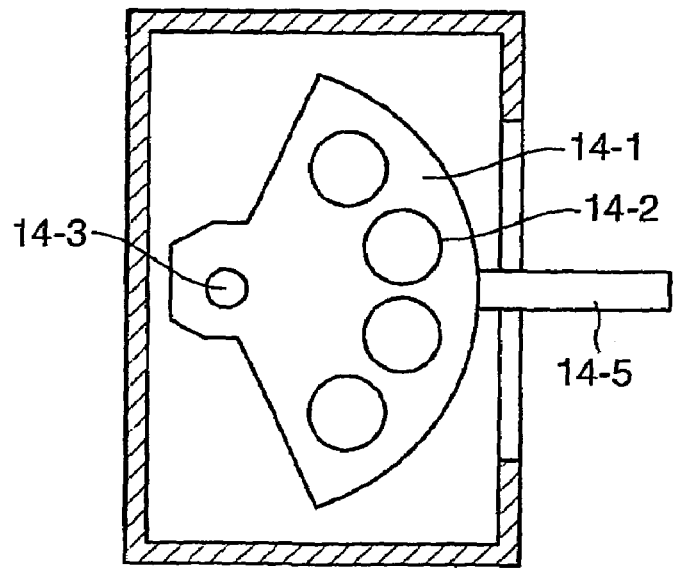
FIG. 42, with (1) and (2) is a conceptual diagram of the drive of the rotor formed in a fan shape.
Figure 42:
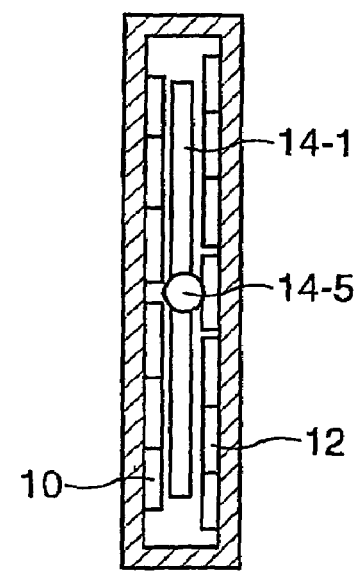

FIG. 42 is a diagram showing another embodiment of the magnetic structure. The rotor to rotate around the axis 14-3 is formed not in a circuit, but in a fan shape. Mutually heteropolar permanent magnets 14-2 are embedded in the fan shaped rotating body 14-1. A pole shaped member 14-5 is mounted radially from the fan shaped rotating body 14-1 so as to protrude outside the case. When the fan shaped rotating body rotates, the pole shaped member conducts a reciprocating motion in the arrow direction. As shown in FIG. 35(2), the fan shaped rotating body 14-1 is sandwiched between the A phase electromagnetic coil 10 and the B phase electromagnetic coil 12, and, by flowing the foregoing frequency signal to the A phase and B phase, it is possible to rotate the fan shaped rotating body in a prescribed direction.

Figure 43:
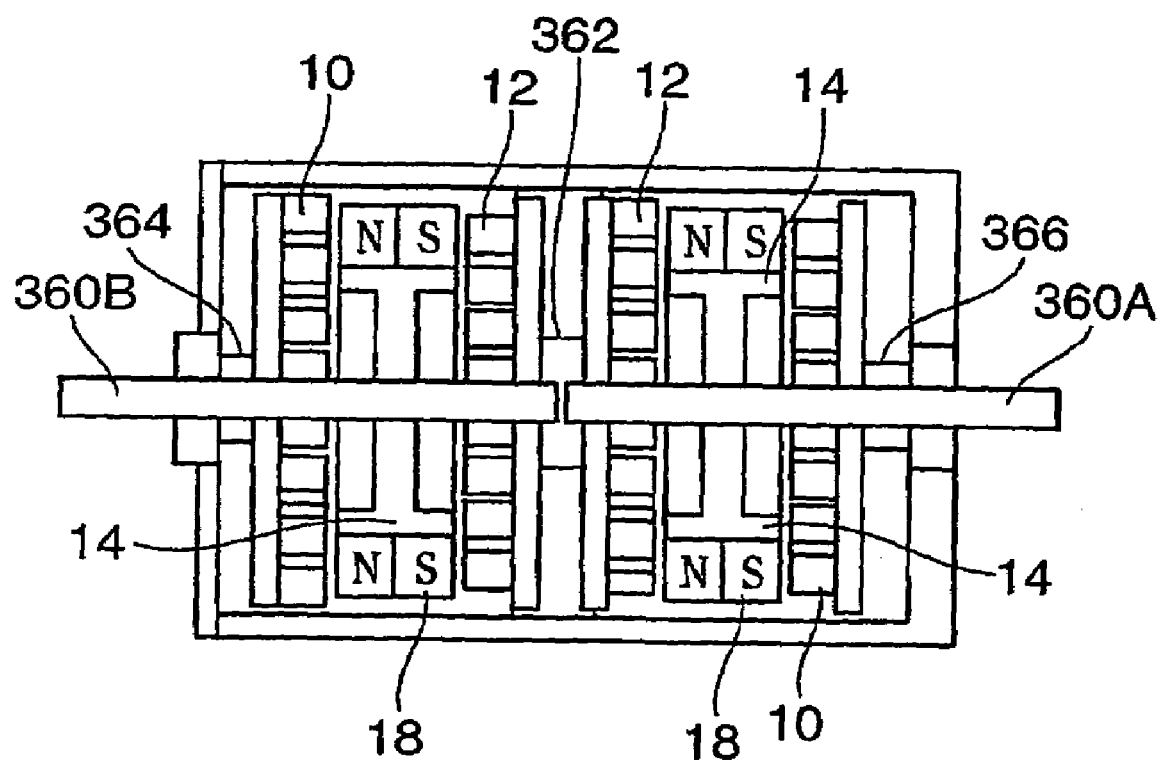
FIG. 43 is a modified example of FIG. 35.

FIG. 43 is a modified example of the embodiment shown in FIG. 35. Axes 360A, 360B are separated in the middle thereof, and the respective axes may be separately rotated with their respective magnetic structures. The respective axes are subject to rotational control by a pair of rotors 14 formed from the A phase coil 10, B phase coil 12 and permanent magnet. The end portion of the axis inside the motor is connected to the bearing 362, and rotatably supports the respective axes 360A, 360B individually such that the respective axes can be rotated in different directions or at different speeds, respectively. Reference numerals 364, 366 are bearings for rotatably supporting their respective axes. A frequency signal of the A2 phase and B1 phase is supplied to one pair among the two pairs of magnetic structures, and a frequency signal of the A2 phase and B2 phase is supplied to the other pair.

Figure 44:
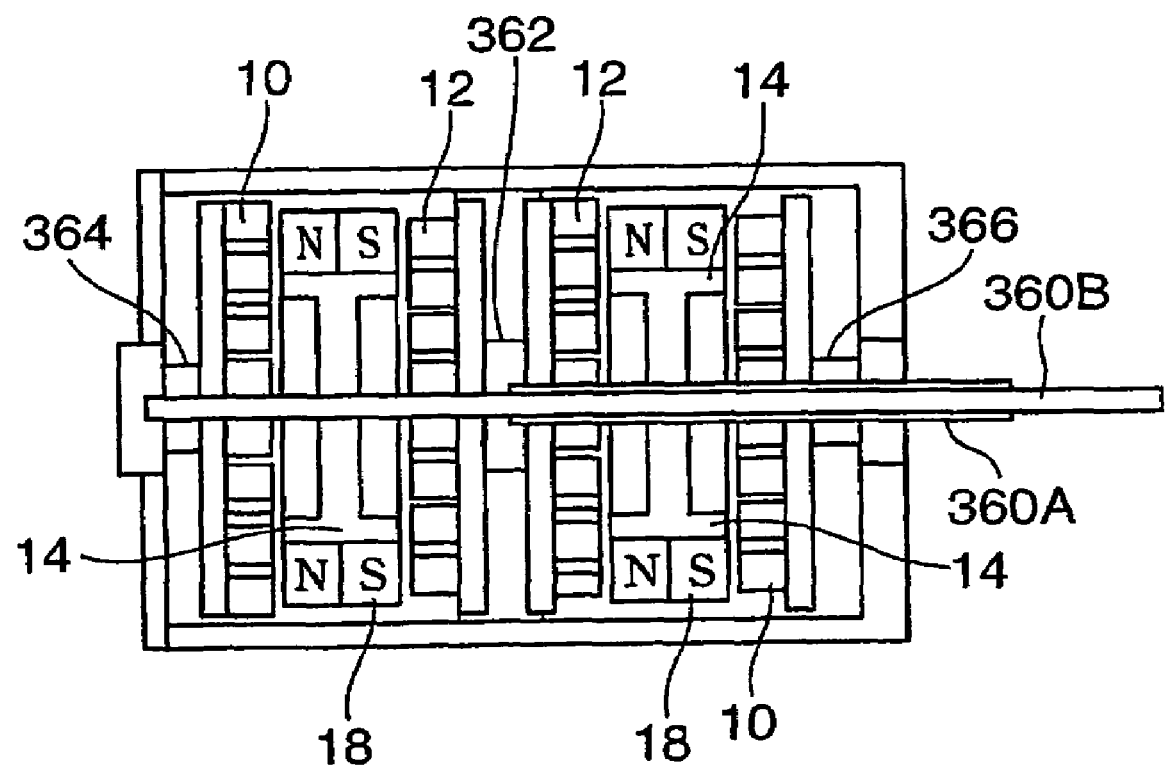
FIG. 44 is another modified example thereof.

FIG. 44 is another modified example, and a cavity is formed in the axis 360A. Another axis 360B is penetrating this axis. Axes 360A and 360B are respectively subject to rotational control under separate pairs of magnetic bodies.

Figure 45:
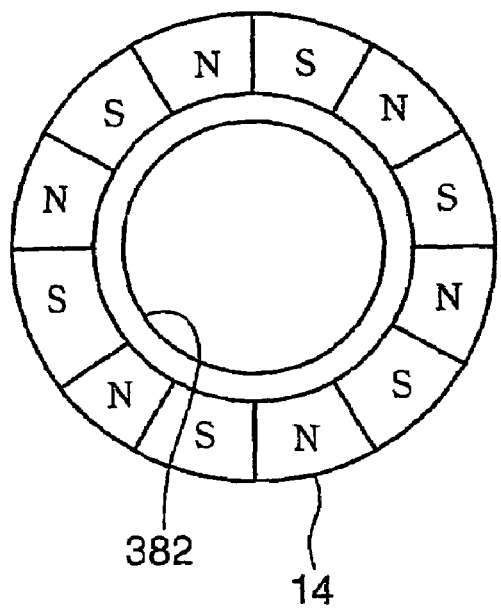
FIG. 45, with (1) and (2) is an application example of applying an embodiment according to the present invention for driving a lens.
Figure 45:
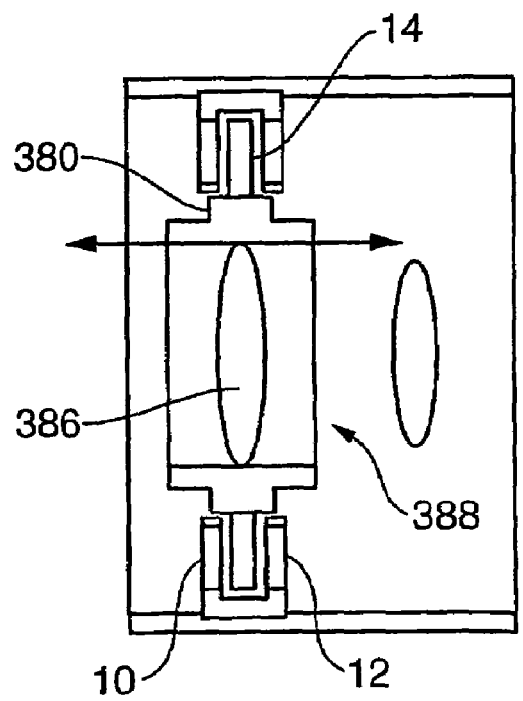

FIG. 45(1) shows an embodiment employing the magnetic structure of the present invention for driving a lens. This is an electromagnetic coil formed from reference numerals 10, 12 and the A phase and B phase, and a multipolar exciting type permanent magnet rotor 14 shown in FIG. 42(2) is disposed between the electromagnetic coils. Reference numeral 380 is a gear unit, and converts the rotor rotation into a linear reciprocating motion shown with the arrow. Reference numeral 382 of (1) is an inside gear for engaging with the foregoing gear. When rotor 14 is rotated, the lens unit 388 comprising the lens 386 retreats in the arrow direction, and, for example, the focus distance may be changed.

Figure 46:
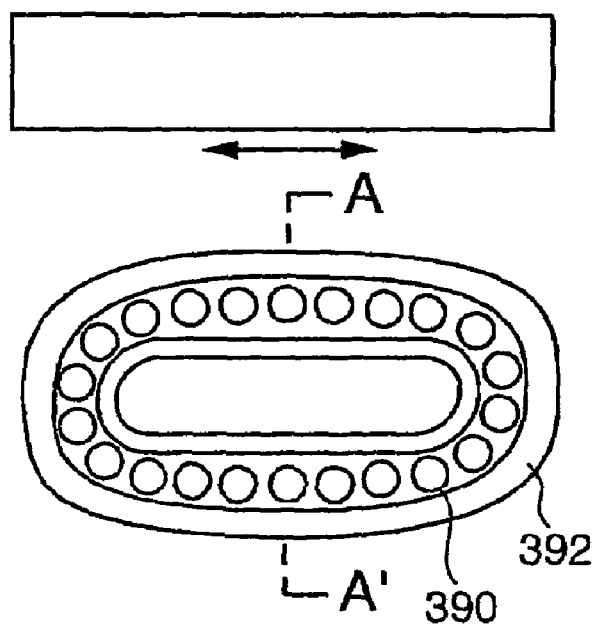
FIG. 46, with (1) and (2) is a diagram showing an application example applying the magnetic structure according to the present invention in a circulating body.
Figure 46:
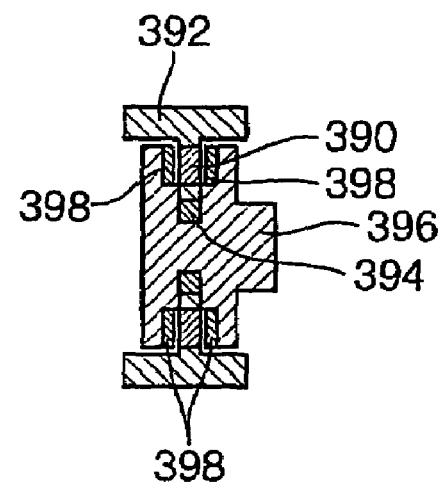

FIG. 46(1) is a diagram showing an embodiment where the rotor of the magnetic body is flexible. A plurality of permanent magnets 390 is provided by being embedded in rows along the longitudinal direction of the viscous body (including the caterpillar) 392 that is flexible and deformable. As shown in (2), which is the B-B' cross section of (1), this viscous body has an oval and circular T-shaped cross section, the inside thereof is a bearing or oil lubricant 394, and is supported such that it may be driven in circles against the key-shaped fixed portion 396. Reference numeral 398 is a pair of A phase/B phase coils. Since this viscous body can be driven like a caterpillar, for example, this magnetic body may be employed as a caterpillar of moving vehicles. (3) is the side view in the A-A' direction.

Figure 47:
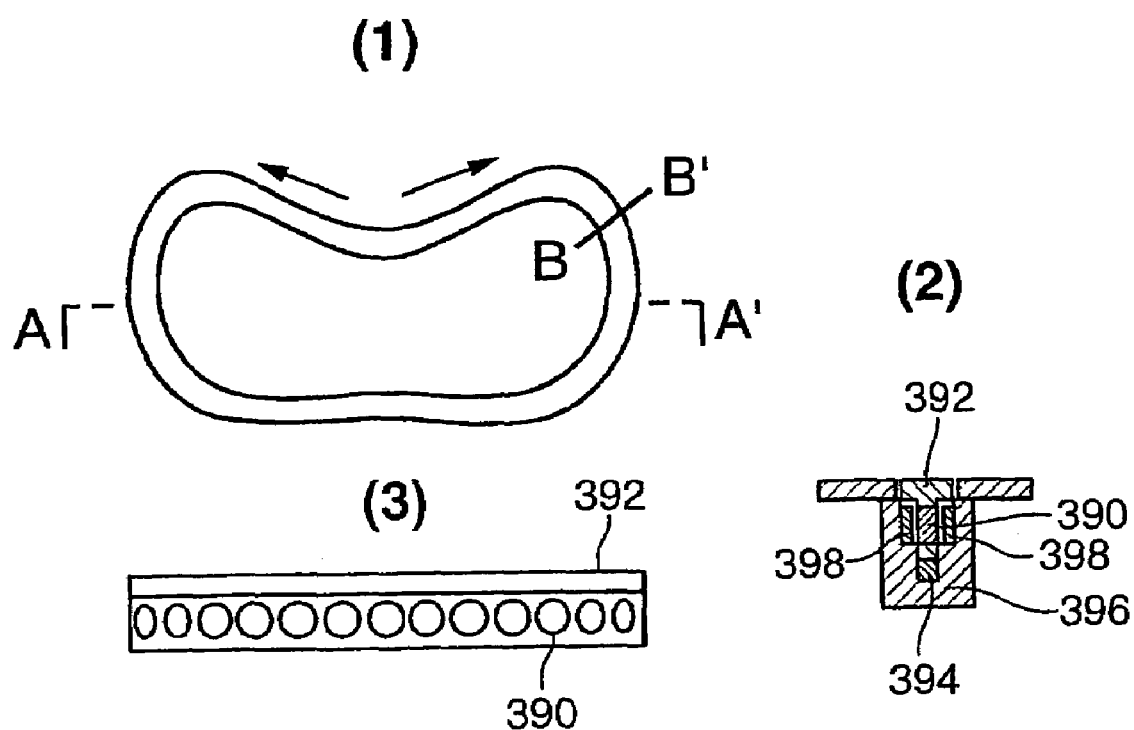
FIG. 47, with (1) through (2) is a diagram showing an embodiment of applying the magnetic structure according to the present invention in a flexible circulating body.

FIG. 47 is a modified example of FIG. 46. (1) is a plan view, (2) is the cross section in the A-A direction, and (3) is the cross section in the B-B direction. The viscous body (deformable) is in an approximate oval shape, has an approximate T-shaped cross section, has bearing oil at the tip, and a permanent magnet is provided in the middle thereof. A plurality of permanent magnets is provided along the length direction of the viscous body. The fixed portion 396 has an approximate oval shape, and the viscous body is capable of circulating while deforming to the shape of such fixed portion.

Figure 48:
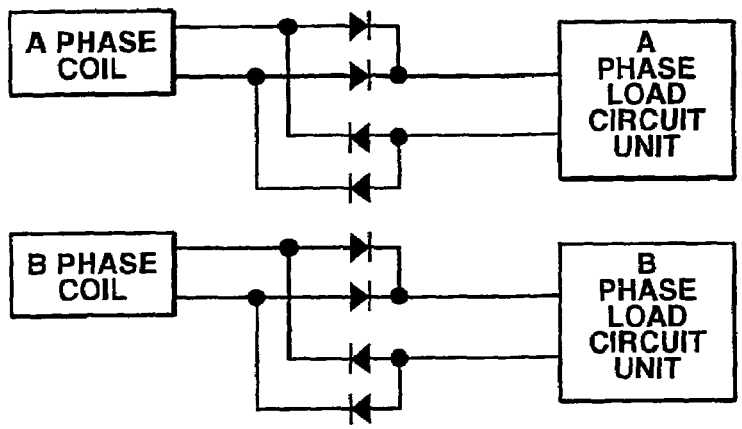
FIG. 48, with (1) through (3) is a circuit showing the load circuit unit.
Figure 48:
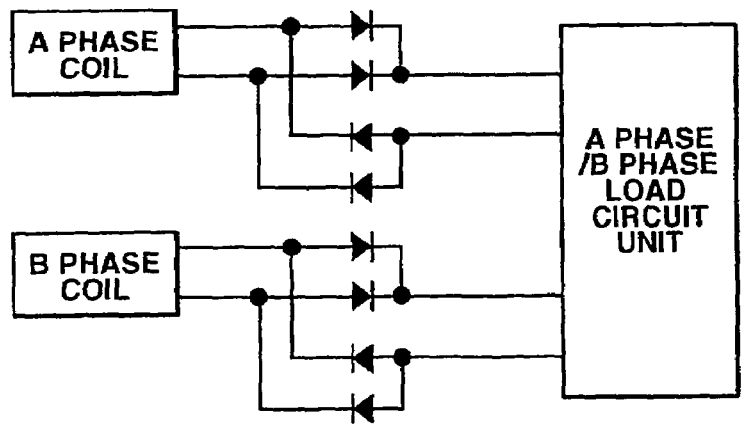
Figure 48:
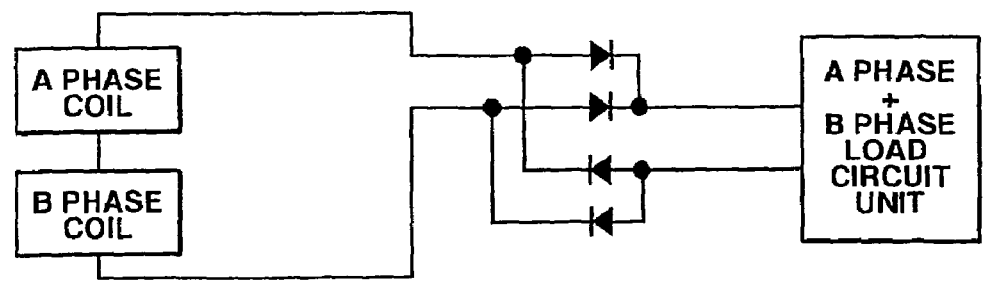

FIG. 48 is a diagram showing the power generation circuit employing the magnetic structure described above. FIG. 48(1) is for supplying the generated electromotive force of the A phase coil and the generated electromotive force of the B phase coil to the respective independent load circuits; (2) is for supplying the coil generated electromotive force of the respective phases to the common load circuit, and (3) is for serially connecting the A phase coil and B phase coil and supplying the generated electromotive force to the power generation circuit. Further, the power generation for realizing the foregoing magnetic structure is broad, and, in addition to wind power and wave power, power generation by regenerative braking against the moving vehicle may also be employed.

Figure 50:
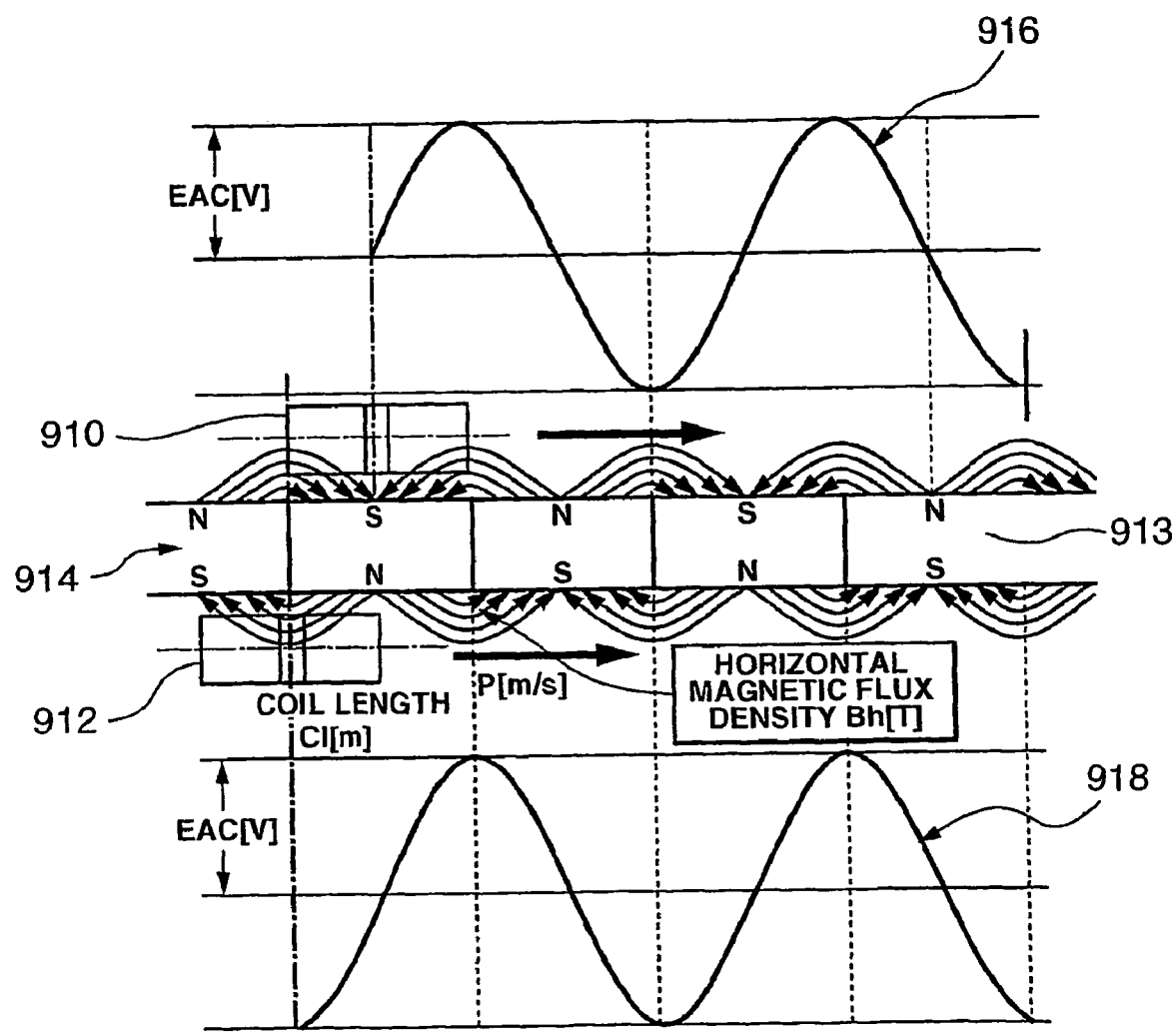
FIG. 50 is a diagram showing the power generation principle of the magnetic structure pertaining to the present invention and also showing the detailed explanation of the magnetic structure of FIG. 1-4.

FIG. 50 is a principle diagram showing the power generation principle. A plurality of magnetic elements 913 alternately charged to opposite poles is disposed to the foregoing rotor or slider (914). A magnetic field shown with an arrow in the diagram is generating between these magnetic elements. When this rotor 914 and coils 910, 912 move relatively, the magnetic field intensity to the respective coils will change each time it passes through the magnetic element 913, and, as a result, a sinusoidal electromotive force without any distortion as shown in 916 and 918 is generated. As a result, Bh(T): horizontal magnetic flux density (coil center) and CL (coil length); and P(m/s): Eac (electromotive force) corresponding to the product with the moving speed of coil are obtained.

In FIG. 50, a plurality of permanent magnets 913 is alternately disposed so as to be opposite poles along the circumferential direction of the rotor 914. Therefore, magnetic poles exist parallel or horizontal in the rotational direction (moving direction) of the rotor. As a result, by supplying exciting current having a frequency to the coil, the rotor will rotate in the circumferential direction. Further, during power generation, the strength of the magnetic field affecting the coil will periodically change pursuant to the magnetic field of the rotor, and the back electromotive force described above is generated in the coil. The traveling energy is changed to electric energy with a discoid rotor and a coil also formed in a disk, and this may be used as the driving force for starting or accelerating upon moving the driver.

Further, in the embodiments described above, although the outer shape of the rotor and electromagnet was illustrated in a circle, the shape is not limited thereto, and any rotatable shape, such as oval or the like, may also be employed.

The structure explained in the foregoing embodiments may be suitably modified within the range of the technical spirit of the present invention. For example, in the foregoing embodiment, although the number of holes 35 illustrated in FIG. 8 was equivalent to the number of permanent magnets (or this number was limited to one hole), the number is not limited thereto. In the foregoing embodiment, although an optical type and magnetic type were used as the sensor, the back electromotive force generated in the coil may also be used as the detection signal. In such a case, the coil itself will concurrently function as the sensor. Further, with the magnetic structure shown in FIG. 50 and FIGS. 1 to 4, shorter the distance between the permanent magnets, higher the horizontal magnetic flux density B(h).

The invention claimed is:

1. A motor comprising:
a first magnetic body;
a second magnetic body; and
a third magnetic body disposed between said first and second magnetic bodies, the third magnetic body being relatively movable in a prescribed direction in relation to said first and second magnetic bodies,
wherein said first magnetic body and second magnetic body respectively comprise a structure in which a plurality of electromagnetic coils capable of being alternately excited to opposite polarities is disposed in order; said third magnetic body comprises a structure in which permanent magnets alternately magnetized to opposite polarities are disposed in order; and said first magnetic body and said second magnetic body are structured such that an electromagnetic coil of said first magnetic body and an electromagnetic coil of said second magnetic body are disposed so as to mutually possess an array pitch difference,
said magnetic structure further comprising a coil exciting circuit for supplying an exciting current including frequency signals having different phases to the electromagnetic coils of said first and second magnetic bodies,
wherein the pair formed from said first and second magnetic bodies and one side of said third magnetic body form a rotor, and the pair formed from said first and second magnetic bodies and the other side of said third magnetic body form a stator,
wherein an equal number or magnet poles of the rotor and poles of the electromagnetic coil for the phrase are formed, a rotation speed detector that detects the rotation speed of the rotor being set in a direction perpendicular to an axis of the rotor, and
wherein said coil exciting circuit controls excitation of the electromagnetic coils of said first and second magnetic body via the exciting current supplied to the electromagnetic coils, the phase of the current being corrected based on a rotational speed of said rotor.

2. A motor according to claim 1, wherein said first magnetic body, second magnetic body and third magnetic body are respectively formed in a circular arc.

3. A motor according to claim 2, wherein said first magnetic body and second magnetic body are disposed at an equidistance, and said third magnetic body is disposed between said first magnetic body and second magnetic body.

4. A motor according to claim 3, wherein the pair formed from said first and second magnetic bodies and one side of said third magnetic body form a slider, and the pair formed from said first and second magnetic bodies and the other side of said third magnetic body form a stator.

5. A motor according to claim 1, wherein said first magnetic body, second magnetic body and third magnetic body are respectively formed in a straight line.

6. A motor according to claim 1, wherein said coil exciting circuit comprises a reference pulse signal generator; and a phase corrector that corrects the phase of the exciting current to be supplied to the electromagnetic coil of said first magnetic body and the electromagnetic coil of said second magnetic body based on said rotational speed detection signal and said reference pulse signal.

7. A motor according to claim 6, wherein said coil exciting circuit comprises a buffer that controls an exciting direction of said electromagnetic coil at a prescribed duty ratio upon the phase-corrected exciting current being supplied thereto.

8. A motor according to claim 1, wherein a gear is formed on said rotor.

9. A motor according to claim 1, wherein said rotor is connected to a rotating body, and functions as a power generator.

10. A motor according to claim 1, wherein a plurality of pairs formed from said stator and rotor is connected serially or in parallel.

11. A driver comprising the motor according to claim 1 as a drive source.

12. A motor according to claim 1, wherein said coil exciting circuit comprises a start-up control unit for generating a reference wave pulse and forming an exciting signal to be supplied to said magnetic body from said reference wave pulse in order to start-up said first and/or second magnetic body; and a sensor follow-up control unit for forming an exciting signal to be supplied to said magnetic body by following the output from the rotational position sensor of said magnetic body after the start-up of said magnetic body.

13. A motor according to claim 1, wherein every exciting coil is constantly excited during the start-up rotation (2Π) in relation to the two-phase exciting coil.

14. A motor according to claim 1, wherein the duty ratio of the signal to be supplied from said coil exciting circuit to the electromagnetic coil of said first and/or second magnetic body is made to change.

15. A motor according to claim 14, wherein said duty ratio is determined in accordance with the driving state of the load driven with said magnetic structure.

16. A motor according to claim 1, wherein said first and second magnetic structures are structured from an electromagnetic coil formed in a coil shape by winding a conducting sleeve around a nonmagnetic bobbin.

17. A motor according to claim 16, wherein a magnetic body is driven via switching of attraction and repulsion between third magnetic bodies formed from said electromagnetic coil and a permanent magnet.

18. A motor according to claim 16, wherein said first and second magnetic bodies are structured from a magnetic stator formed from a nonmagnetic bobbin.

19. A motor comprising:
   a first magnetic body;
   a second magnetic body; and
   a third magnetic body disposed between said first and second magnetic bodies, the third magnetic body being relatively movable in a prescribed direction in relation to said first and second magnetic bodies,
   wherein said first magnetic body and second magnetic body respectively comprise a structure in which a plurality of electromagnetic coils capable of being alternately excited to opposite polarities is disposed in order; said third magnetic body comprises a structure in which permanent magnets alternately magnetized to opposite polarities are disposed in order; and said first magnetic body and said second magnetic body are structured such that an electromagnetic coil of said first magnetic body and an electromagnetic coil of said second magnetic body are disposed so as to mutually possess an array pitch difference,
   said magnetic structure further comprising a coil exciting circuit for supplying an exciting current, including frequency signals having different phases to the electromagnetic coils of said first and second magnetic bodies,
   wherein the pair formed from said first and second magnetic bodies and one side of said third magnetic body form a rotor, and the pair formed from said first and second magnetic bodies and the other side of said third magnetic body form a stator,
   wherein an equal number of magnet poles of the rotor and poles of the electromagnetic coil for the phase are formed, a rotation speed detector that detects the rotation speed of the rotor being set in a direction perpendicular to an axis of the rotor, and
   wherein said coil exciting circuit controls excitation of the electromagnetic coils of said first and second magnetic body via the exciting current supplied to the electromagnetic coils, the phase of the current being corrected based on a rotational speed of said rotor,
   wherein a gear is formed on said rotor or stator.

* * * * *